United States Patent
Yao et al.

(10) Patent No.: US 10,310,222 B2
(45) Date of Patent: Jun. 4, 2019

(54) IMAGING LENS SYSTEM

(71) Applicant: Apple Inc., Cupertino, CA (US)

(72) Inventors: Yuhong Yao, San Jose, CA (US);
Yoshikazu Shinohara, Cupertino, CA (US)

(73) Assignee: Apple, Inc., Cupertino, CA (US)

( * ) Notice: Subject to any disclaimer, the term of this patent is extended or adjusted under 35 U.S.C. 154(b) by 181 days.

(21) Appl. No.: 15/130,735

(22) Filed: Apr. 15, 2016

(65) Prior Publication Data
US 2017/0299845 A1    Oct. 19, 2017

(51) Int. Cl.
*G02B 13/00* (2006.01)
*H04N 5/225* (2006.01)
*G02B 9/62* (2006.01)
*G02B 27/00* (2006.01)

(52) U.S. Cl.
CPC .......... *G02B 13/0045* (2013.01); *G02B 9/62* (2013.01); *G02B 27/0018* (2013.01); *H04N 5/2254* (2013.01)

(58) Field of Classification Search
CPC ...... G02B 13/0045; G02B 9/62; G02B 13/18; G02B 27/0025; G02B 3/04; G02B 5/005; G02B 13/0015; G02B 13/04; G02B 13/002; G02B 5/208; G02B 13/06; G02B 1/041; G02B 13/003; G02B 13/16; G02B 13/22; H04N 5/2254; H04N 5/335; H04N 5/372; H04N 5/374; H04N 9/09; H04N 1/028; H04N 1/02895; H04N 5/2252; G03B 3/00
USPC ......................................................... 359/713
See application file for complete search history.

(56) References Cited

U.S. PATENT DOCUMENTS

| 8,953,254 | B2 | 2/2015 | Okano et al. | |
|---|---|---|---|---|
| 9,217,848 | B1 | 12/2015 | Chen et al. | |
| 2012/0194726 | A1* | 8/2012 | Huang | G02B 13/0045 348/340 |
| 2013/0070346 | A1* | 3/2013 | Hsu | G02B 9/62 359/713 |
| 2013/0235473 | A1* | 9/2013 | Chen | G02B 13/0045 359/713 |

(Continued)

FOREIGN PATENT DOCUMENTS

| TW | 1518364 | 1/2016 |
|---|---|---|
| TW | 201602630 | 1/2016 |

OTHER PUBLICATIONS

International Search Report and Written Opinion from PCT/US2017/025862, dated Jul. 4, 2017, Apple Inc, pp. 1-14.

*Primary Examiner* — Collin X Beatty
*Assistant Examiner* — Grant A Gagnon
(74) *Attorney, Agent, or Firm* — Robert C. Kowert; Meyertons, Hood, Kivlin, Kowert & Goetzel, P.C.

(57) ABSTRACT

A compact, wide angle, low F-number lens system that may be used in small form factor cameras is described. The compact lens system has six lens elements, and provides high brightness with a low F-number and a wide field of view (FOV) in small form factor cameras. The shapes, materials, and arrangements of the lens elements in the lens system may be selected to correct aberrations, enabling the camera to capture high resolution, bright, high quality images at low F-numbers with a wide FOV. In addition, the shapes and arrangements of the lens elements in the lens system may reduce or eliminate a flare phenomenon.

20 Claims, 33 Drawing Sheets

(56) References Cited

U.S. PATENT DOCUMENTS

| | | | |
|---|---|---|---|
| 2013/0329306 A1* | 12/2013 | Tsai | G02B 13/0045 |
| | | | 359/713 |
| 2013/0342918 A1 | 12/2013 | Kubota et al. | |
| 2015/0338607 A1 | 11/2015 | Liao et al. | |
| 2015/0370038 A1 | 12/2015 | Sun | |
| 2015/0370042 A1 | 12/2015 | Chen et al. | |
| 2016/0004041 A1 | 1/2016 | Chen et al. | |
| 2016/0004050 A1 | 1/2016 | Tang et al. | |
| 2016/0018629 A1 | 1/2016 | Tang et al. | |
| 2016/0187619 A1 | 6/2016 | Tang et al. | |

\* cited by examiner

IMAGING LENS SYSTEM

BACKGROUND

Technical Field

This disclosure relates generally to camera systems, and more specifically to high-resolution, small form factor camera systems and lens systems.

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor (which may also be referred to as an image sensor or simply sensor) with small pixel size and a good, compact imaging lens system. Advances in technology have achieved reduction of the pixel size in photosensors. However, as photosensors become more compact and powerful, demand for compact imaging lens system with improved imaging quality performance has increased.

SUMMARY OF EMBODIMENTS

Embodiments of the present disclosure may provide a high-resolution, wide angle, low F-number camera in a small package size. Embodiments of a compact lens system including six lens elements are described that provide high brightness with a low F-number (F/2.2 or less) and a wide field of view (FOV) (e.g., 70° full FOV or higher) in small form factor cameras. The shapes, materials, and arrangements of the lens elements in the lens system may be selected to correct aberrations, enabling the camera to capture high resolution, high quality images at low F-numbers (e.g., 2.2, 2.0, 1.8, or lower) with a wide FOV (e.g., 70° full FOV or higher). Effective focal length f of the lens system may be 4.8 mm or less, and in some embodiments 4.4 mm or less. In addition, the shapes and arrangements of the lens elements in the lens system may reduce or eliminate a flare phenomenon.

Embodiments of a compact lens system as described herein may include six lens elements with refractive power, in order from the object side to the image side: a first lens with positive refractive power; a second lens with negative refractive power; a third lens with positive refractive power; a fourth lens with negative refractive power; a fifth lens with positive refractive power; and a sixth lens with negative refractive power. Surfaces of the lens elements may be aspheric. Each of the lens elements has an Abbe number within a specific range and certain relationships of the lens shapes and spacing within the lens system are satisfied to reduce aberrations while providing bright images at low F-numbers and wide FOVs. In some embodiments, the lens system includes a single aperture stop for controlling the brightness of the optical system. In some embodiments, in addition to the first aperture stop, the lens system may include a secondary stop, for example located between the first and second lens elements, to further reduce aberrations, especially in peripheral regions of the image. In some embodiments, an infrared (IR) filter is located between the sixth lens element and the photosensor of the camera.

Several non-limiting example embodiments of low F-number, wide FOV compact lens systems with six lens elements, and example embodiments of small form factor cameras that include the lens systems, are described. The example lens systems and cameras may provide F-numbers of 2.2 or lower (e.g., within a range of 1.6 to 2.2), with effective focal length for the lens systems ($f_{system}$) of 4.8 mm or lower (e.g., within a range system, of 3.4 to 4.8 mm), and with half FOV of 35° or higher (e.g., within a range of 35° to 42.5°). Total track length (TTL) of the lens system may be less than 6.2 millimeters (mm), and in some embodiments may be less than 4.8 mm. Note, however, that these examples are not intended to be limiting, and that variations on the various parameters given for the lens systems (e.g., higher or lower values for $f_{system}$, F-number, and half FOV, or longer or shorter TTL) are possible while still achieving similar results.

Embodiments of a camera including a wide-angle, low F-number lens system as described herein may be implemented in a small package size while still capturing bright, sharp, high-resolution images, making embodiments of the camera suitable for use in small and/or mobile multipurpose devices such as cell phones, smartphones, pad or tablet computing devices, laptop, netbook, notebook, subnotebook, and ultrabook computers. In some embodiments, a wide-angle camera as described herein may be included in a device along with one or more other cameras such as a telephoto small format camera, which would for example allow the user to select between the different camera formats (e.g., telephoto or wide-field) when capturing images with the device. In some embodiments, two or more cameras as described herein may be included in a device, for example as front-facing and rear-facing cameras in a mobile device.

Figure 1:
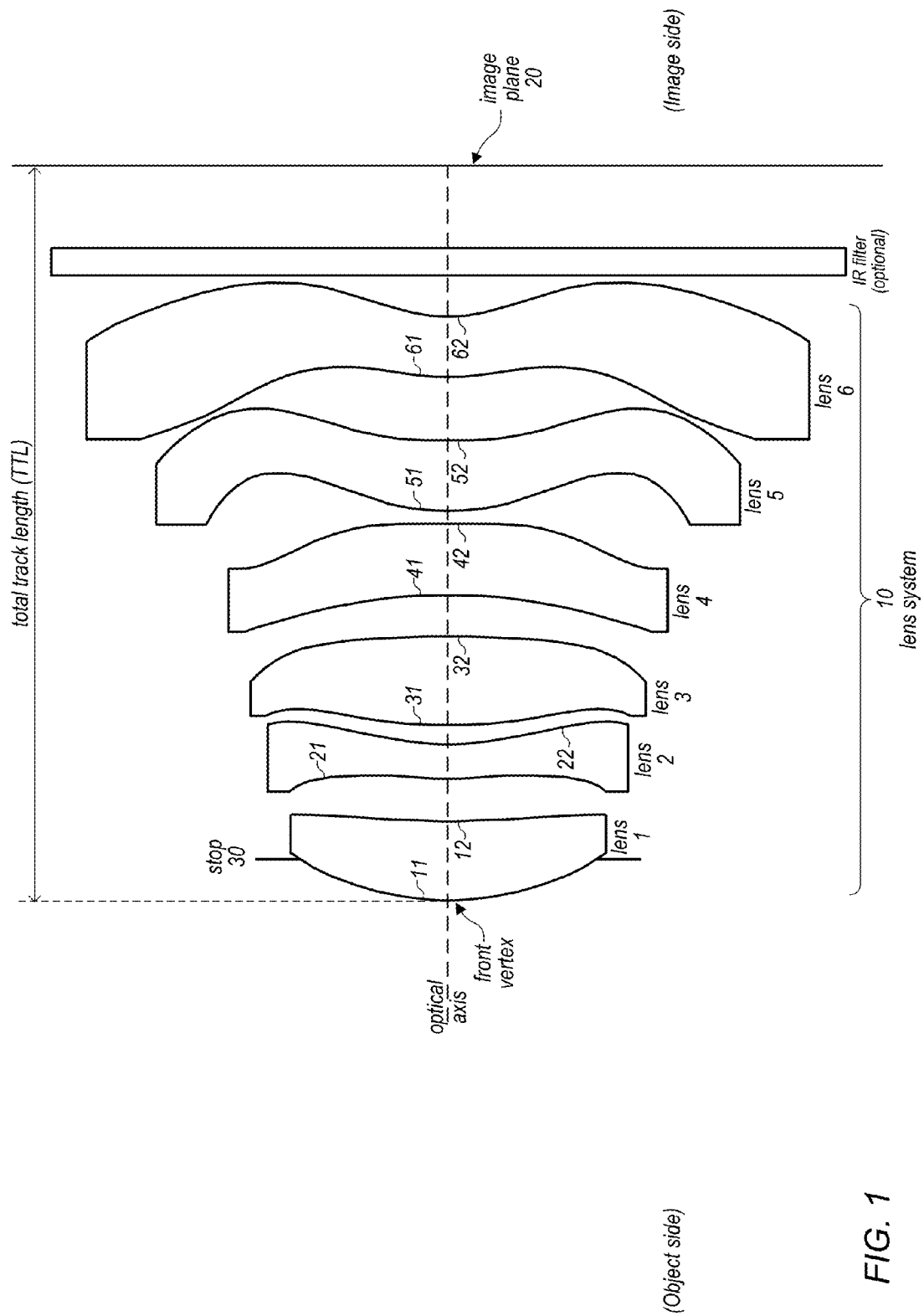
FIG. 1 illustrates an example compact lens system that includes six lens elements, according to embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a compact lens system including six lens elements are described that provide high brightness with a low F-number (F/2.2 or less) and a wide field of view (FOV) (e.g., 70° full FOV or higher) in small form factor cameras. The shapes, materials, and arrangements of the lens elements in the lens system may be selected to correct aberrations, enabling the camera to capture high resolution, high quality images at low F-numbers (e.g., 2.2, 2.0, 1.8, or lower) with a wide FOV (e.g., 70° full FOV or higher) in a small package size, for example with total track length (TTL) of 6.2 millimeters (mm) or less. In addition, the shapes and arrangements of the lens elements in the lens system may reduce or eliminate a flare phenomenon.

Embodiments of a compact lens system as described herein may include six lens elements with refractive power, in order from the object side to the image side:
 a first lens with positive refractive power;
 a second lens with negative refractive power;
 a third lens with positive refractive power;
 a fourth lens with negative refractive power;
 a fifth lens with positive refractive power; and
 a sixth lens with negative refractive power.

Each of the lens elements has an Abbe number within a specific range and certain relationships of the lens shapes and spacing within the lens system are satisfied to reduce aberrations while providing bright images at low F-numbers and wide FOVs.

In some embodiments, the lens system includes a single aperture stop, for example located on the object side of the first lens element of the lens system, for controlling the brightness of the optical system; the location of the aperture stop may be selected to reduce the total track length (TTL) of the lens system. In some embodiments, in addition to the first aperture stop, the lens system may include a secondary stop, for example located between the first and second lens elements, to further reduce aberrations, especially in peripheral regions of the image. In some embodiments, the camera/lens system includes an infrared (IR) filter that may reduce or eliminate interference of environmental noises on the photosensor. The IR filter may, for example, be composed of a glass material. However, other materials may be used. In some embodiments, the IR filter does not have refractive power, and does not affect the effective focal length f of the lens system. Further note that the camera may also include other components than those illustrated and described herein.

Embodiments of the compact lens system may provide a lower F-number and wider FOV while still providing bright, high resolution, high quality imaging than has been realized in conventional small form factor cameras. Using an embodiment of the compact lens system, a camera may be implemented in a small package size while still capturing sharp, high-resolution images at low F-numbers and with a wide FOV, making embodiments of the camera suitable for use in small and/or mobile multipurpose devices such as cell phones, smartphones, pad or tablet computing devices, laptop, netbook, notebook, subnotebook, and ultrabook computers, and so on. However, note that aspects of the camera (e.g., the lens system and photosensor) may be scaled up or down to provide cameras with larger or smaller package sizes. In addition, embodiments of the camera system may be implemented as stand-alone digital cameras. In addition to still (single frame capture) camera applications, embodiments of the lens system may be adapted for use in video camera applications.

Example Embodiments of Low F-Number, Wide FOV Compact Lens Systems

Several non-limiting example embodiments of low F-number (F/2.2 or lower), wide FOV (35° or higher) compact lens systems with six lens elements, and example embodiments of small form factor cameras that include the lens systems, are described in reference to FIGS. 1 through 26. The example lens systems as described herein may provide F-system numbers within a range of 1.6 to 2.0, with effective focal length for the lens systems ($f_{system}$) within a range of 3.4 to 4.4 mm. Note, however, that these examples are not intended to be limiting, and that variations on the various parameters given for the lens systems (e.g., higher or lower values for $f_{system}$ and F-number) are possible while still achieving similar results.

In the example embodiments, the power order of the lenses in the lens system, from the first lens on the object side of the lens system to the sixth lens, is PNPNP where P indicates a lens with positive refractive power, and N represents a lens with negative refractive power.

The six refractive lens elements in the various embodiments may, for example, be composed of a plastic material. In some embodiments, the refractive lens elements may be composed of an injection molded plastic material. However, other transparent materials (e.g., glass) may be used. Also note that, in the example embodiments, different ones of the lens elements may be composed of materials with different optical characteristics, for example different Abbe numbers and/or different refractive indices. The Abbe number, $V_d$, for an optical element may be defined by the equation:

$$V_d = (N_d - 1)/(N_F - N_C),$$

where $N_F$ and $N_C$ are the refractive index values of the material at the F and C lines of hydrogen, respectively.

Figure 25:
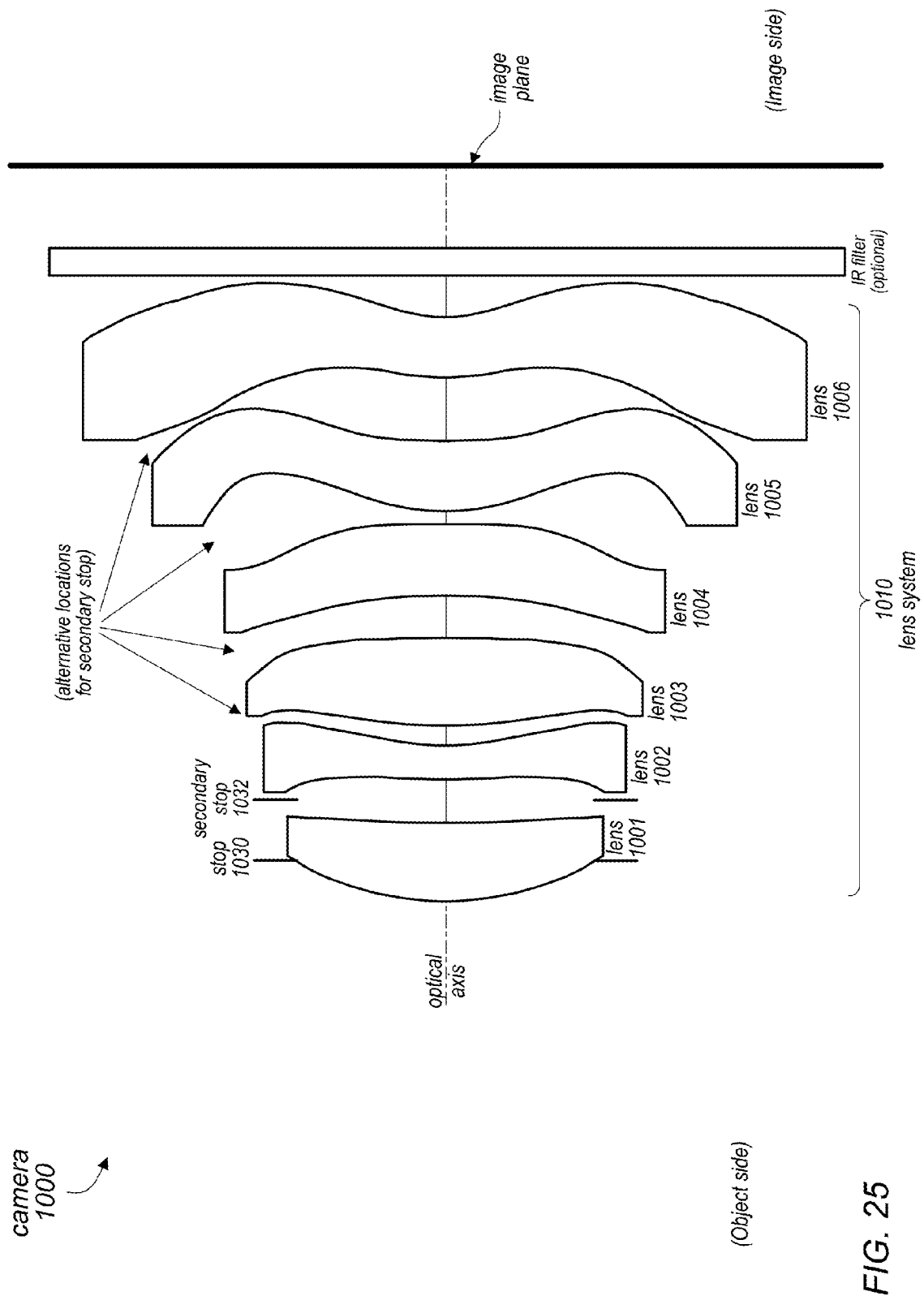
FIG. 25 is a cross-sectional illustration of a compact lens system as illustrated in FIGS. 1-23 that includes a secondary stop, according to some embodiments.

In the example embodiments, an aperture stop is located in front of the first lens element and behind the front vertex of the lens system. However, in some embodiments, the aperture stop may be located at different positions than shown, for example at or in front of the front vertex of the lens system, or between the first and second lens elements in the lens system. Moving the aperture stop inwards (towards the image side) effectively may, for example, move the ideal principal point of the camera forwards, to the object side and in front of the front vertex of the lens system. Also note that, in some embodiments, a secondary stop may be included in the lens system, for example between two lens elements in the lens system as illustrated in FIG. 25.

In the example embodiments, the camera/lens system includes an infrared (IR) filter located between the sixth lens element and the photosensor that may reduce or eliminate interference of environmental noises on the photosensor. The IR filter may, for example, be composed of a glass material. However, other materials may be used. In some embodiments, the IR filter does not have refractive power, and does not affect the effective focal length f of the lens system.

Further note that embodiments of the camera and/or lens system may also include other components than those illustrated and described herein.

FIG. 1 illustrates an example compact lens system 10 that includes six lens elements 1-6 arranged in order along an optical axis from a first refractive lens element (lens 1) on the object side of the lens system 10 to a last lens element (lens 6) on the image side of the lens system 10, according to embodiments. Power order of the lens system 10, from lens 1 to lens 6, is PNPNPN.

Figure 3A:
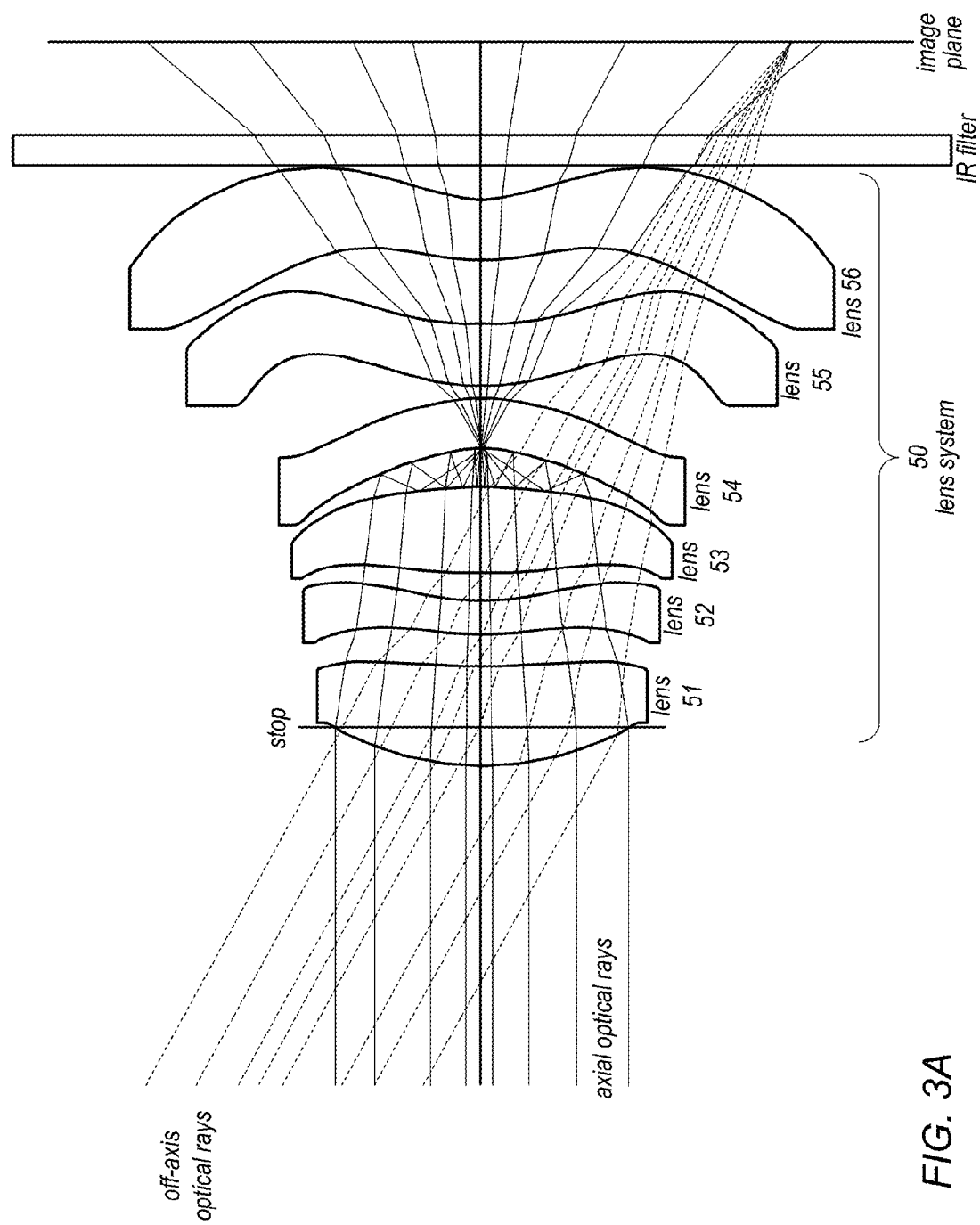
FIG. 3A illustrates a lens system where the Zh/Za relationship is not satisfied.
Figure 3B:
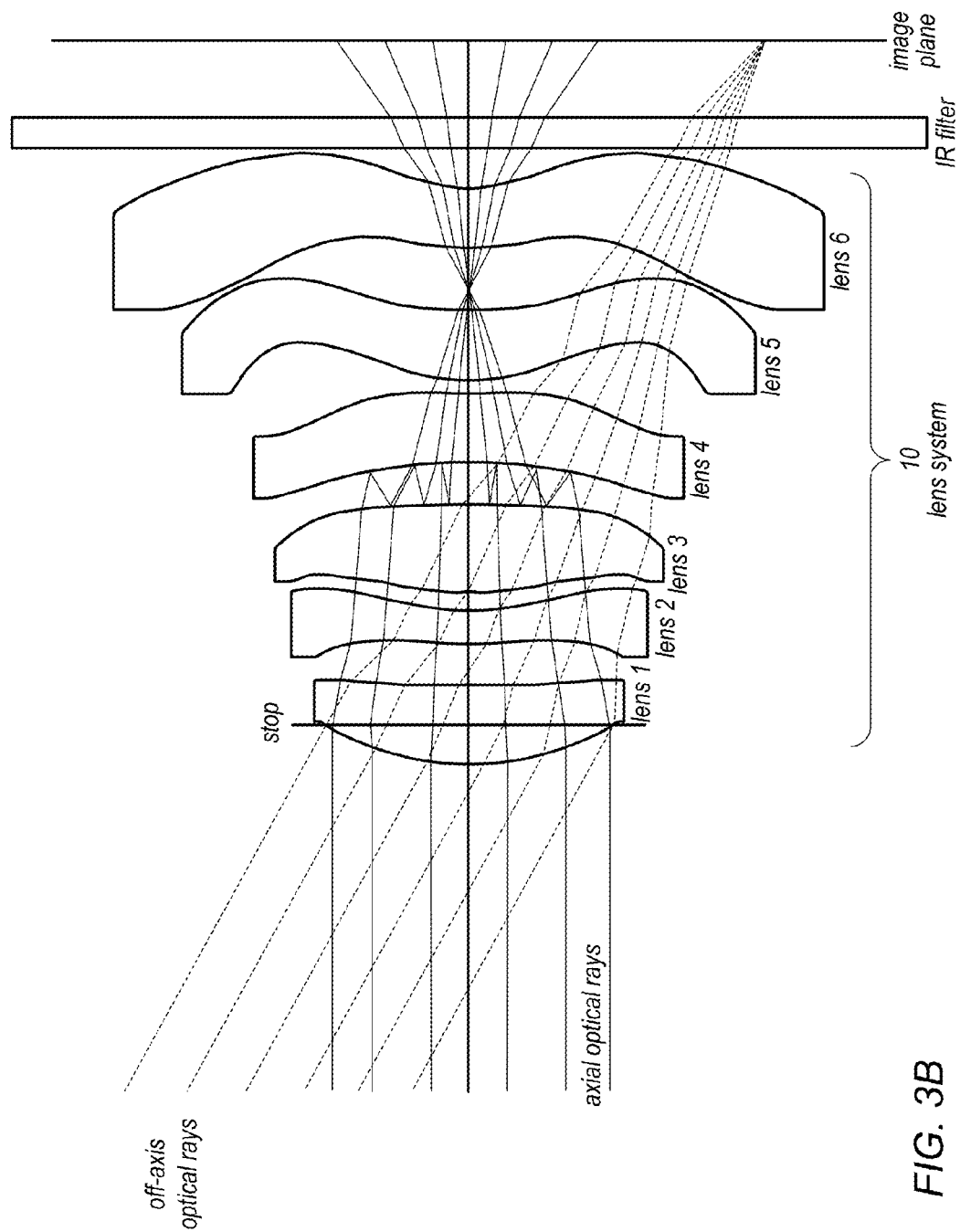
FIG. 3B illustrates a lens system as illustrated in FIG. 1 where the Zh/Za relationship is satisfied, according to some embodiments.

In at least some embodiments, to facilitate correction of aberrations across the field of view and elimination of one type of flare, surface shapes of the lens elements in the lens system 10, in addition to their power arrangement, may be configured according to the following criteria. Note that these criteria may also reduce or eliminate one type of flare as illustrated in FIGS. 3A-3B.

In at least some embodiments, Lens 1 has a convex object-side surface 11 in the paraxial region and a concave image-side surface 12 in the paraxial region. In at least some embodiments of the lens system 10, focal length of lens 1 ($f_1$) and effective focal length of the lens system 10 ($f_{system}$) may satisfy the following relationship.

$$1.2 < f_1/f_{system} < 1.6 \tag{1}$$

In at least some embodiments, Lens 2 has a convex object-side surface 21 in the paraxial region and a concave image-side surface 22 in the paraxial region.

In at least some embodiments, Lens 3 has a convex object-side surface 31 in the paraxial region.

In at least some embodiments, Lens 4 has a concave object side surface 42 in the paraxial region.

Figure 2A:
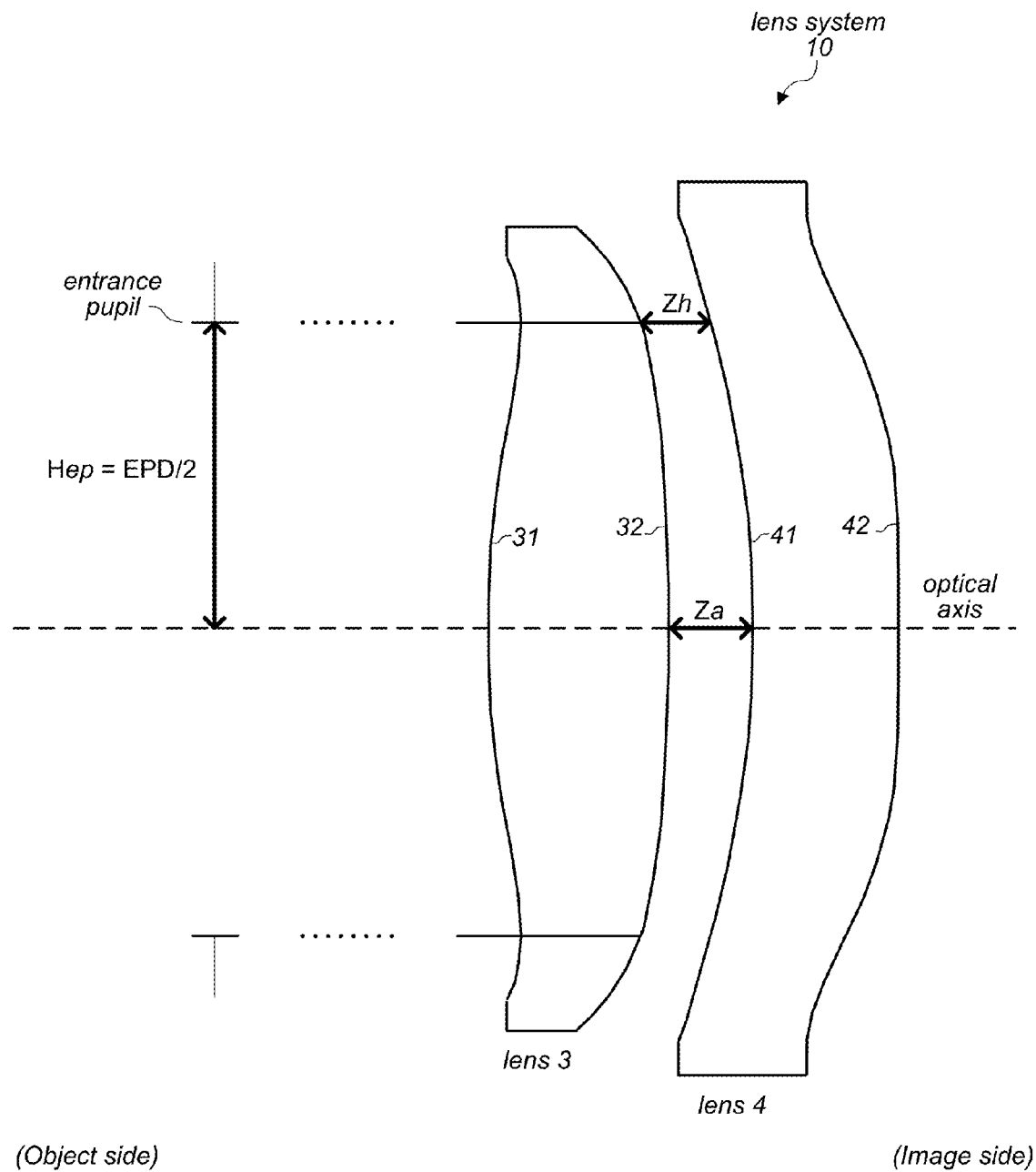
FIG. 2A illustrates a $Z_d/Z_h$ relationship for a third and fourth lens of a lens system as illustrated in FIG. 1, according to some embodiments.

Referring to FIG. 2A, with respect to the optical axis, the on-axis spacing between Lens 3 and Lens 4 is defined as Za, and the off-axis spacing between Lens 3 and Lens 4 at a vertical distance Hep (Hep=EPD/2, where EPD is the entrance pupil diameter) is defined as Zh. In at least some embodiments of the lens system 10, Za and Zh may satisfy the following relationship:

$$Zh/Za > 0.7 \tag{2}$$

A primary purpose of relationship (2) is aberration control at low F-numbers (e.g., 2.2 or less) and with a wide FOV (e.g., 70° full FOV or higher), particularly around the periphery of the image. However, relationship (2) may also reduce or eliminate a flare phenomenon, as illustrated in FIGS. 3A and 3B.

FIG. 3A illustrates a lens system 50 where the Zh/Za relationship is not satisfied leading to a flare phenomenon in which stray light from axial optical rays (the solid lines), where the illumination is strongest, gets spread across the image plane, causing degradation in image quality across the image, and in particular at the image corners. The axial optical rays tend to be stronger than the off-axis rays (the dashed lines); the off axis rays may be only 30/40% as strong as the axial rays. As shown in FIG. 3A, a portion of the stronger light of the axial rays may be double reflected off the object side surface of lens 54 and the image side surface of lens 53, and this reflected light spreads out all over photosensor, causing a flare phenomenon in which the reflected light interferes with the relatively weaker off-axis rays. (Note that, while not shown in FIGS. 3A and 3B, most of the stronger light of the axial rays passes through lens 54 without being reflected; only a portion of the axial light is reflected as illustrated).

FIG. 3B illustrates a lens system 10 as illustrated in FIG. 1 where the Zh/Za relationship is satisfied, according to some embodiments. In lens system 10 that satisfies the Zh/Za relationship as illustrate in FIG. 2A, the stray light from the axial optical rays (solid lines) is limited to near the image center, an is thus less problematic for degradation of image quality at the edge of the field where the relative illumination is weaker. By satisfying the Zh/Za relationship, the reflection between the lens elements tends to be focused in the center of the image, and thus the stray light does not affect image quality as much because the light (axial rays) in the center of the image is stronger and dominates the reflected light rays. In FIG. 3B, where the reflected light goes to the edge of the image, the reflected light may be significant because the off-axis light on the edge of the image is weaker.

Figure 2B:
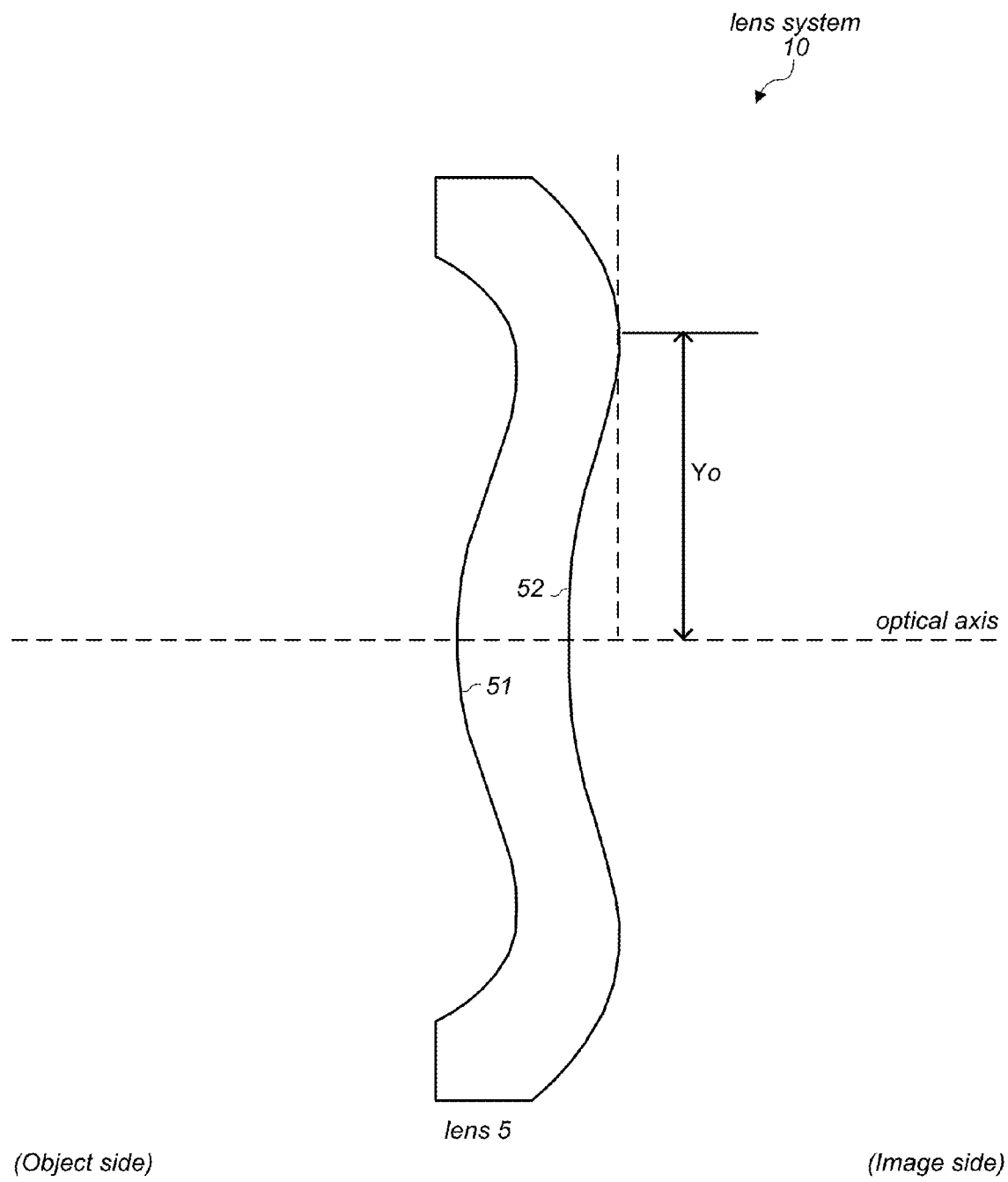
FIG. 2B illustrates a Yo relationship for a fifth lens of a lens system as illustrated in FIG. 1, according to some embodiments.

Referring to FIG. 2B, both the object side and the image side surfaces (51, 52) of lens 5 are aspheric. The object side surface 51 of Lens 5 is convex in the paraxial region and is concave near the periphery region. The image side surface 52 of Lens 5 is concave in the paraxial region and is convex near the periphery region. Yo is the vertical distance between the outermost horizontal vertex of the image side surface 52 of lens 5 and the optical axis. In at least some embodiments of the lens system 10, Yo satisfies the following relationship:

$$0.2 < Yo/f_{system} < 0.6 \tag{3}$$

Referring again to FIG. 1, in at least some embodiments, Lens 6 has a convex object-side surface 61 in the paraxial region, with at least one part being concave along the entire surface 61. Lens 6 also has a concave image-side surface 62 in the paraxial region, with at least one part being convex along the entire surface 62. Both surfaces (61, 62) of lens 6 are aspheric.

In at least some embodiments of the lens system 10, Lens 1 and Lens 3 are formed of optical materials with Abbe number Vd>50, and lens 2 is formed of an optical material with Abbe number Vd<30. The materials and power configurations of lenses 1-3 may help reduce chromatic aberrations. Lenses 4-6 are formed of optical materials with Abbe number Vd>50, which may limit the occurrence of excessive chromatic aberrations.

At least some embodiments of the lens system 10 may be compact and suitable for use in small form factor camera systems for small and/or mobile multipurpose devices, In at least some embodiments of the lens system 10, compactness criteria as defined in the following relationships may be met:

$$TTL/ImageH < 1.9 \tag{4}$$

$$TTL/f_{system} < 1.4 \tag{5}$$

where TTL is the total track length of the lens system 10 focusing at infinity conjugate and is measured from the object side surface 11 of lens 1 or the aperture stop 30, whichever is closer to the object, to the image plane 20. ImageH is the semi-diagonal image height on the image plane 20 at the photosensor of the camera (e.g., for a 5.04 mm full diagonal photosensor, ImageH=2.52 mm), and $f_{system}$ is the effective focal length of the lens system 10. The example lens systems as described herein may provide effective focal lengths ($f_{system}$) within a range of 3.4 to 4.4 mm. Thus, given relationship (5), TTL of the example lens systems may be less than 6.2 mm (4.4×1.4=6.16), and may be less than 4.8 mm (3.4×1.4=4.76). Embodiments of the lens system 10 may, for example, be used in cameras with a 5.04 mm (full) diagonal photosensor. Given relationship (4), for a 5.04 mm full diagonal photosensor, TTL of the lens systems may be less than 4.8 mm (2.52×1.9=4.79). Note, however, that these examples are not intended to be limiting, and that variations on the various parameters given for the lens systems and cameras (e.g., higher or lower values for $f_{system}$ and TTL, larger or smaller photosensors, etc.) are possible while still achieving similar results and satisfying relationships (4) and (5).

First Example Embodiment

Figure 4:
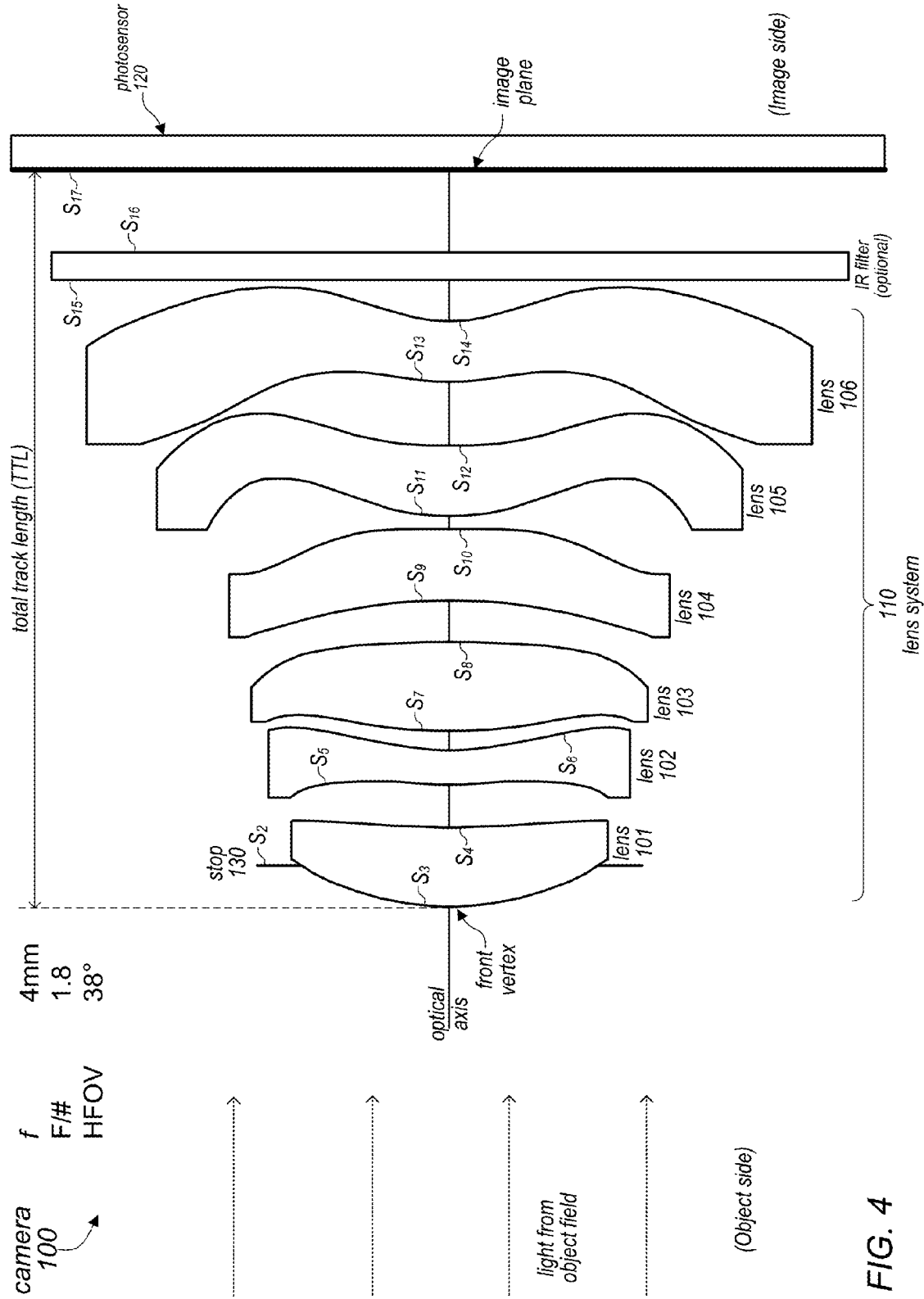
FIG. 4 is a cross-sectional illustration of a compact camera including an example embodiment of a compact lens system.

FIGS. 4 through 7 illustrate a first example embodiment of a low F-number, wide FOV compact lens system 110 and camera 100 with effective focal length f of 4 mm, F-number of 1.8, and half field of view (HFOV) of 38°. TTL of the lens system may be less than 5.6 mm. Tables 1-3 correspond to an embodiment of a lens system 110 as illustrated in FIG. 4, and provide example values for various optical and physical parameters of the lens system 110 and camera 100 of FIG. 4.

FIG. 4 is a cross-sectional illustration of a compact camera 100 including an example embodiment of a compact lens system 110. Lens system 110 may include six lens elements 101-106 in order along an optical axis of the camera from the first lens 101 on the object side of the camera 100 to the sixth lens 106 on the image side of the camera. Camera 100 includes a photosensor 120 located on the image side of the camera 100. In some embodiments, the position of photosensor 120 relative to the lens system 110 may be adjustable, for example to provide autofocus functionality to the camera 100.

An aperture stop 130 is located in front of the first lens element 101 and behind the front vertex of the lens system 110. However, in some embodiments, the aperture stop 130 may be located at different positions than shown, for example at or in front of the front vertex of the lens system 110, or between the first 101 and second 102 lens elements in the lens system 110. In some embodiments, a secondary stop may be included in the lens system 110, for example between two lens elements in the lens system as illustrated in FIG. 25. While camera 100 with lens system 110 and a single stop 130 as illustrated in FIG. 4 may capture high resolution high quality images with high brightness and a wide field of view without a secondary stop, including a secondary stop may, for example, cut off a portion of the light field at the periphery to provide additional aberration control.

In some embodiments, the camera 100/lens system 110 includes an infrared (IR) filter located between the sixth lens element 106 and the photosensor 120 that may reduce or eliminate interference of environmental noises on the photosensor 120. The IR filter may, for example, be composed of a glass material. However, other materials may be used. In some embodiments, the IR filter does not have refractive power, and does not affect the effective focal length f of the lens system 110.

Further note that embodiments of the camera 100 and/or lens system 110 may also include other components than those illustrated and described herein.

Compact lens system 110 includes six lens elements 101-106 arranged in order along an optical axis from a first refractive lens element (lens 101) on the object side of the lens system 110 to a last lens element (lens 106) on the image side of the lens system 110. Power order of the lens system 110, from lens 101 to lens 106, is PNPNPN. In at least some embodiments, to facilitate correction of aberrations across the field of view and elimination of one type of flare, surface shapes of the lens elements in the lens system 110, in addition to their power arrangement, may be configured according to the criteria and relationships as described in reference to FIGS. 1 through 2B.

Tables 1-3 correspond to an embodiment of a lens system 110 as illustrated in FIG. 4, and provide example values for various optical and physical parameters of the lens system 110 and camera 100 of FIG. 4. Table 1 provides values for parameters of the elements and at the surfaces S0 through S17 of the camera 100, with surface S0 corresponding to the object field, surface S1 corresponding to infinity, surfaces S3-S14 corresponding to object and image side surfaces of the lens elements 101-106 in the lens system 110 (shown as surfaces 11 through 62 in lens system 10 of FIG. 1), surfaces S15 and S16 corresponding to the object and image side surfaces of the IR filter (if present), and surface S17 corresponding to the surface of the photosensor. For each surface (S#) of the camera 100, Table 1 identifies the element, shows the surface number, identifies aspheric surfaces, and shows the radius of curvature (in mm) at the surface, the thickness of the element (where applicable) or separation of the surface from an adjacent surface (in mm), the refractive index $N_d$ of the element (if applicable), and the Abbe number $V_d$ of the element (if applicable).

In some embodiments, at least some of the surfaces S3-S14 of the lens elements 101-106 in lens system 110 are aspheric. Tables 2A through 2C show aspheric coefficients for surfaces S3-S14 of the lens elements 101-106 in lens system 110.

Table 3 provides optical parameters or definitions for the camera 100 and lens system 110 of FIG. 4. As shown in Table 3, effective focal length f of the camera 100 may be 4 mm, F-number (Fno) of the camera 100 may be 1.8, half field of view (HFOV) of the camera 100 may be 38°, chief ray angle (CRA) of the camera 100 may be 33°, and Abbe number of the second lens element 102 ($V_2$) may be 23.5. The relationship (1) $f_1/f_{system}$ may be 1.35, the relationship (2) Zh/Za may be 0.82, and the relationship (4) TTL/ImageH may be 1.77. Note that the lens system 110 and camera 100 may meet all of the criteria and relationships as described above with reference to FIGS. 1 through 2B to facilitate correction of aberrations across the field of view of the wide-angle, low F-number compact camera 100 and lens system 110.

Figure 5:
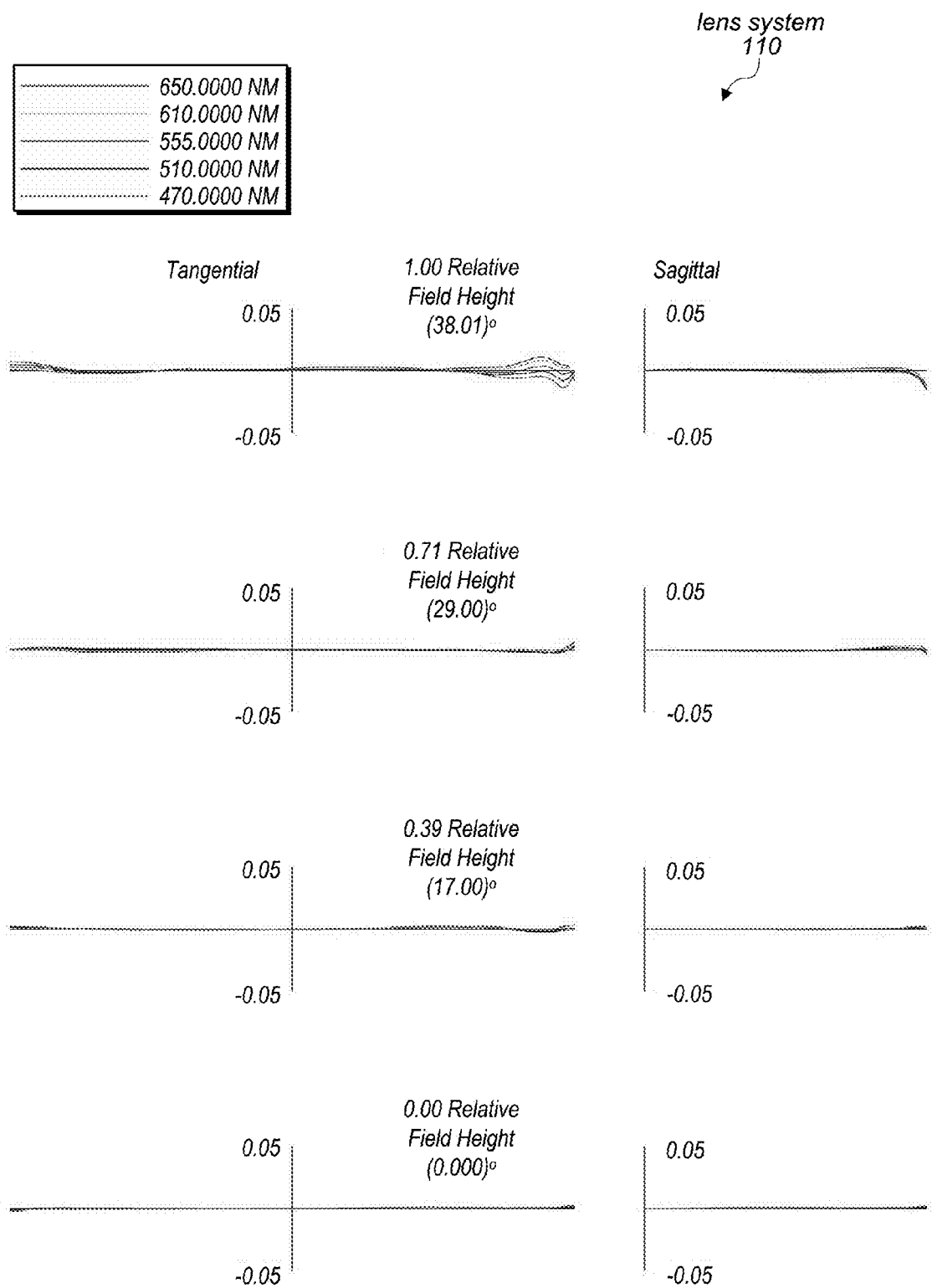
FIG. 5 is a graph illustrating the polychromatic ray aberration curve for a lens system as illustrated in FIG. 4, according to some embodiments.
Figure 6:
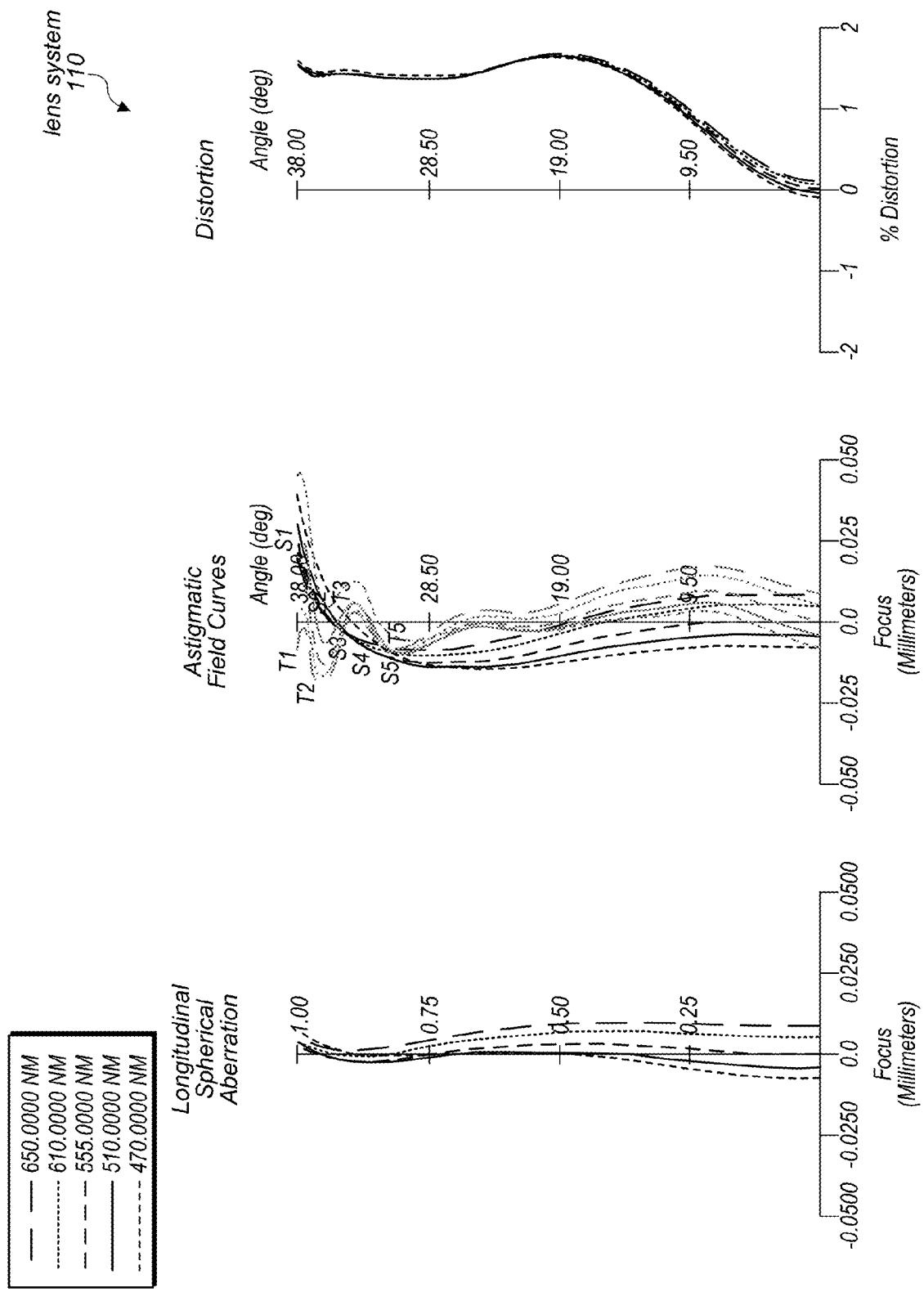
FIG. 6 is a graph illustrating the longitudinal spherical aberration, astigmatic field curves, and distortion for a lens system as illustrated in FIG. 4, according to some embodiments.
Figure 7:
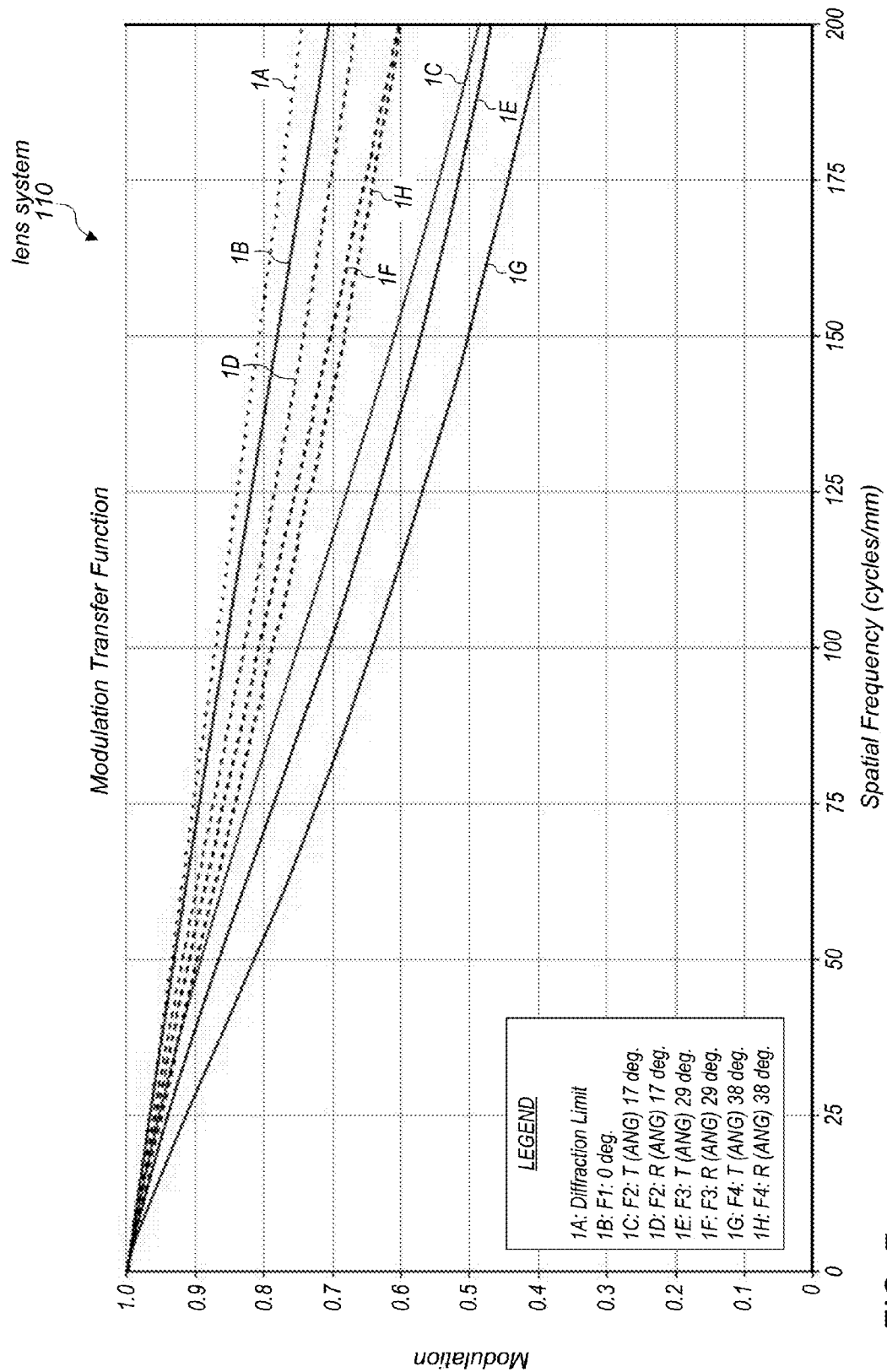
FIG. 7 is a graph illustrating the modulation transfer function (MTF) for a lens system as illustrated in FIG. 4, according to some embodiments.

FIGS. 5 through 7 illustrate performance of the lens system 110 as evaluated with the lens system 110 focused at infinity.

FIG. 5 is a graph illustrating the polychromatic ray aberration curve for a lens system 110 as illustrated in FIG. 4, according to some embodiments. FIG. 5 shows the transverse ray aberration plots evaluated at 0, 0.4, 0.7 and full field, respectively. The on-axis and off-axis aberrations are well balanced across the field of view.

FIG. 6 is a graph illustrating the longitudinal spherical aberration, astigmatic field curves, and distortion for a lens system 110 as illustrated in FIG. 4, according to some embodiments. Optical distortion across the field of view is controlled within 2%, while field curvature and astigmatism are well balanced across the field of view.

FIG. 7 is a graph illustrating the modulation transfer function (MTF) for a lens system 110 as illustrated in FIG. 4, according to some embodiments. FIG. 7 shows the lens MTF evaluated at 0 field, 0.4 field, 0.7 field and full field respectively. MTFs at all fields are well beyond 0.5 at 125 line pairs (lp)/mm, showing good contrast for high-resolution imaging.

Second Example Embodiment

Figure 8A:
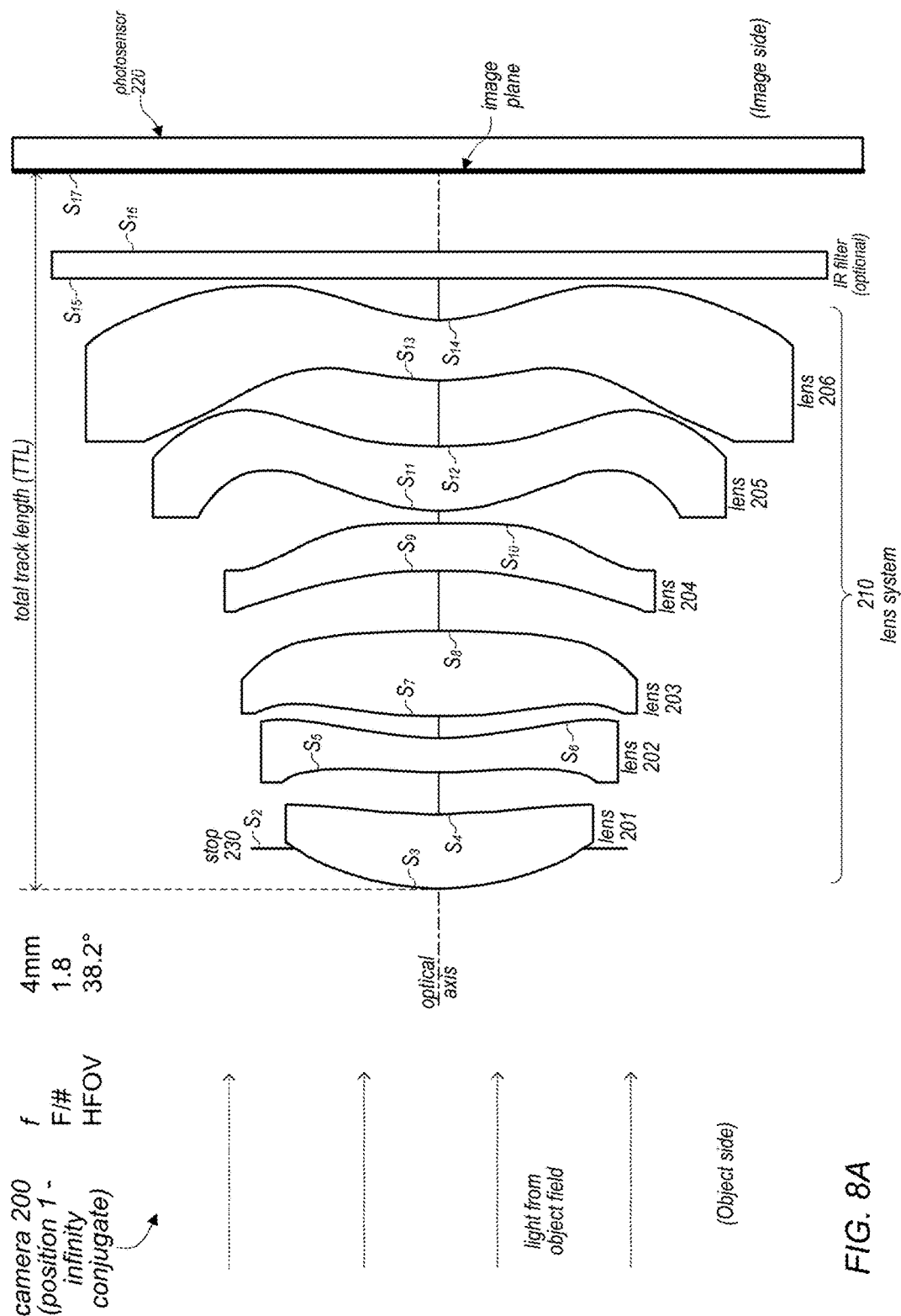
FIG. 8A is a cross-sectional illustration of a compact camera including another example embodiment of a compact lens system, and illustrates focus for the camera at an infinity conjugate position.

FIGS. 8A through 11B illustrate a second example embodiment of a low F-number, wide FOV compact lens system 210 and camera 200 with effective focal length f of 4 mm, F-number (Fno) of 1.8, and half field of view (HFOV) of 38.2°. TTL of the lens system may be less than 5.6 mm. Tables 4-7 correspond to an embodiment of a lens system 210 as illustrated in FIGS. 8A and 8B, and provide example values for various optical and physical parameters of the lens system 210 and camera 200 of FIGS. 8A and 8B.

In addition, the camera 200 and lens system 210 of FIGS. 8A through 11B and Tables 4-7 illustrate focusing (e.g., autofocus) functionality that may be provided in embodiments of the compact lens system as described herein. As shown in FIG. 8B, in some embodiments, the photosensor 220 may be moved on one or more axes relative to the lens system 210 to adjust focus of the camera. Alternatively, in some embodiments, the lens system 210 may be moved relative to the photosensor 220 to adjust focus. FIGS. 8A, 9A, 10A, and 11A correspond to the camera 200 focused at a first position (infinity conjugate), and FIGS. 8B, 9B, 10A, and 11A correspond to the camera 200 focused at a second position (macro conjugate, e.g. 100 mm). While two focus positions are shown as examples, note that the camera 200 may be focused at other positions in some embodiments.

Figure 8B:
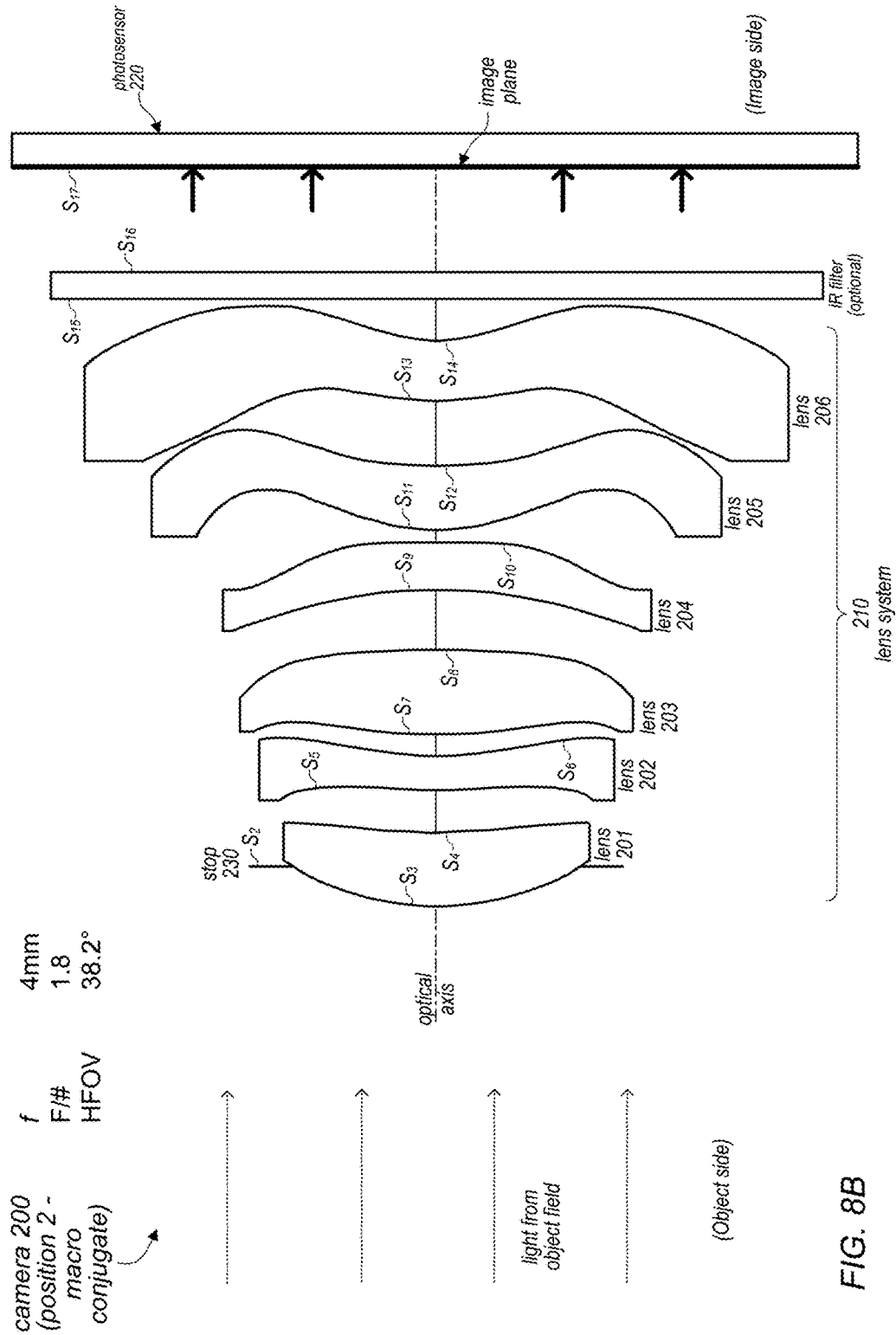
FIG. 8B is a cross-sectional illustration of a compact camera including the compact lens system as illustrated in FIG. 8A, and illustrates focus for the camera at a macro conjugate position.

FIG. 8A is a cross-sectional illustration of a compact camera 200 including an example embodiment of a compact lens system 210, and illustrates focus for the camera 200 at an infinity conjugate position. FIG. 8B is a cross-sectional illustration of a compact camera 200 including the compact lens system 210 as illustrated in FIG. 8A, and illustrates focus for the camera 200 at a macro conjugate position.

Lens system 210 may include six lens elements 201-206 in order along an optical axis of the camera from the first lens 201 on the object side of the camera 200 to the sixth lens 206 on the image side of the camera. Camera 200 includes a photosensor 220 located on the image side of the camera 200. In some embodiments, the position of photosensor 220 relative to the lens system 210 may be adjustable, for example to provide autofocus functionality to the camera 200.

An aperture stop 230 is located in front of the first lens element 201 and behind the front vertex of the lens system 210. However, in some embodiments, the aperture stop 230 may be located at different positions than shown, for example at or in front of the front vertex of the lens system 210, or between the first 201 and second 202 lens elements in the lens system 210. In some embodiments, a secondary stop may be included in the lens system 210, for example between two lens elements in the lens system as illustrated in FIG. 25. While camera 200 with lens system 210 and a single stop 230 as illustrated in FIGS. 8A and 8B may capture high resolution high quality images with high brightness and a wide field of view without a secondary stop, including a secondary stop may, for example, cut off a portion of the light field at the periphery to provide additional aberration control.

In some embodiments, the camera 200/lens system 210 includes an infrared (IR) filter located between the sixth lens element 206 and the photosensor 220 that may reduce or eliminate interference of environmental noises on the photosensor 220. The IR filter may, for example, be composed of a glass material. However, other materials may be used. In some embodiments, the IR filter does not have refractive power, and does not affect the effective focal length f of the lens system 210.

Further note that embodiments of the camera 200 and/or lens system 210 may also include other components than those illustrated and described herein.

Compact lens system 210 includes six lens elements 201-206 arranged in order along an optical axis from a first refractive lens element (lens 201) on the object side of the lens system 210 to a last lens element (lens 206) on the image side of the lens system 210. Power order of the lens system 210, from lens 201 to lens 206, is PNPNPN. In at least some embodiments, to facilitate correction of aberrations across the field of view and elimination of one type of flare, surface shapes of the lens elements in the lens system 210, in addition to their power arrangement, may be configured according to the criteria and relationships as described in reference to FIGS. 1 through 2B.

Tables 4-7 correspond to an embodiment of a lens system 210 as illustrated in FIGS. 8A and 8B, and provide example values for various optical and physical parameters of the lens system 210 and camera 200 of FIGS. 8A and 8B. Table 4 provides values for parameters of the elements and at the surfaces S0 through S17 of the camera 200, with surface S0 corresponding to the object field, surface S1 corresponding to infinity, surfaces S3-S14 corresponding to object and image side surfaces of the lens elements 201-206 in the lens system 210 (shown as surfaces 11 through 62 in lens system 10 of FIG. 1), surfaces S15 and S16 corresponding to the object and image side surfaces of the IR filter (if present), and surface S17 corresponding to the surface of the photosensor. For each surface (S#) of the camera 200, Table 4 identifies the element, shows the surface number, identifies aspheric surfaces, and shows the radius of curvature (in mm) at the surface, the thickness of the element (where applicable) or separation of the surface from an adjacent surface (in mm), the refractive index $N_d$ of the element (if applicable), and the Abbe number $V_d$ of the element (if applicable). Table 4 also indicates zoom parameters for the focus functionality at S0 and S17 (see Table 7).

In some embodiments, at least some of the surfaces S3-S14 of the lens elements 201-206 in lens system 210 are aspheric. Tables 5A through 5C show aspheric coefficients for surfaces S3-S14 of the lens elements 201-206 in lens system 210.

Table 6 provides optical parameters or definitions for the camera 200 and lens system 210 of FIGS. 8A and 8B. As shown in Table 6, effective focal length f of the camera 200 may be 4 mm, F-number (Fno) of the camera 200 may be 1.8, half field of view (HFOV) of the camera 200 may be 38.2°, chief ray angle (CRA) of the camera 200 may be 33°, and Abbe number of the second lens element 202 ($V_2$) may be 20.4. The relationship (1) $f_1/f_{system}$ may be 1.54, the relationship (2) Zh/Za may be 0.85, and the relationship (4) TTL/ImageH may be 1.76. Note that the lens system 210 and camera 200 may meet all of the criteria and relationships as described above with reference to FIGS. 1 through 2B to facilitate correction of aberrations across the field of view of the wide-angle, low F-number compact camera 200 and lens system 210.

Table 7 provides zoom parameters for the camera 200 and lens system 210 of FIGS. 8A (position 1) and 8B (position 2). 1 and 2 refer back to Table 5. At position 1, 1 is infinity, and 2 is 0. At position 2, 1 is 100 mm, and 2 is 0.164 mm.

Figure 9A:
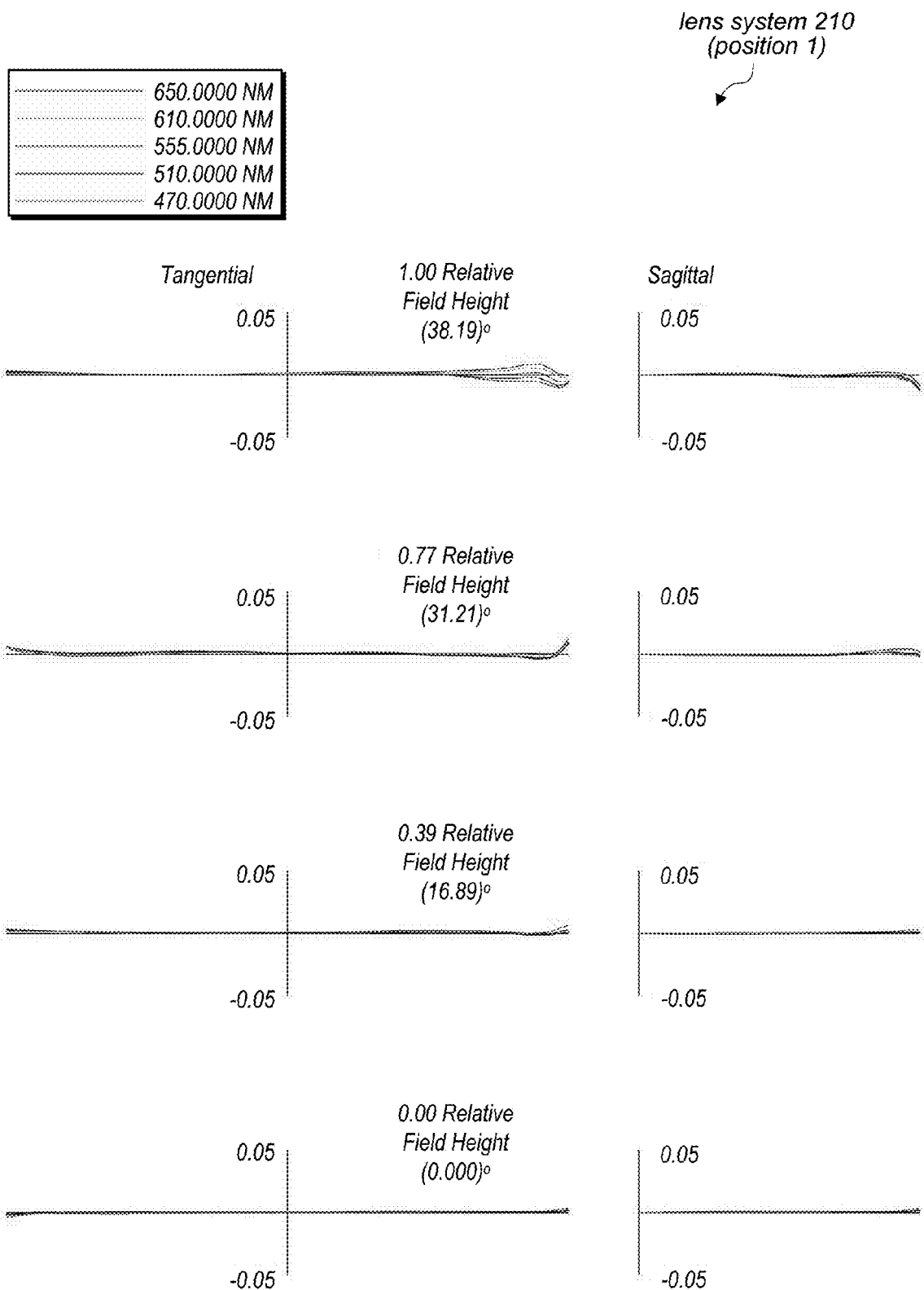
FIG. 9A is a graph illustrating the polychromatic ray aberration curve for a lens system at an infinity conjugate position as illustrated in FIG. 8A, according to some embodiments.
Figure 9B:
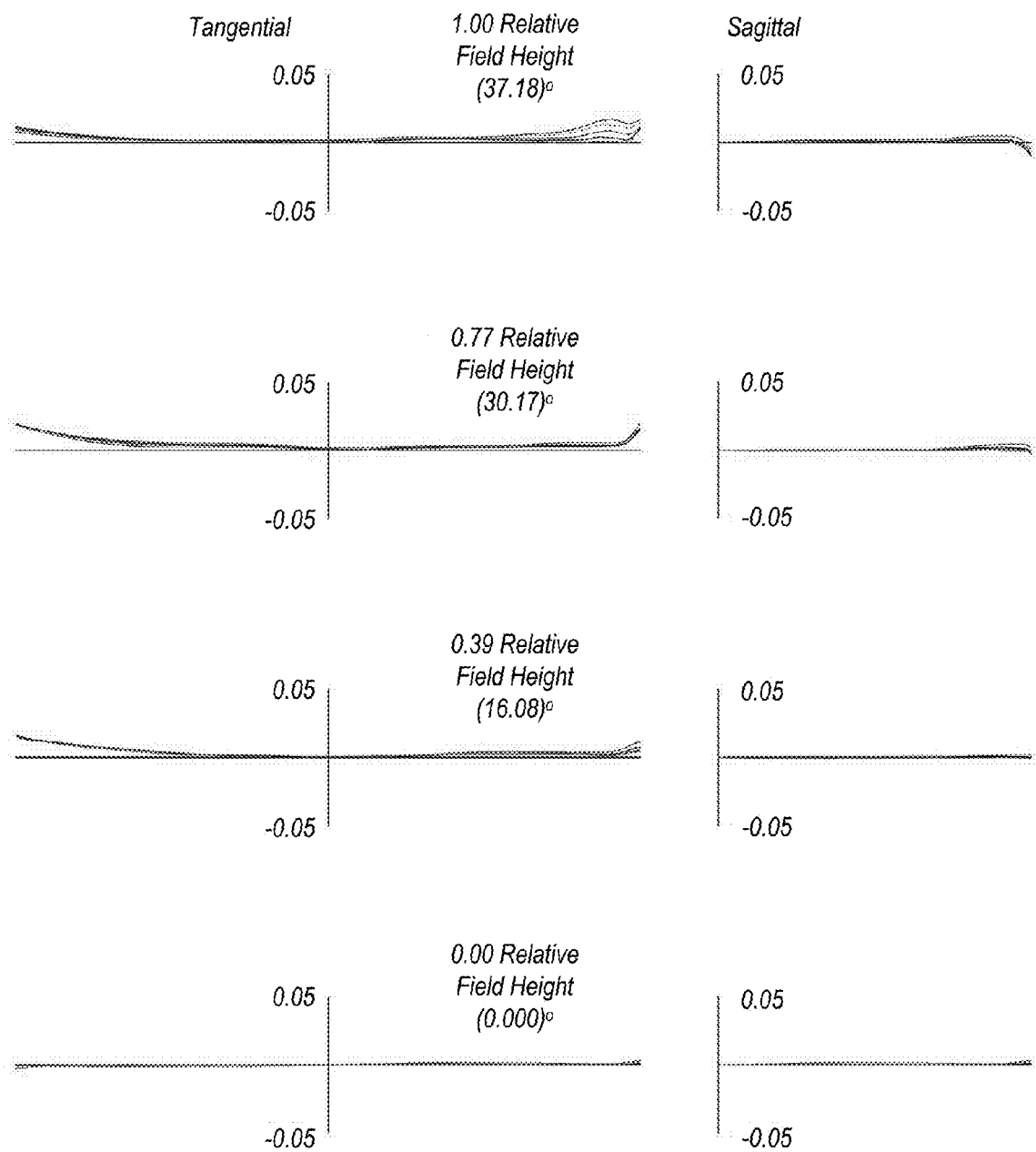
FIG. 9B is a graph illustrating the polychromatic ray aberration curve for a lens system at a macro conjugate position as illustrated in FIG. 8B, according to some embodiments.
Figure 10A:
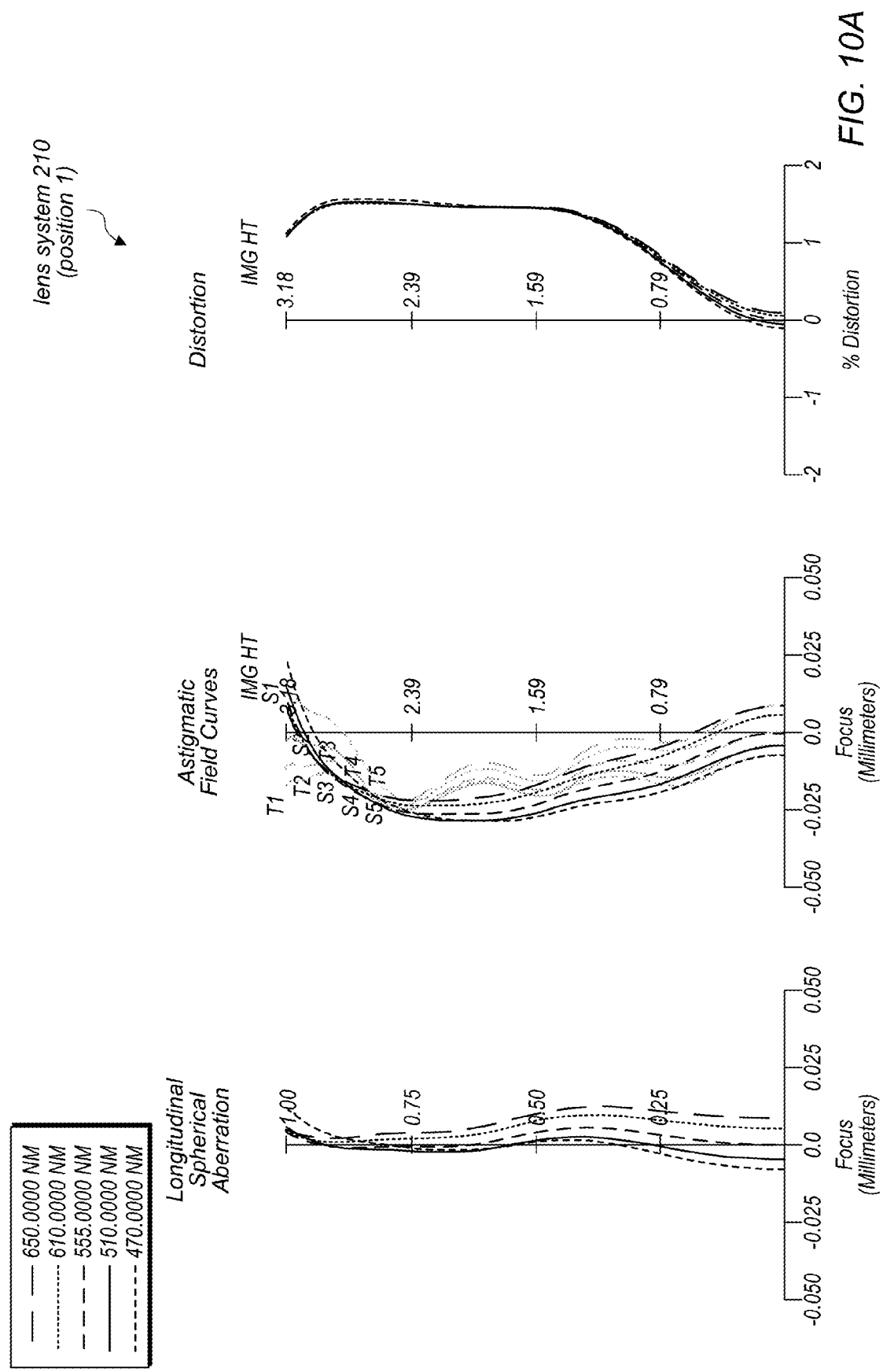
FIG. 10A is a graph illustrating the longitudinal spherical aberration, astigmatic field curves, and distortion for a lens system at an infinity conjugate position as illustrated in FIG. 8A, according to some embodiments.
Figure 10B:
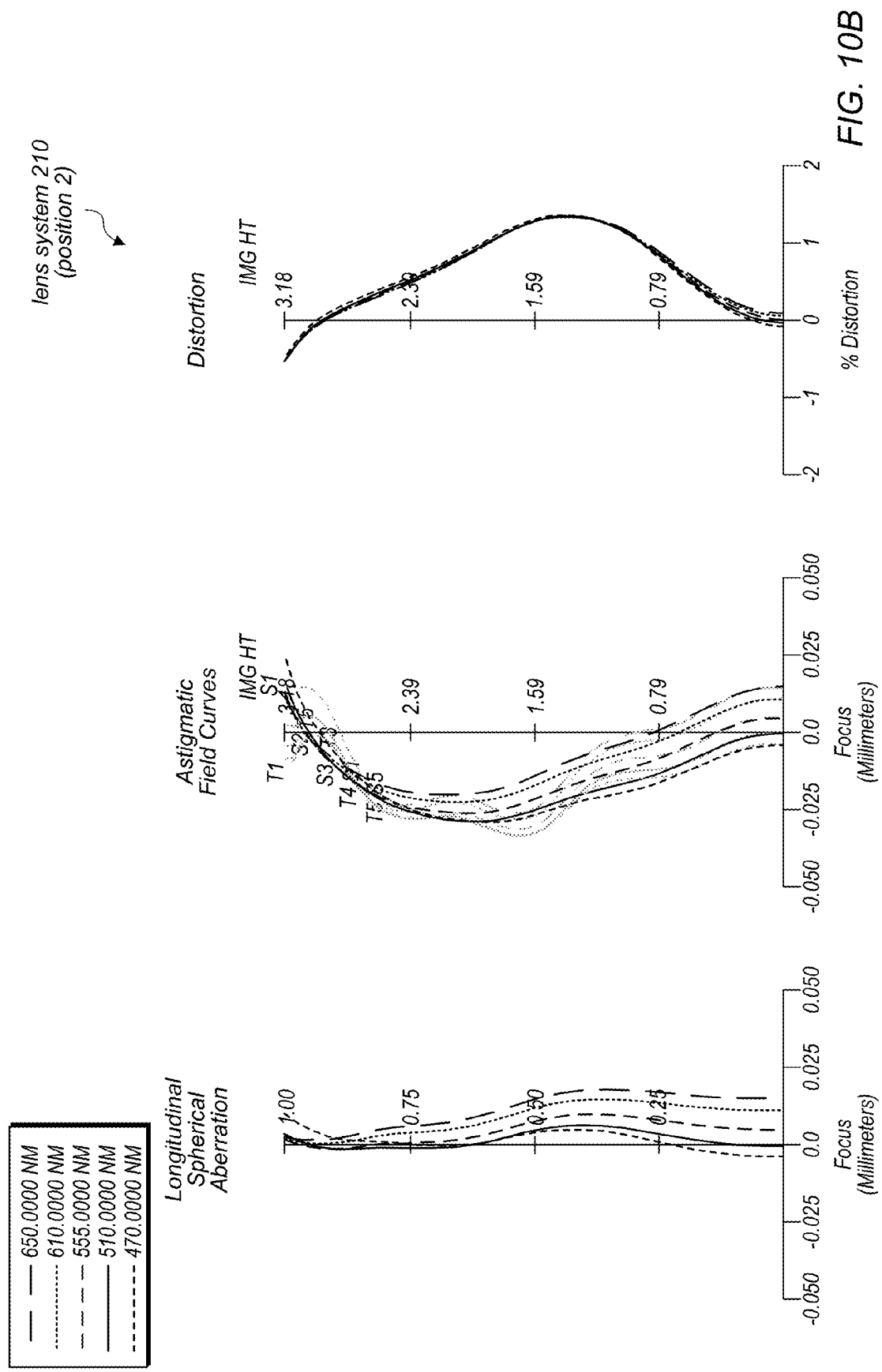
FIG. 10B is a graph illustrating the longitudinal spherical aberration, astigmatic field curves, and distortion for a lens system at a macro conjugate position as illustrated in FIG. 8B, according to some embodiments.
Figure 11A:
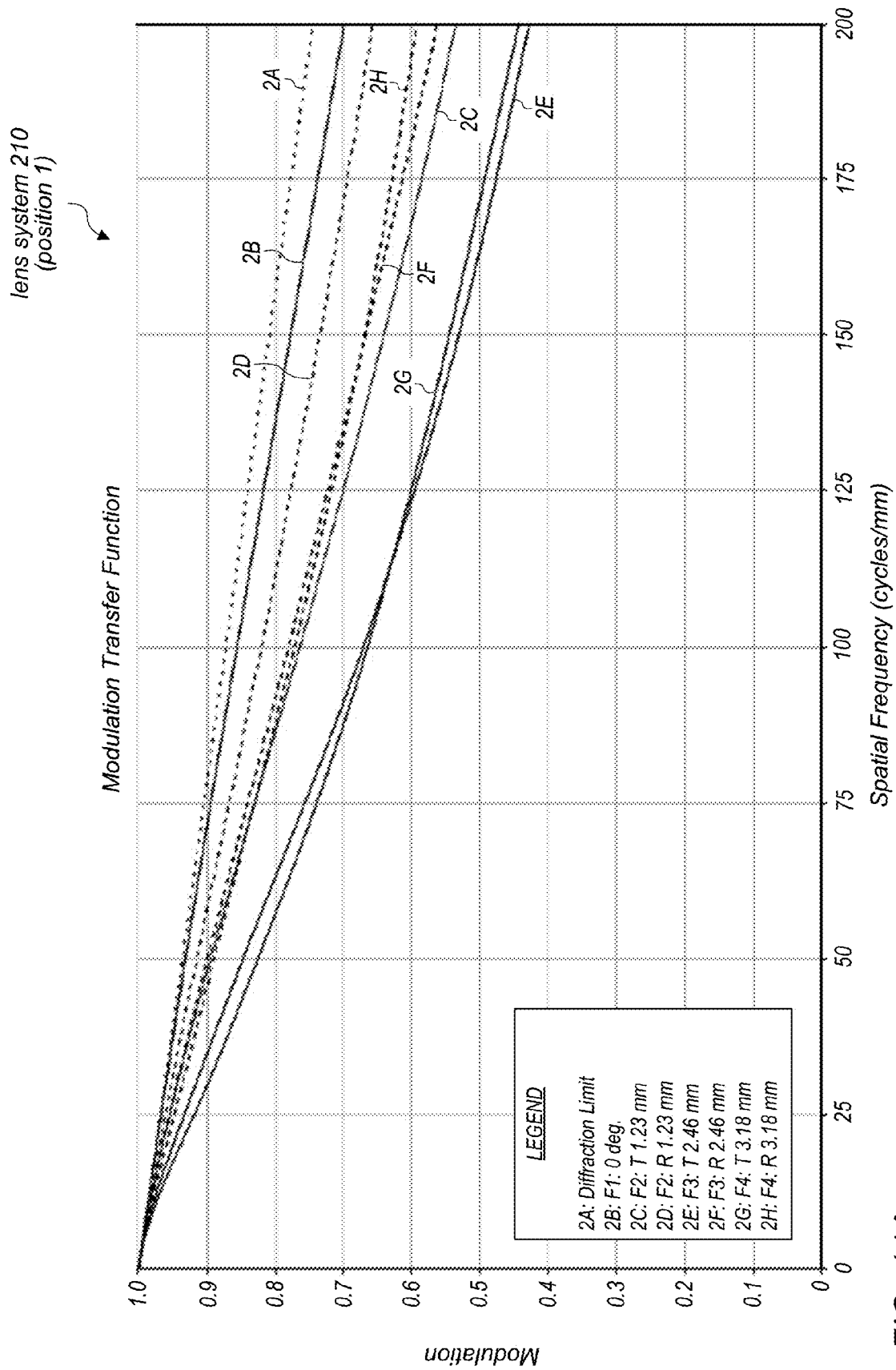
FIG. 11A is a graph illustrating the MTF for a lens system at an infinity conjugate position as illustrated in FIG. 8A, according to some embodiments.
Figure 11B:
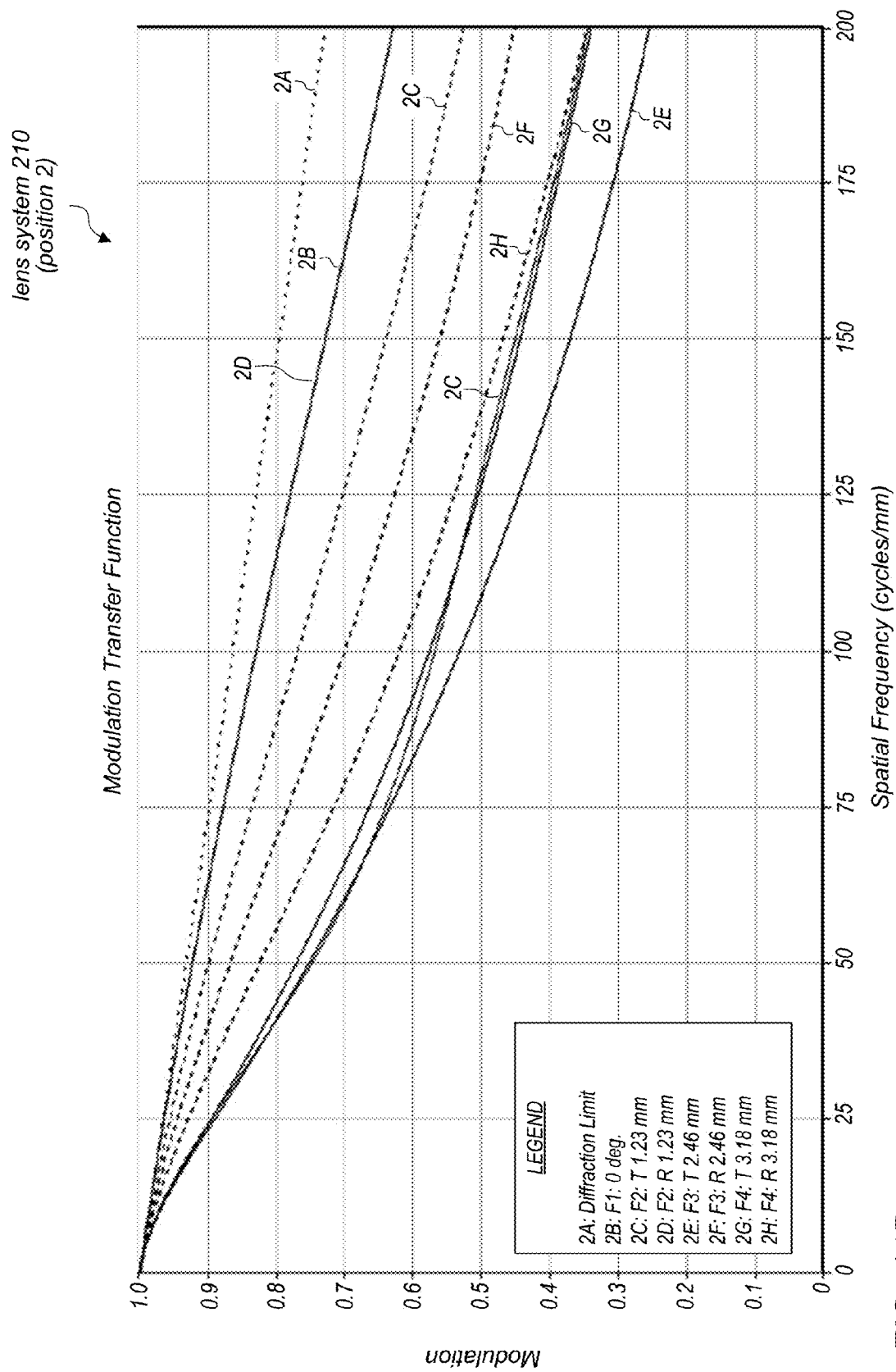
FIG. 11B is a graph illustrating the MTF for a lens system at a macro conjugate position as illustrated in FIG. 8B, according to some embodiments.

FIGS. 9A, 10A, and 11A illustrate performance of the lens system 210 as evaluated with the lens system 210 focused at position 1 (infinity conjugate). FIGS. 9B, 10B, and 11B illustrate performance of the lens system 210 as evaluated with the lens system 210 focused at position 2 (macro conjugate).

FIG. 9A is a graph illustrating the polychromatic ray aberration curve for a lens system 210 at an infinity conjugate position as illustrated in FIG. 8A, according to some embodiments. FIG. 9B is a graph illustrating the polychromatic ray aberration curve for a lens system 210 at a macro conjugate position as illustrated in FIG. 8B, according to some embodiments. FIGS. 9A and 9B show the transverse ray aberration plots evaluated at 0, 0.4, 0.77 and full field, respectively. The on-axis and off-axis aberrations are well balanced across the field of view in both positions.

FIG. 10A is a graph illustrating the longitudinal spherical aberration, astigmatic field curves, and distortion for a lens system 210 at an infinity conjugate position as illustrated in FIG. 8A, according to some embodiments. FIG. 10B is a graph illustrating the longitudinal spherical aberration, astigmatic field curves, and distortion for a lens system 210 at a macro conjugate position as illustrated in FIG. 8B, according to some embodiments. Optical distortion across the field of view is controlled within 2%, while field curvature and astigmatism are well balanced across the field of view in both positions.

FIG. 11A is a graph illustrating the modulation transfer function (MTF) for a lens system 210 at an infinity conjugate position as illustrated in FIG. 8A, according to some embodiments. FIG. 11B is a graph illustrating the MTF for a lens system 210 at a macro conjugate position as illustrated in FIG. 8B, according to some embodiments. FIGS. 11A and 11B shows the lens MTF evaluated at 0 field, 0.4 field, 0.77 field and full field respectively. MTFs at all fields are well beyond 0.5 at 125 line pairs (lp)/mm, showing good contrast for high-resolution imaging.

Third Example Embodiment

Figure 12:
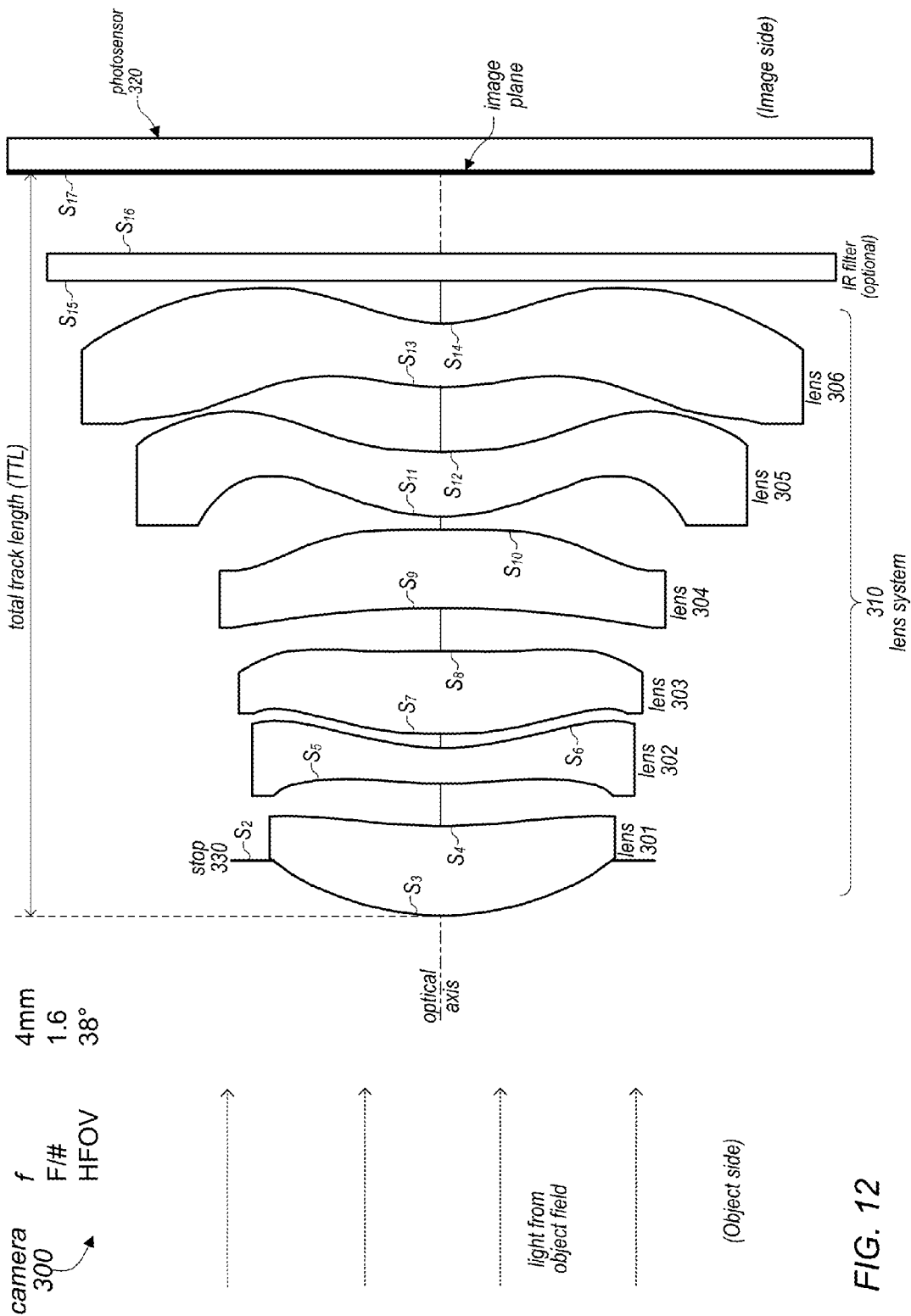
FIG. 12 is a cross-sectional illustration of a compact camera including another example embodiment of a compact lens system.
Figure 13:
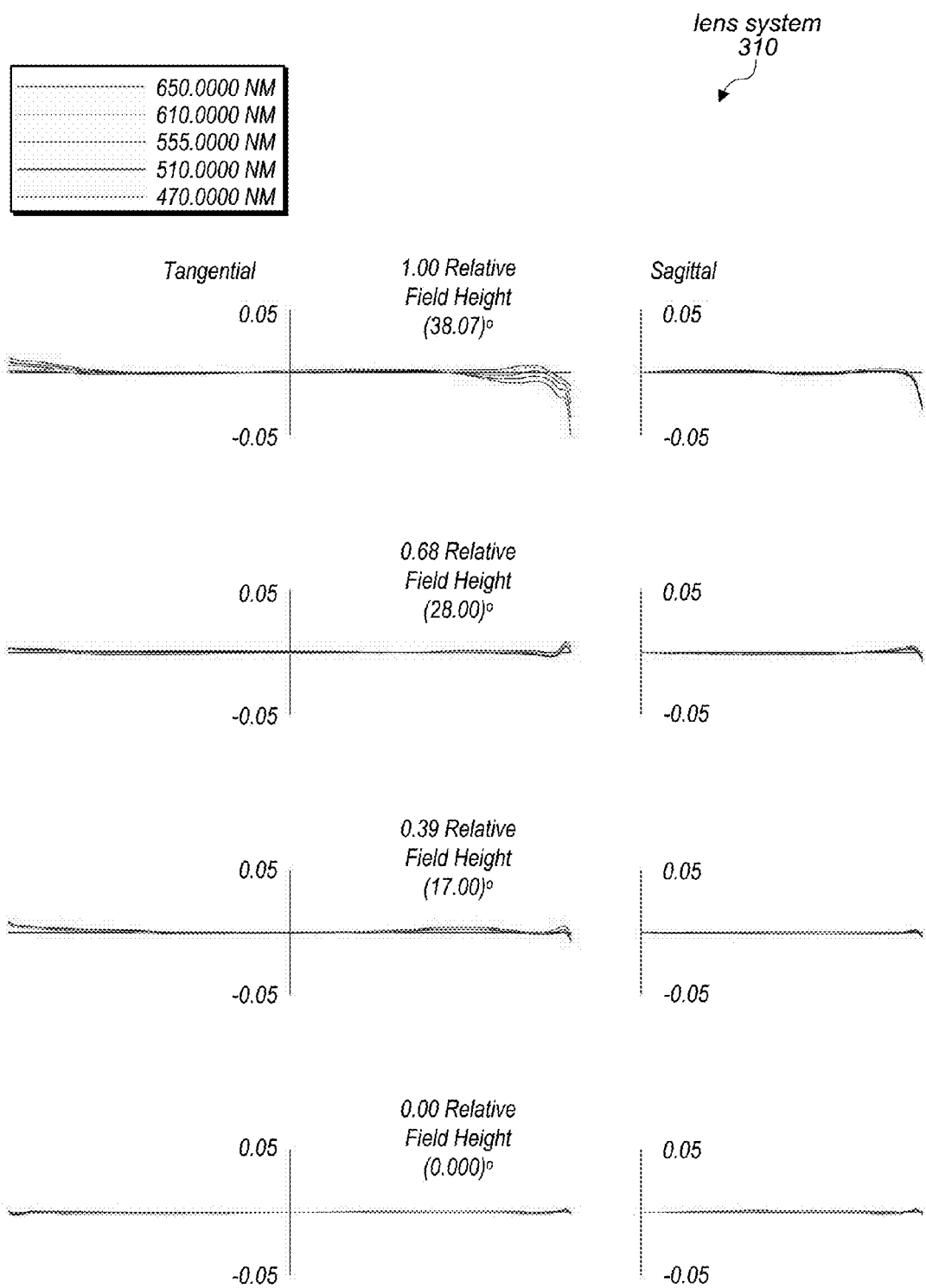
FIG. 13 is a graph illustrating the polychromatic ray aberration curve for a lens system as illustrated in FIG. 12, according to some embodiments.
Figure 14:
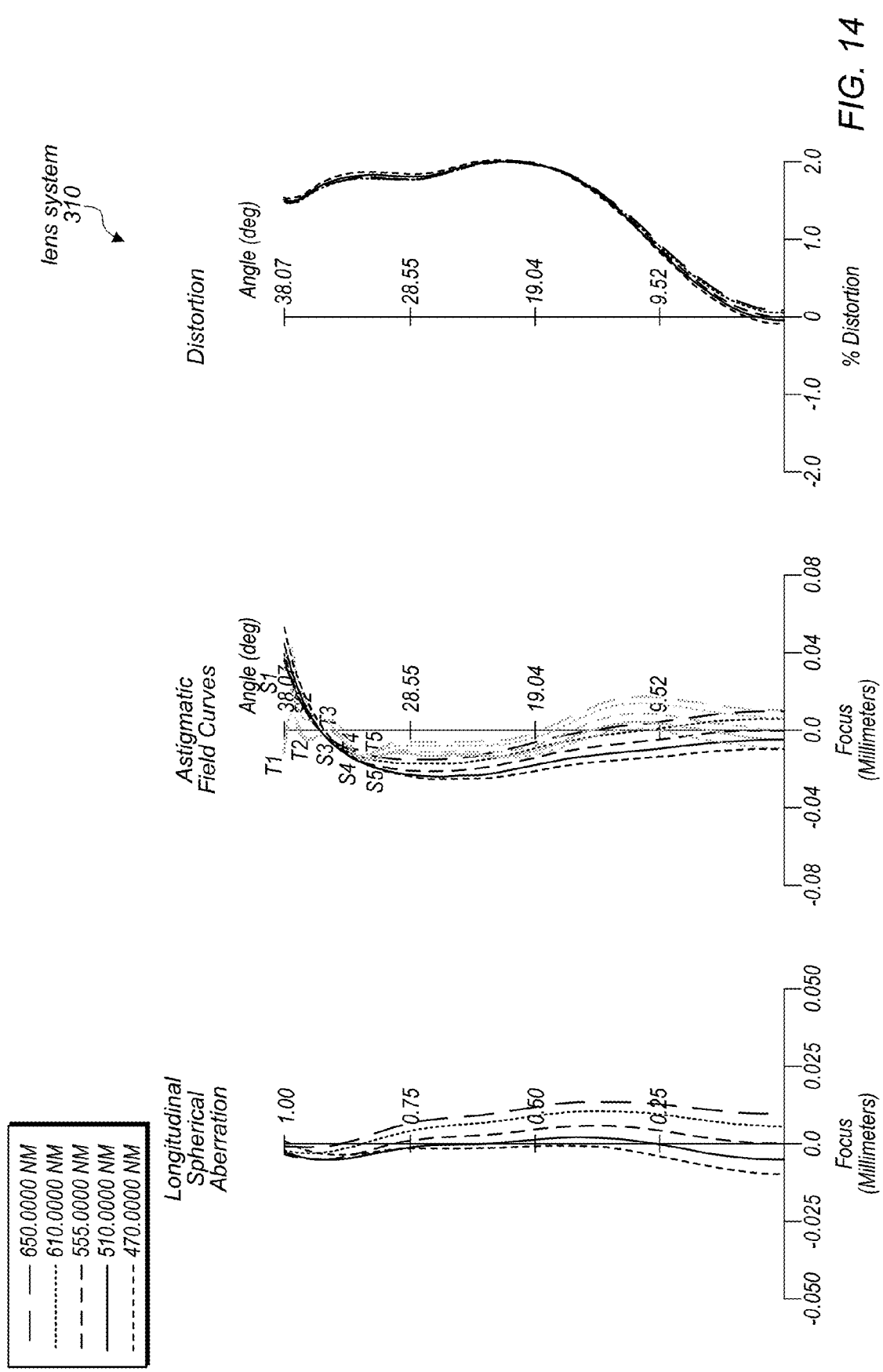
FIG. 14 is a graph illustrating the longitudinal spherical aberration, astigmatic field curves, and distortion for a lens system as illustrated in FIG. 12, according to some embodiments.

FIGS. 12 through 14 illustrate a third example embodiment of a low F-number, wide FOV compact lens system 310 and camera 300 with effective focal length f of 4 mm, F-number of 1.6, and half field of view (HFOV) of 38°. TTL of the lens system may be less than 5.6 mm. Tables 8-10 correspond to an embodiment of a lens system 310 as illustrated in FIG. 12, and provide example values for various optical and physical parameters of the lens system 310 and camera 300 of FIG. 12.

FIG. 12 is a cross-sectional illustration of a compact camera 300 including another example embodiment of a compact lens system 310. Lens system 310 may include six lens elements 301-306 in order along an optical axis of the camera from the first lens 301 on the object side of the camera 300 to the sixth lens 306 on the image side of the camera. Camera 300 includes a photosensor 320 located on the image side of the camera 300. In some embodiments, the position of photosensor 320 relative to the lens system 310 may be adjustable, for example to provide autofocus functionality to the camera 300.

An aperture stop 330 is located in front of the first lens element 301 and behind the front vertex of the lens system 310. However, in some embodiments, the aperture stop 330 may be located at different positions than shown, for example at or in front of the front vertex of the lens system 310, or between the first 301 and second 302 lens elements in the lens system 310. In some embodiments, a secondary stop may be included in the lens system 310, for example between two lens elements in the lens system as illustrated in FIG. 25. While camera 300 with lens system 310 and a single stop 330 as illustrated in FIG. 12 may capture high resolution high quality images with high brightness and a wide field of view without a secondary stop, including a secondary stop may, for example, cut off a portion of the light field at the periphery to provide additional aberration control.

In some embodiments, the camera 300/lens system 310 includes an infrared (IR) filter located between the sixth lens element 306 and the photosensor 320 that may reduce or eliminate interference of environmental noises on the photosensor 320. The IR filter may, for example, be composed of a glass material. However, other materials may be used. In some embodiments, the IR filter does not have refractive power, and does not affect the effective focal length f of the lens system 310.

Further note that embodiments of the camera 300 and/or lens system 310 may also include other components than those illustrated and described herein.

Compact lens system 310 includes six lens elements 301-306 arranged in order along an optical axis from a first refractive lens element (lens 301) on the object side of the lens system 310 to a last lens element (lens 306) on the image side of the lens system 310. Power order of the lens system 310, from lens 301 to lens 306, is PNPNPN. In at least some embodiments, to facilitate correction of aberrations across the field of view and elimination of one type of flare, surface shapes of the lens elements in the lens system 310, in addition to their power arrangement, may be configured according to the criteria and relationships as described in reference to FIGS. 1 through 2B.

Tables 8-10 correspond to an embodiment of a lens system 310 as illustrated in FIG. 12, and provide example values for various optical and physical parameters of the lens system 310 and camera 300 of FIG. 12. Table 8 provides values for parameters of the elements and at the surfaces S0 through S17 of the camera 300, with surface S0 corresponding to the object field, surface S1 corresponding to infinity, surfaces S3-S14 corresponding to object and image side surfaces of the lens elements 301-306 in the lens system 310 (shown as surfaces 11 through 62 in lens system 10 of FIG. 1), surfaces S15 and S16 corresponding to the object and image side surfaces of the IR filter (if present), and surface S17 corresponding to the surface of the photosensor. For each surface (S#) of the camera 300, Table 8 identifies the element, shows the surface number, identifies aspheric surfaces, and shows the radius of curvature (in mm) at the surface, the thickness of the element (where applicable) or separation of the surface from an adjacent surface (in mm), the refractive index $N_d$ of the element (if applicable), and the Abbe number $V_d$ of the element (if applicable).

In some embodiments, at least some of the surfaces S3-S14 of the lens elements 301-306 in lens system 310 are aspheric. Tables 9A through 9C show aspheric coefficients for surfaces S3-S14 of the lens elements 301-306 in lens system 310.

Table 10 provides optical parameters or definitions for the camera 300 and lens system 310 of FIG. 12. As shown in Table 10, effective focal length f of the camera 300 may be 4 mm, F-number (Fno) of the camera 300 may be 1.6, half field of view (HFOV) of the camera 300 may be 38°, chief ray angle (CRA) of the camera 300 may be 32.5°, and Abbe number of the second lens element 302 ($V_2$) may be 23.5. The relationship (1) $f_1/f_{system}$ may be 1.36, the relationship (2) Zh/Za may be 0.79, and the relationship (4) TTL/ImageH may be 1.77. Note that the lens system 310 and camera 300 may meet all of the criteria and relationships as described above with reference to FIGS. 1 through 2B to facilitate correction of aberrations across the field of view of the wide-angle, low F-number compact camera 300 and lens system 310.

FIGS. 13 and 14 illustrate performance of the lens system 310 as evaluated with the lens system 310 focused at infinity.

FIG. 13 is a graph illustrating the polychromatic ray aberration curve for a lens system as illustrated in FIG. 12, according to some embodiments. FIG. 13 shows the transverse ray aberration plots evaluated at 0, 0.4, 0.7 and full field, respectively. The on-axis and off-axis aberrations are well balanced across the field of view.

FIG. 14 is a graph illustrating the longitudinal spherical aberration, astigmatic field curves, and distortion for a lens system as illustrated in FIG. 12, according to some embodiments. Optical distortion across the field of view is controlled within 2%, while field curvature and astigmatism are well balanced across the field of view.

Fourth Example Embodiment

Figure 15:
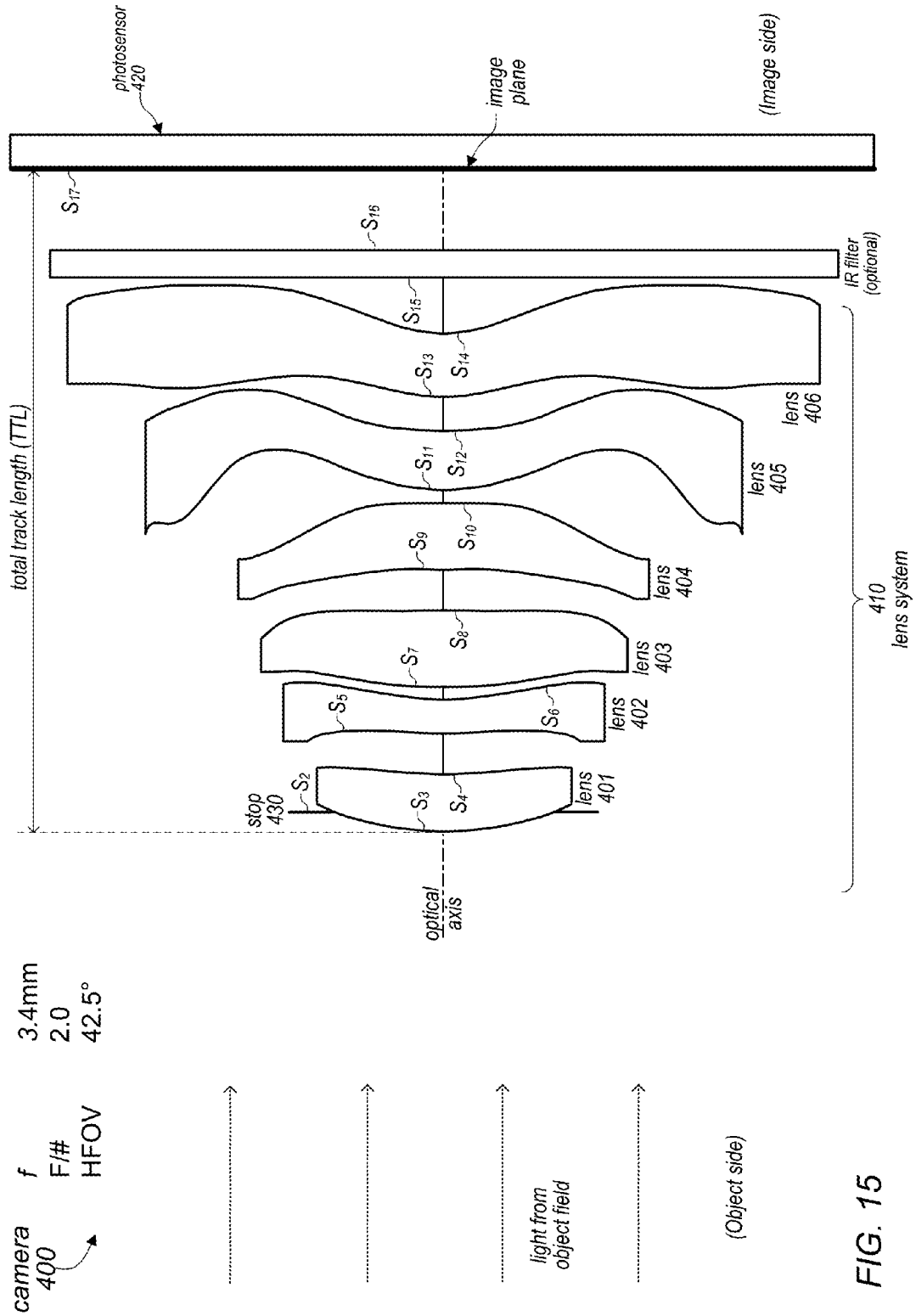
FIG. 15 is a cross-sectional illustration of a compact camera including another example embodiment of a compact lens system.
Figure 16:
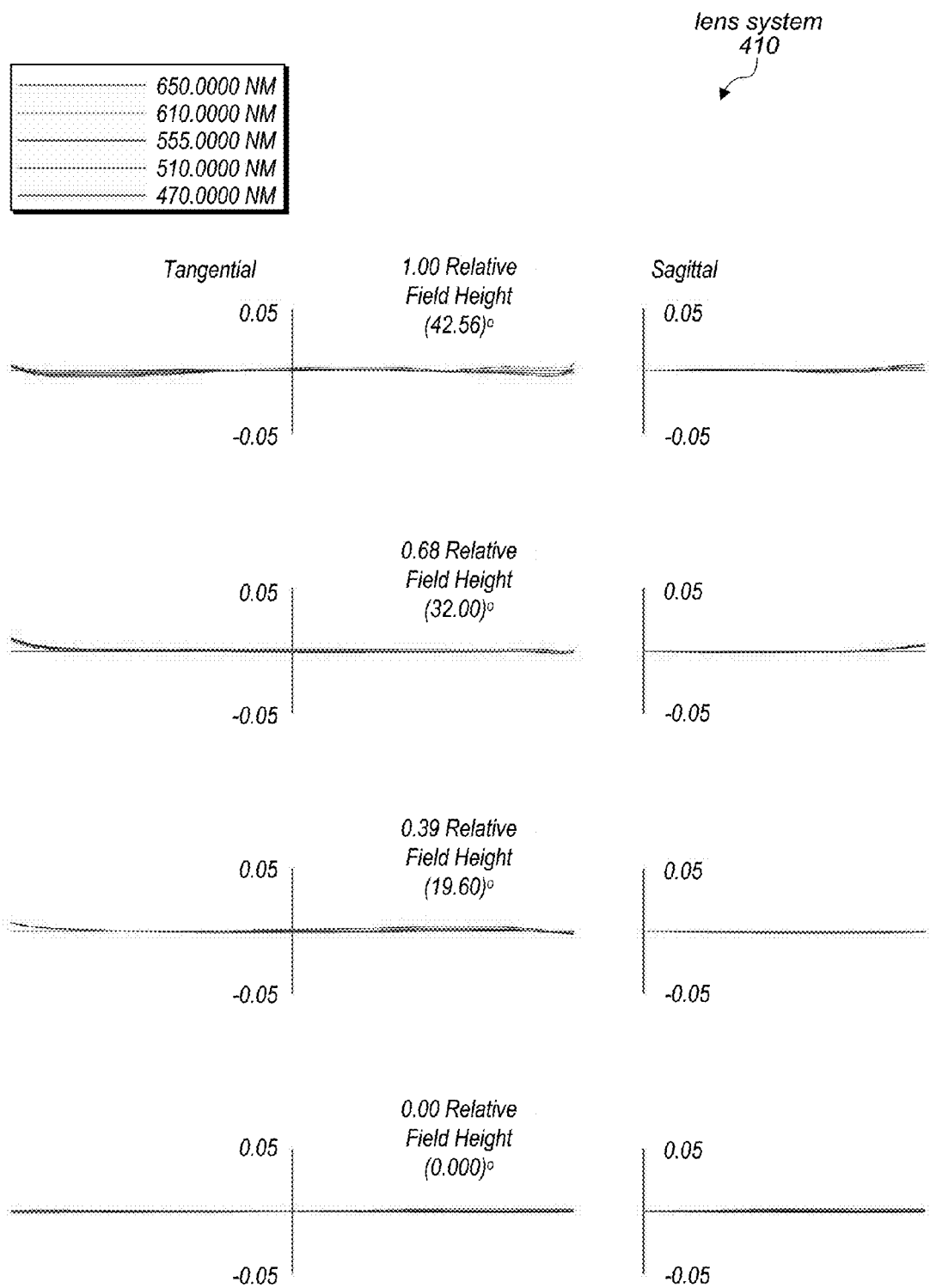
FIG. 16 is a graph illustrating the polychromatic ray aberration curve for a lens system as illustrated in FIG. 15, according to some embodiments.
Figure 17:
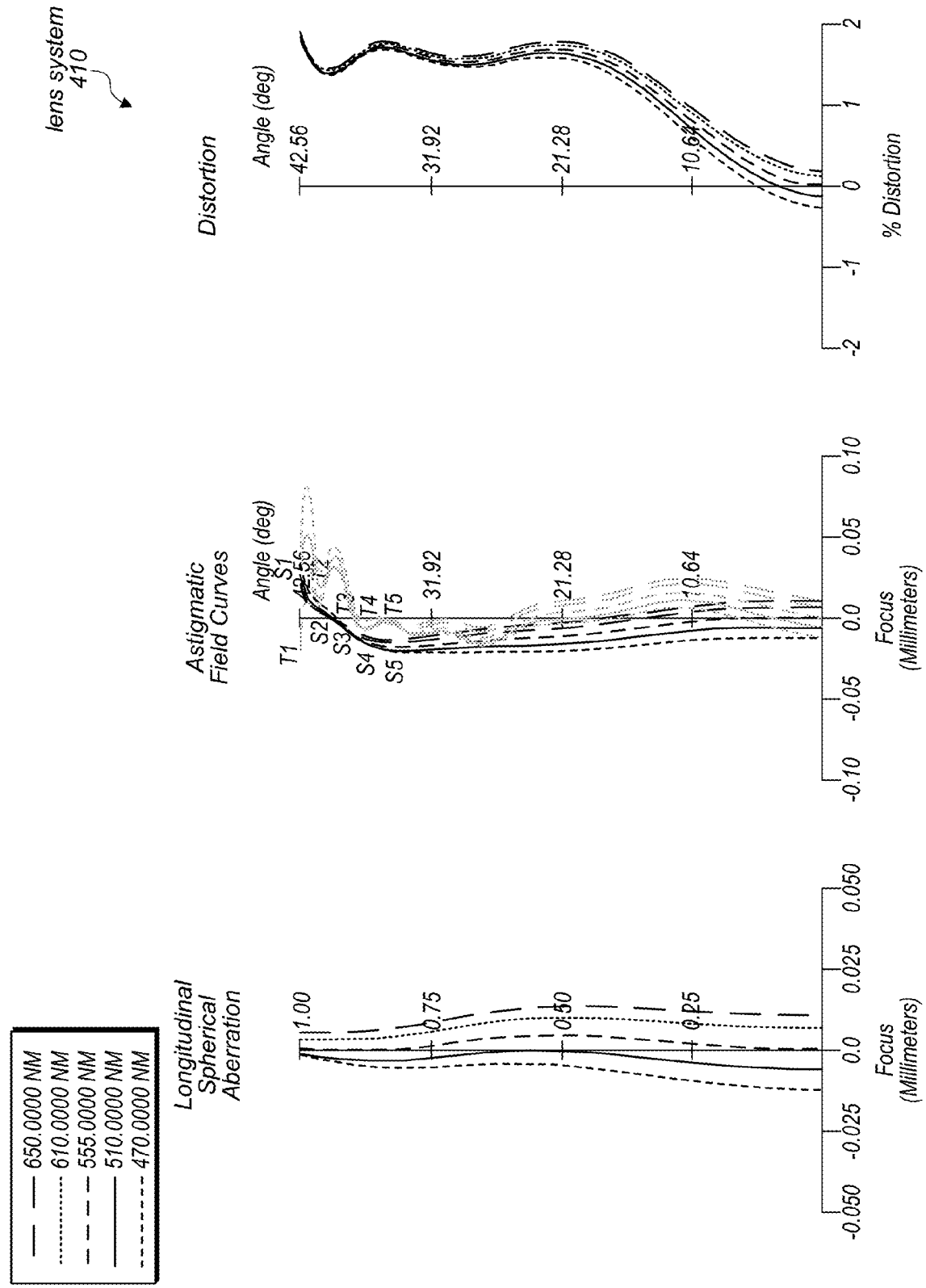
FIG. 17 is a graph illustrating the longitudinal spherical aberration, astigmatic field curves, and distortion for a lens system as illustrated in FIG. 15, according to some embodiments.

FIGS. 15 through 17 illustrate a fourth example embodiment of a low F-number, wide FOV compact lens system 410 and camera 400 with effective focal length f of 3.4 mm, F-number of 2.0, and half field of view (HFOV) of 42.5°. TTL of the lens system may be less than 4.8 mm. Tables 11-13 correspond to an embodiment of a lens system 410 as illustrated in FIG. 15, and provide example values for various optical and physical parameters of the lens system 410 and camera 400 of FIG. 15.

FIG. 15 is a cross-sectional illustration of a compact camera 400 including another example embodiment of a compact lens system 410. Lens system 410 may include six lens elements 401-406 in order along an optical axis of the camera from the first lens 401 on the object side of the camera 400 to the sixth lens 406 on the image side of the camera. Camera 400 includes a photosensor 420 located on the image side of the camera 400. In some embodiments, the position of photosensor 420 relative to the lens system 410 may be adjustable, for example to provide autofocus functionality to the camera 400.

An aperture stop 430 is located in front of the first lens element 401 and behind the front vertex of the lens system 410. However, in some embodiments, the aperture stop 430 may be located at different positions than shown, for example at or in front of the front vertex of the lens system 410, or between the first 401 and second 402 lens elements in the lens system 410. In some embodiments, a secondary stop may be included in the lens system 410, for example between two lens elements in the lens system as illustrated in FIG. 25. While camera 400 with lens system 410 and a single stop 430 as illustrated in FIG. 15 may capture high resolution high quality images with high brightness and a wide field of view without a secondary stop, including a secondary stop may, for example, cut off a portion of the light field at the periphery to provide additional aberration control.

In some embodiments, the camera 400/lens system 410 includes an infrared (IR) filter located between the sixth lens element 306 and the photosensor 420 that may reduce or eliminate interference of environmental noises on the photosensor 420. The IR filter may, for example, be composed of a glass material. However, other materials may be used. In some embodiments, the IR filter does not have refractive power, and does not affect the effective focal length f of the lens system 410.

Further note that embodiments of the camera 400 and/or lens system 410 may also include other components than those illustrated and described herein.

Compact lens system 410 includes six lens elements 401-406 arranged in order along an optical axis from a first refractive lens element (lens 401) on the object side of the lens system 410 to a last lens element (lens 406) on the image side of the lens system 410. Power order of the lens system 410, from lens 401 to lens 406, is PNPNPN. In at least some embodiments, to facilitate correction of aberrations across the field of view and elimination of one type of flare, surface shapes of the lens elements in the lens system 410, in addition to their power arrangement, may be configured according to the criteria and relationships as described in reference to FIGS. 1 through 2B.

Tables 11-13 correspond to an embodiment of a lens system 410 as illustrated in FIG. 15, and provide example values for various optical and physical parameters of the lens system 410 and camera 400 of FIG. 15. Table 11 provides values for parameters of the elements and at the surfaces S0 through S17 of the camera 400, with surface S0 corresponding to the object field, surface S1 corresponding to infinity, surfaces S3-S14 corresponding to object and image side surfaces of the lens elements 401-306 in the lens system 410 (shown as surfaces 11 through 62 in lens system 10 of FIG. 1), surfaces S15 and S16 corresponding to the object and image side surfaces of the IR filter (if present), and surface S17 corresponding to the surface of the photosensor. For each surface (S#) of the camera 400, Table 11 identifies the element, shows the surface number, identifies aspheric surfaces, and shows the radius of curvature (in mm) at the surface, the thickness of the element (where applicable) or separation of the surface from an adjacent surface (in mm), the refractive index $N_d$ of the element (if applicable), and the Abbe number $V_d$ of the element (if applicable).

In some embodiments, at least some of the surfaces S3-S14 of the lens elements 401-406 in lens system 410 are aspheric. Tables 12A through 12C show aspheric coefficients for surfaces S3-S14 of the lens elements 401-406 in lens system 410.

Table 13 provides optical parameters or definitions for the camera 400 and lens system 410 of FIG. 15. As shown in Table 13, effective focal length f of the camera 400 may be 3.4 mm, F-number (Fno) of the camera 400 may be 2.0, half field of view (HFOV) of the camera 300 may be 42.5°, chief ray angle (CRA) of the camera 400 may be 35°, and Abbe number of the second lens element 402 ($V_2$) may be 23.5. The relationship (1) $f_1/f_{system}$ may be 1.46, the relationship (2) Zh/Za may be 0.79, and the relationship (4) TTL/ImageH may be 1.62. Note that the lens system 410 and camera 400 may meet all of the criteria and relationships as described above with reference to FIGS. 1 through 2B to facilitate correction of aberrations across the field of view of the wide-angle, low F-number compact camera 400 and lens system 410.

FIGS. 16 and 17 illustrate performance of the lens system 410 as evaluated with the lens system 410 focused at infinity.

FIG. 16 is a graph illustrating the polychromatic ray aberration curve for a lens system as illustrated in FIG. 15, according to some embodiments. FIG. 16 shows the transverse ray aberration plots evaluated at 0, 0.4, 0.7 and full field, respectively. The on-axis and off-axis aberrations are well balanced across the field of view.

FIG. 17 is a graph illustrating the longitudinal spherical aberration, astigmatic field curves, and distortion for a lens system as illustrated in FIG. 15, according to some embodiments. Optical distortion across the field of view is controlled within 2%, while field curvature and astigmatism are well balanced across the field of view.

Fifth Example Embodiment

Figure 18:
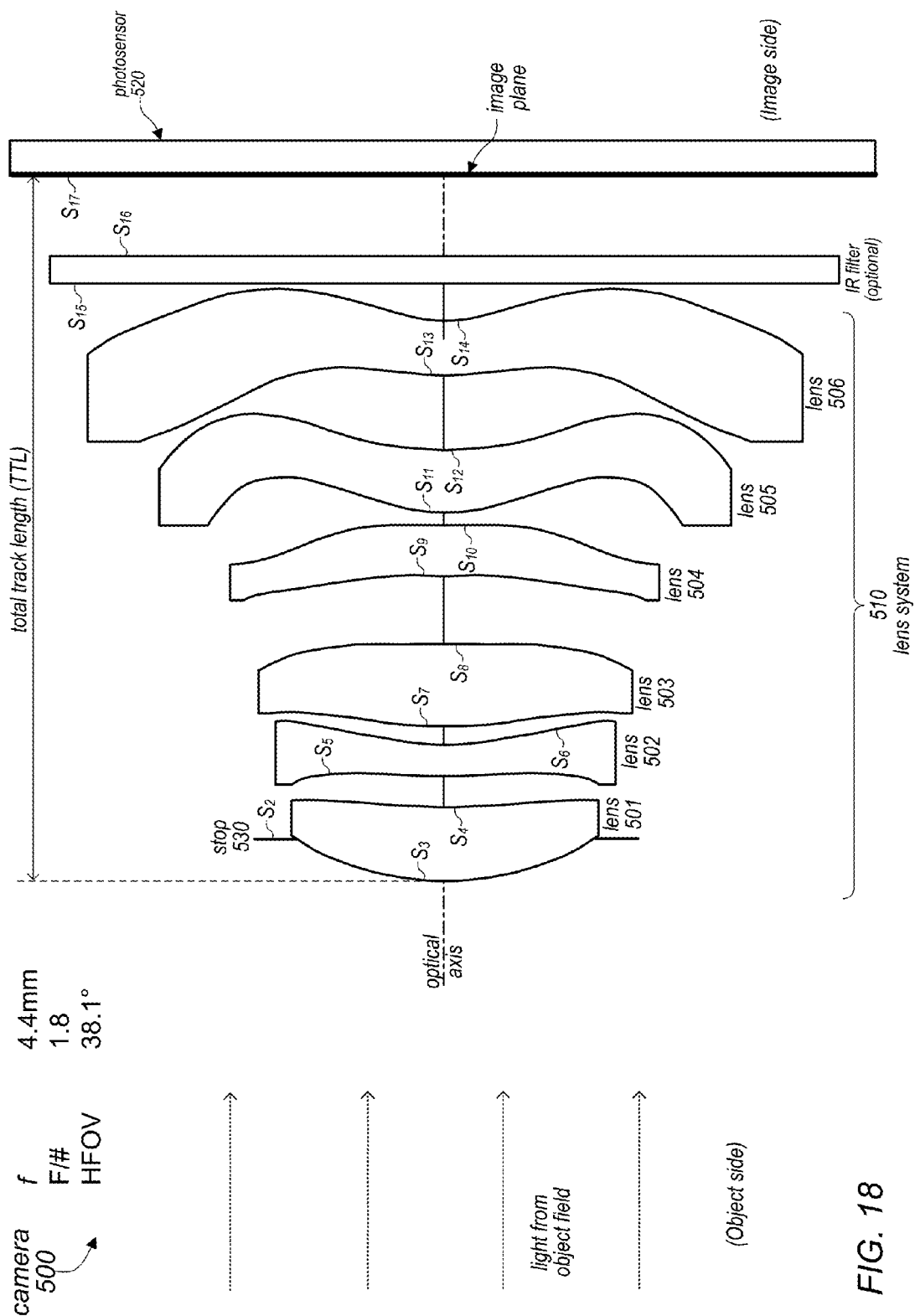
FIG. 18 is a cross-sectional illustration of a compact camera including another example embodiment of a compact lens system.
Figure 19:
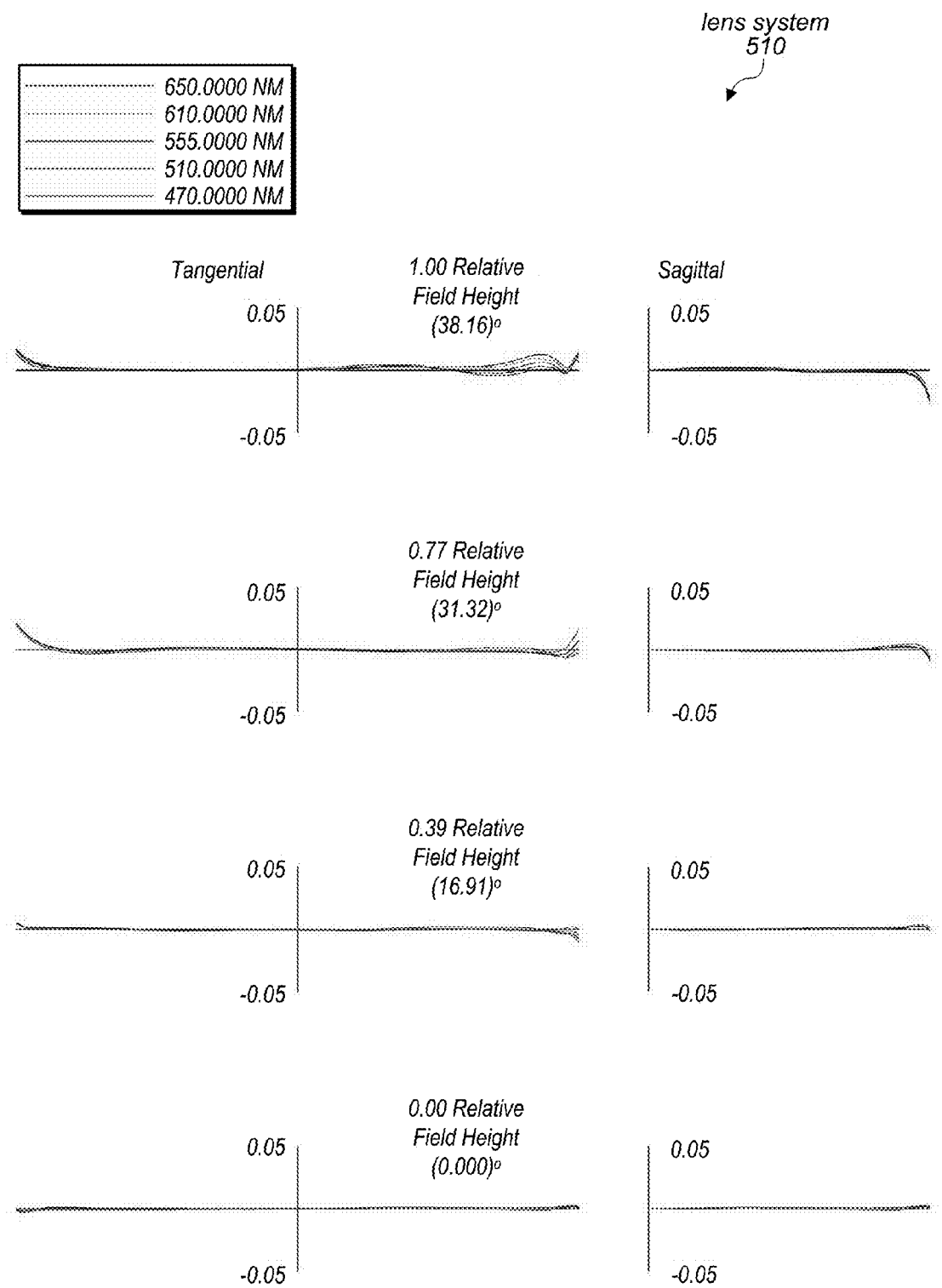
FIG. 19 is a graph illustrating the polychromatic ray aberration curve for a lens system as illustrated in FIG. 18, according to some embodiments.
Figure 20:
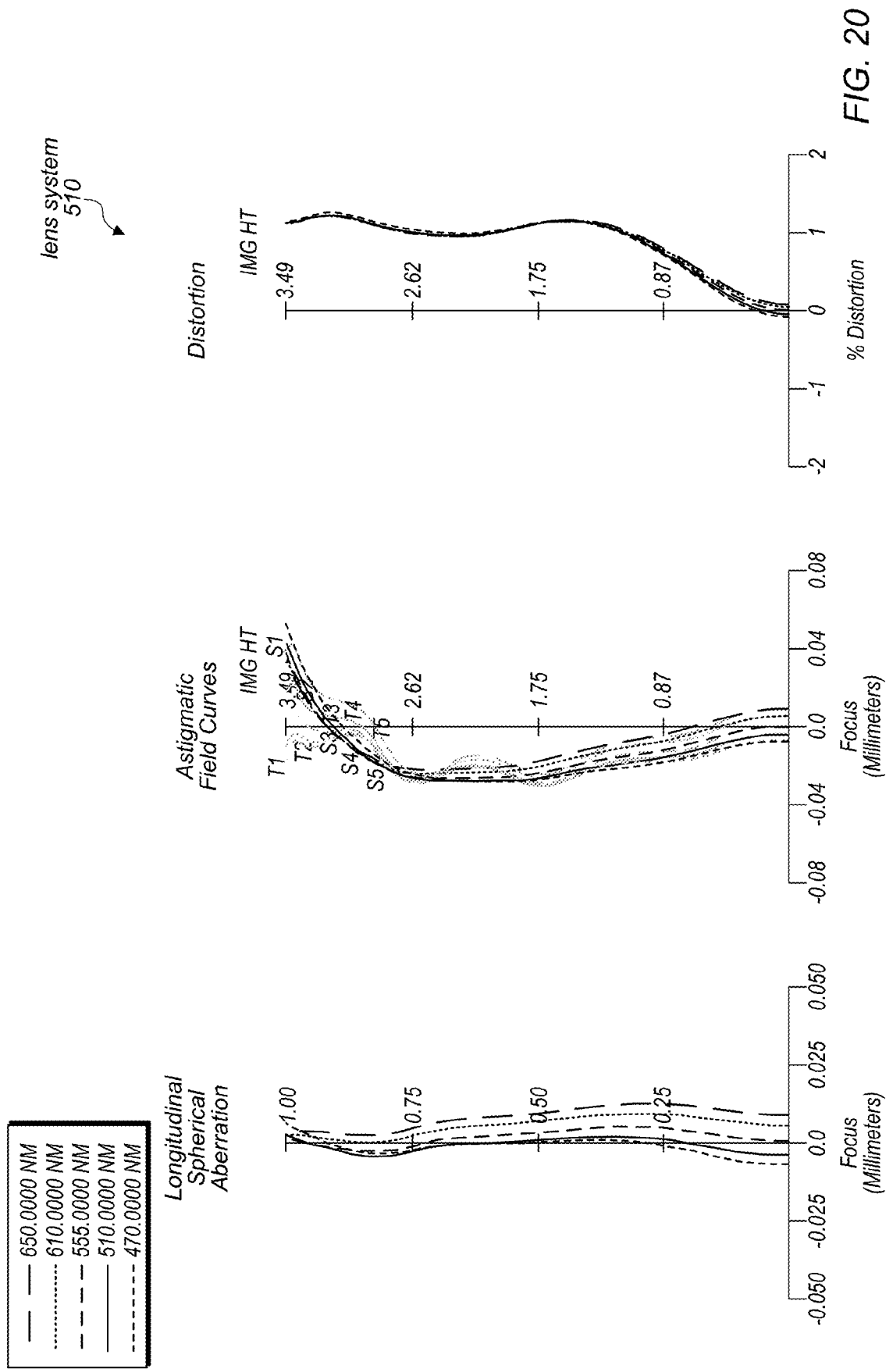
FIG. 20 is a graph illustrating the longitudinal spherical aberration, astigmatic field curves, and distortion for a lens system as illustrated in FIG. 18, according to some embodiments.

FIGS. 18 through 20 illustrate a fifth example embodiment of a low F-number, wide FOV compact lens system 510 and camera 500 with effective focal length f of 4.4 mm, F-number of 1.8, and half field of view (HFOV) of 38.1°. TTL of the lens system may be less than 6.2 mm. Tables 14-16 correspond to an embodiment of a lens system 510 as illustrated in FIG. 18, and provide example values for various optical and physical parameters of the lens system 510 and camera 500 of FIG. 18.

FIG. 18 is a cross-sectional illustration of a compact camera 500 including another example embodiment of a compact lens system 510. Lens system 510 may include six lens elements 501-506 in order along an optical axis of the camera from the first lens 501 on the object side of the camera 500 to the sixth lens 506 on the image side of the camera. Camera 500 includes a photosensor 520 located on the image side of the camera 500. In some embodiments, the position of photosensor 520 relative to the lens system 510 may be adjustable, for example to provide autofocus functionality to the camera 500.

An aperture stop 530 is located in front of the first lens element 501 and behind the front vertex of the lens system 510. However, in some embodiments, the aperture stop 530 may be located at different positions than shown, for example at or in front of the front vertex of the lens system 510, or between the first 501 and second 502 lens elements in the lens system 510. In some embodiments, a secondary stop may be included in the lens system 510, for example between two lens elements in the lens system as illustrated in FIG. 25. While camera 500 with lens system 510 and a single stop 530 as illustrated in FIG. 18 may capture high resolution high quality images with high brightness and a wide field of view without a secondary stop, including a secondary stop may, for example, cut off a portion of the light field at the periphery to provide additional aberration control.

In some embodiments, the camera 500/lens system 510 includes an infrared (IR) filter located between the sixth lens element 506 and the photosensor 520 that may reduce or eliminate interference of environmental noises on the photosensor 520. The IR filter may, for example, be composed of a glass material. However, other materials may be used. In some embodiments, the IR filter does not have refractive power, and does not affect the effective focal length f of the lens system 510.

Further note that embodiments of the camera 500 and/or lens system 510 may also include other components than those illustrated and described herein.

Compact lens system 510 includes six lens elements 501-506 arranged in order along an optical axis from a first refractive lens element (lens 501) on the object side of the lens system 510 to a last lens element (lens 506) on the image side of the lens system 510. Power order of the lens system 510, from lens 501 to lens 506, is PNPNPN. In at least some embodiments, to facilitate correction of aberrations across the field of view and elimination of one type of flare, surface shapes of the lens elements in the lens system 510, in addition to their power arrangement, may be configured according to the criteria and relationships as described in reference to FIGS. 1 through 2B.

Tables 14-16 correspond to an embodiment of a lens system 510 as illustrated in FIG. 18, and provide example values for various optical and physical parameters of the lens system 510 and camera 500 of FIG. 18. Table 14 provides values for parameters of the elements and at the surfaces S0 through S17 of the camera 500, with surface S0 corresponding to the object field, surface S1 corresponding to infinity, surfaces S3-S14 corresponding to object and image side surfaces of the lens elements 501-506 in the lens system 510 (shown as surfaces 11 through 62 in lens system 10 of FIG. 1), surfaces S15 and S16 corresponding to the object and image side surfaces of the IR filter (if present), and surface S17 corresponding to the surface of the photosensor. For each surface (S#) of the camera 500, Table 14 identifies the element, shows the surface number, identifies aspheric surfaces, and shows the radius of curvature (in mm) at the surface, the thickness of the element (where applicable) or separation of the surface from an adjacent surface (in mm), the refractive index $N_d$ of the element (if applicable), and the Abbe number $V_d$ of the element (if applicable).

In some embodiments, at least some of the surfaces S3-S14 of the lens elements 501-506 in lens system 510 are aspheric. Tables 15A through 15C show aspheric coefficients for surfaces S3-S14 of the lens elements 501-506 in lens system 510.

Table 16 provides optical parameters or definitions for the camera 500 and lens system 510 of FIG. 18. As shown in Table 16, effective focal length f of the camera 500 may be 4.4 mm, F-number (Fno) of the camera 500 may be 1.8, half field of view (HFOV) of the camera 500 may be 38.1°, chief ray angle (CRA) of the camera 500 may be 34°, and Abbe number of the second lens element 502 ($V_2$) may be 23.5. The relationship (1) $f_1/f_{system}$ may be 1.39, the relationship (2) Zh/Za may be 0.94, and the relationship (4) TTL/ImageH may be 1.71. Note that the lens system 510 and camera 500 may meet all of the criteria and relationships as described above with reference to FIGS. 1 through 2B to facilitate correction of aberrations across the field of view of the wide-angle, low F-number compact camera 500 and lens system 510.

FIGS. 19 and 20 illustrate performance of the lens system 510 as evaluated with the lens system 510 focused at infinity.

FIG. 19 is a graph illustrating the polychromatic ray aberration curve for a lens system as illustrated in FIG. 18, according to some embodiments. FIG. 19 shows the transverse ray aberration plots evaluated at 0, 0.4, 0.77 and full field, respectively. The on-axis and off-axis aberrations are well balanced across the field of view.

FIG. 20 is a graph illustrating the longitudinal spherical aberration, astigmatic field curves, and distortion for a lens system as illustrated in FIG. 18, according to some embodiments. Optical distortion across the field of view is controlled within 2%, while field curvature and astigmatism are well balanced across the field of view.

Sixth Example Embodiment

Figure 21:
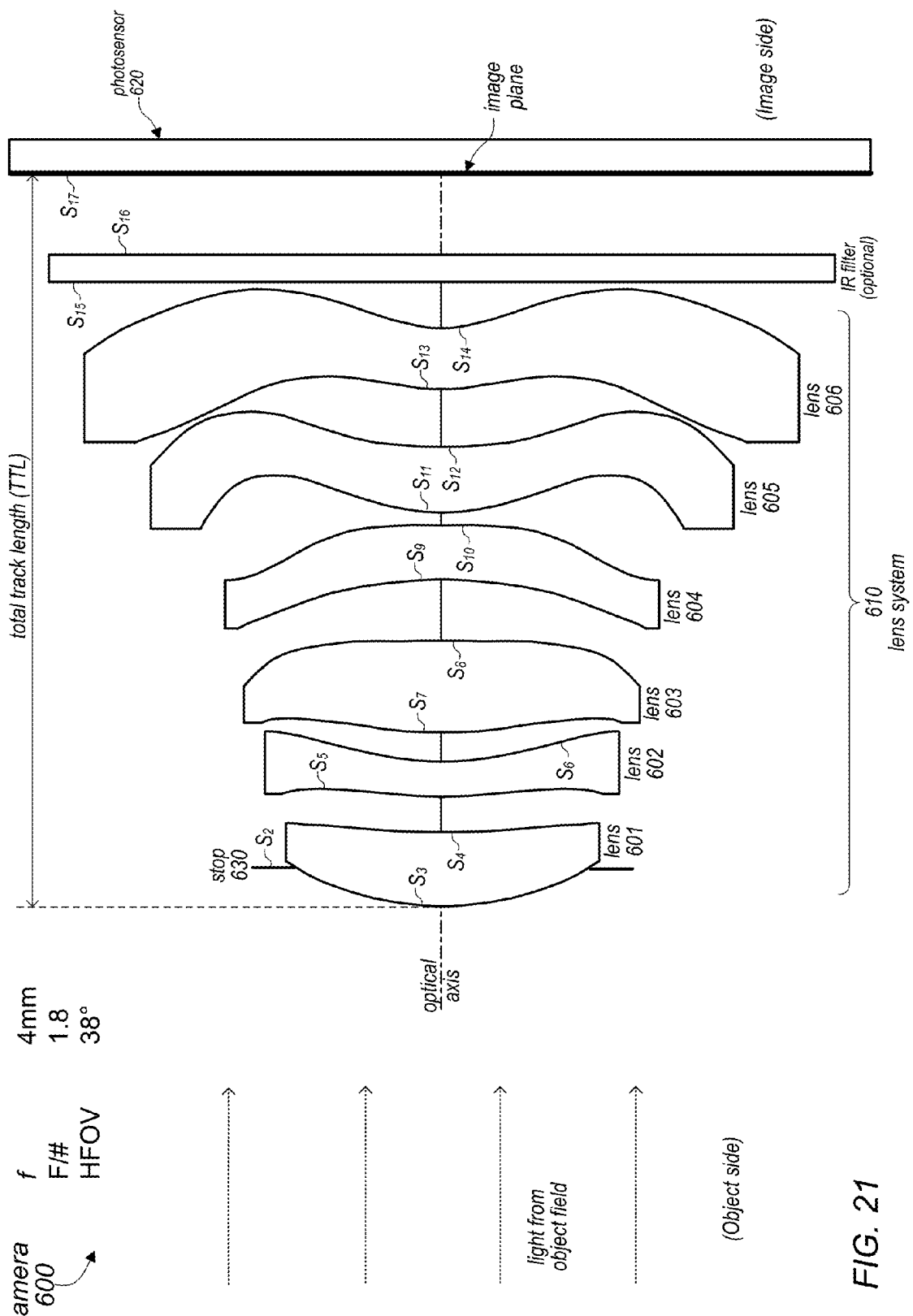
FIG. 21 is a cross-sectional illustration of a compact camera including another example embodiment of a compact lens system.
Figure 22:
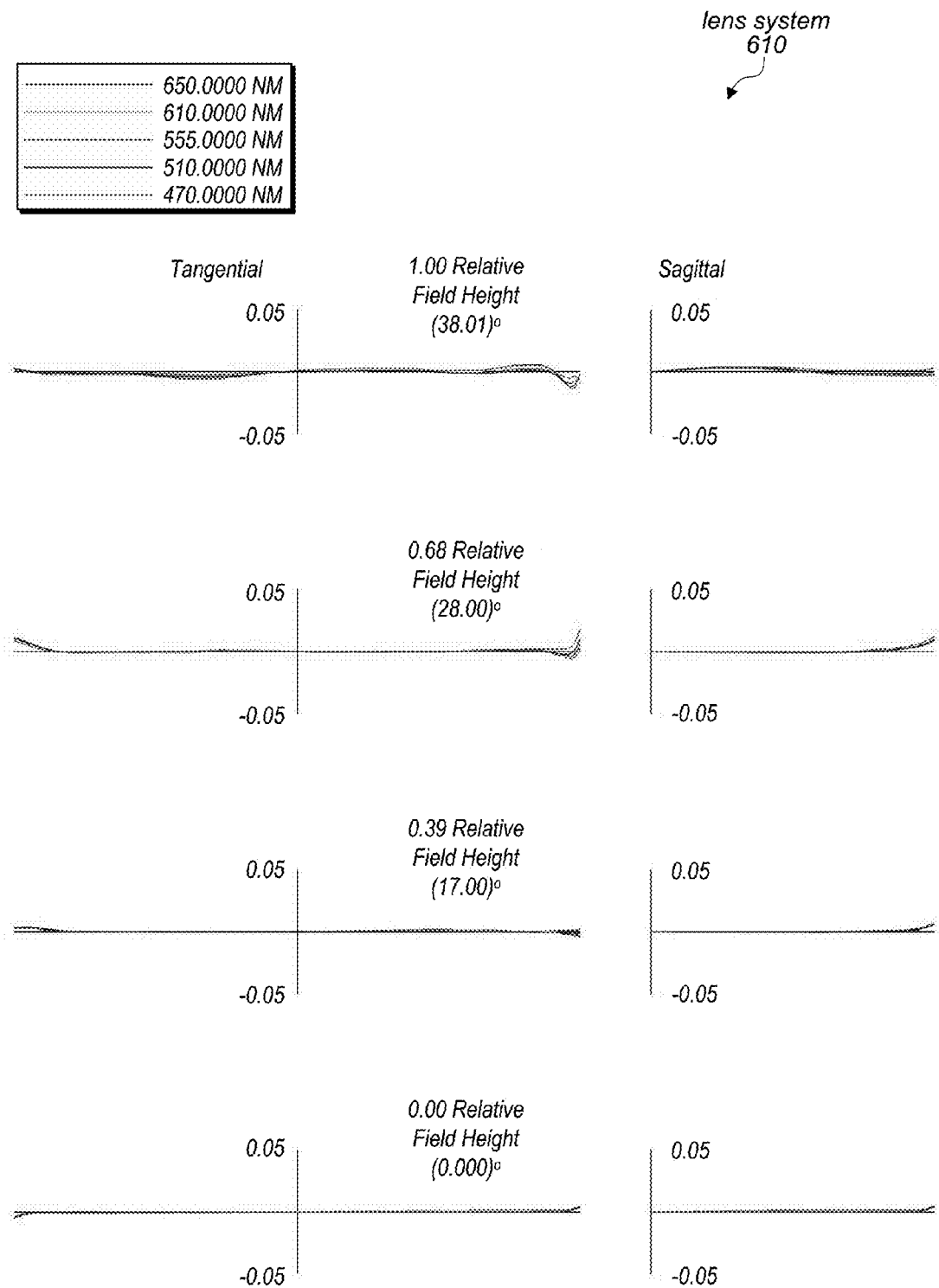
FIG. 22 is a graph illustrating the polychromatic ray aberration curve for a lens system as illustrated in FIG. 21, according to some embodiments.
Figure 23:
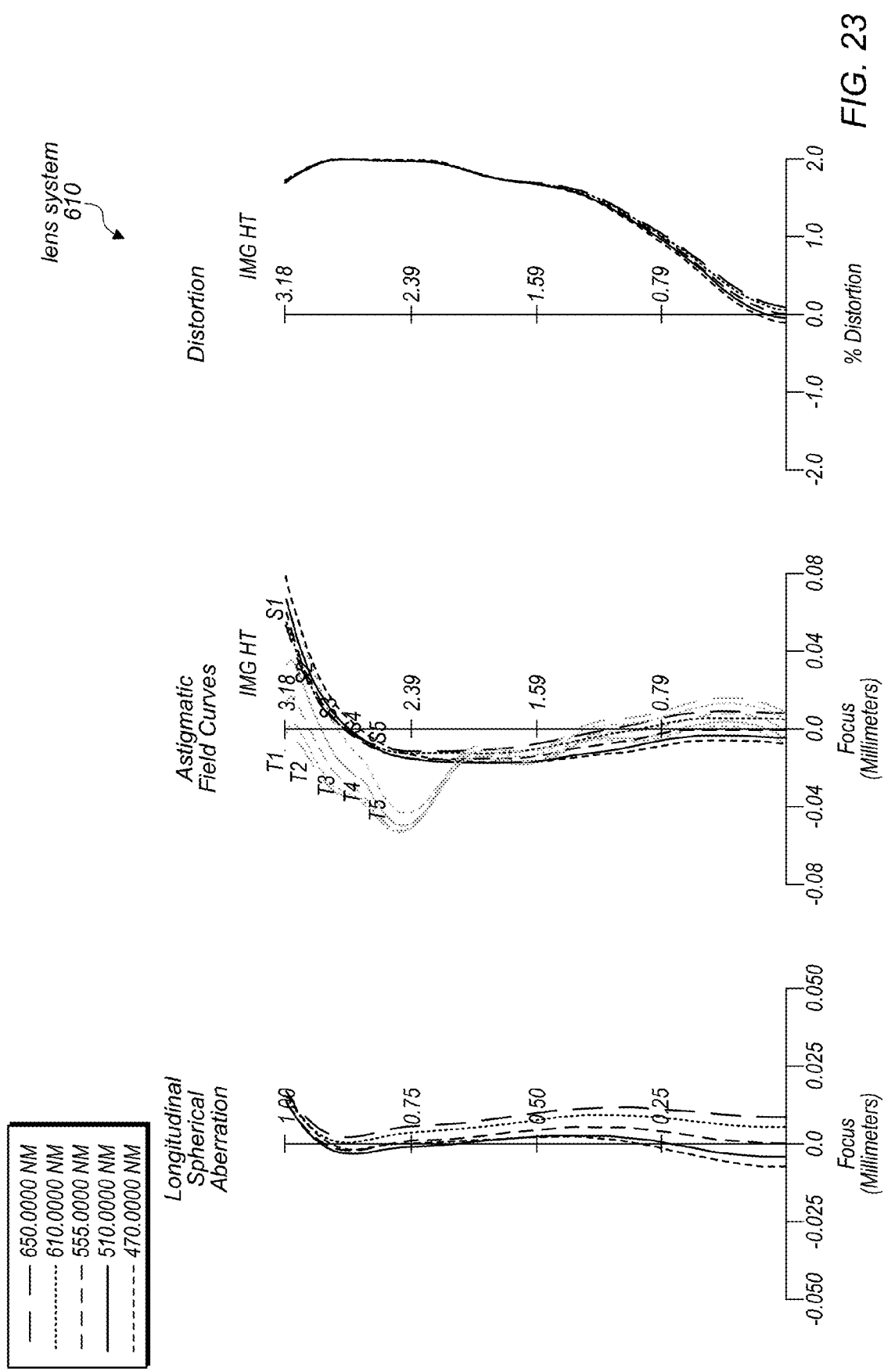
FIG. 23 is a graph illustrating the longitudinal spherical aberration, astigmatic field curves, and distortion for a lens system as illustrated in FIG. 21, according to some embodiments.

FIGS. 21 through 23 illustrate a sixth example embodiment of a low F-number, wide FOV compact lens system 610 and camera 600 with effective focal length f of 4 mm, F-number of 1.8, and half field of view (HFOV) of 38°. TTL of the lens system may be less than 5.6 mm. Tables 17-19 correspond to an embodiment of a lens system 610 as illustrated in FIG. 21, and provide example values for various optical and physical parameters of the lens system 610 and camera 600 of FIG. 21.

FIG. 21 is a cross-sectional illustration of a compact camera 600 including another example embodiment of a compact lens system 610. Lens system 610 may include six lens elements 601-606 in order along an optical axis of the camera from the first lens 601 on the object side of the camera 600 to the sixth lens 606 on the image side of the camera. Camera 600 includes a photosensor 620 located on the image side of the camera 600. In some embodiments, the position of photosensor 620 relative to the lens system 610 may be adjustable, for example to provide autofocus functionality to the camera 600.

An aperture stop 630 is located in front of the first lens element 601 and behind the front vertex of the lens system 610. However, in some embodiments, the aperture stop 630 may be located at different positions than shown, for example at or in front of the front vertex of the lens system 610, or between the first 601 and second 602 lens elements in the lens system 610. In some embodiments, a secondary stop may be included in the lens system 610, for example between two lens elements in the lens system as illustrated in FIG. 25. While camera 600 with lens system 610 and a single stop 630 as illustrated in FIG. 21 may capture high resolution high quality images with high brightness and a wide field of view without a secondary stop, including a secondary stop may, for example, cut off a portion of the light field at the periphery to provide additional aberration control.

In some embodiments, the camera 600/lens system 610 includes an infrared (IR) filter located between the sixth lens element 606 and the photosensor 620 that may reduce or eliminate interference of environmental noises on the photosensor 620. The IR filter may, for example, be composed of a glass material. However, other materials may be used. In some embodiments, the IR filter does not have refractive power, and does not affect the effective focal length f of the lens system 610.

Further note that embodiments of the camera 600 and/or lens system 610 may also include other components than those illustrated and described herein.

Compact lens system 610 includes six lens elements 601-606 arranged in order along an optical axis from a first refractive lens element (lens 601) on the object side of the lens system 610 to a last lens element (lens 606) on the image side of the lens system 610. Power order of the lens system 610, from lens 601 to lens 606, is PNPNPN. In at least some embodiments, to facilitate correction of aberrations across the field of view and elimination of one type of flare, surface shapes of the lens elements in the lens system 610, in addition to their power arrangement, may be configured according to the criteria and relationships as described in reference to FIGS. 1 through 2B.

Tables 17-19 correspond to an embodiment of a lens system 610 as illustrated in FIG. 21, and provide example values for various optical and physical parameters of the lens system 610 and camera 600 of FIG. 21. Table 17 provides values for parameters of the elements and at the surfaces S0 through S17 of the camera 600, with surface S0 corresponding to the object field, surface S1 corresponding to infinity, surfaces S3-S14 corresponding to object and image side surfaces of the lens elements 601-606 in the lens system 610 (shown as surfaces 11 through 62 in lens system 10 of FIG. 1), surfaces S15 and S16 corresponding to the object and image side surfaces of the IR filter (if present), and surface S17 corresponding to the surface of the photosensor. For each surface (S#) of the camera 600, Table 17 identifies the element, shows the surface number, identifies aspheric surfaces, and shows the radius of curvature (in mm) at the surface, the thickness of the element (where applicable) or separation of the surface from an adjacent surface (in mm), the refractive index $N_d$ of the element (if applicable), and the Abbe number $V_d$ of the element (if applicable).

In some embodiments, at least some of the surfaces S3-S14 of the lens elements 601-606 in lens system 610 are aspheric. Tables 18A through 18C show aspheric coefficients for surfaces S3-S14 of the lens elements 601-606 in lens system 610.

Table 19 provides optical parameters or definitions for the camera 600 and lens system 610 of FIG. 21. As shown in Table 19, effective focal length f of the camera 600 may be 4 mm, F-number (Fno) of the camera 600 may be 1.8, half field of view (HFOV) of the camera 600 may be 38°, chief ray angle (CRA) of the camera 600 may be 32.5°, and Abbe number of the second lens element 602 ($V_2$) may be 20.4. The relationship (1) $f_1/f_{system}$ may be 1.49, the relationship (2) Zh/Za may be 0.74, and the relationship (4) TTL/ImageH may be 1.76. Note that the lens system 610 and camera 600 may meet all of the criteria and relationships as described above with reference to FIGS. 1 through 2B to facilitate correction of aberrations across the field of view of the wide-angle, low F-number compact camera 600 and lens system 610.

FIGS. 22 and 23 illustrate performance of the lens system 610 as evaluated with the lens system 610 focused at infinity.

FIG. 22 is a graph illustrating the polychromatic ray aberration curve for a lens system as illustrated in FIG. 21, according to some embodiments. FIG. 22 shows the transverse ray aberration plots evaluated at 0, 0.4, 0.7 and full field, respectively. The on-axis and off-axis aberrations are well balanced across the field of view.

FIG. 23 is a graph illustrating the longitudinal spherical aberration, astigmatic field curves, and distortion for a lens system as illustrated in FIG. 21, according to some embodiments. Optical distortion across the field of view is controlled within 2%, while field curvature and astigmatism are well balanced across the field of view.

Example Lens System Tables

The following Tables provide example values for various optical and physical parameters of the example embodiments of the lens systems and cameras as described in reference to FIGS. 4 through 23. Tables 1-3 correspond to an example embodiment of a lens system 110 as illustrated in FIG. 4. Tables 4-7 correspond to an example embodiment of a lens system 210 as illustrated in FIGS. 8A and 8B. Tables 8-10 correspond to an example embodiment of a lens system 310 as illustrated in FIG. 12. Tables 11-13 correspond to an example embodiment of a lens system 410 as illustrated in FIG. 15. Tables 14-16 correspond to an example embodiment of a lens system 510 as illustrated in FIG. 18. Tables 17-19 correspond to an example embodiment of a lens system 610 as illustrated in FIG. 21.

In the Tables, all dimensions are in millimeters (mm) unless otherwise specified. "S#" stands for surface number. A positive radius indicates that the center of curvature is to the right (object side) of the surface. A negative radius indicates that the center of curvature is to the left (image side) of the surface. "INF" stands for infinity (as used in optics). The thickness (or separation) is the axial distance to the next surface. CRA stands for chief ray angle. Fno stands for F-number of the lens system. HFOV stands for half field of view (full field of view=2*HFOV). $V_2$ is the Abbe number of the second lens element. f stands for effective focal length of the lens system (also designated herein as $f_{system}$ or f). f1 stands for focal length of the first lens element. ImageH is the semi-diagonal image height on the image plane at the photosensor of the camera. TTL is the total track length of the lens system.

For the materials of the lens elements and IR filter, a refractive index $N_d$ at the helium d-line wavelength is provided, as well as an Abbe number $V_d$ relative to the d-line and the C- and F-lines of hydrogen. The Abbe number, Vd, may be defined by the equation:

$$V_d = (N_d-1)/(N_F-N_C),$$

where $N_F$ and $N_C$ are the refractive index values of the material at the F and C lines of hydrogen, respectively.

Referring to the Tables of aspheric coefficients (Tables, 2A-2C, 5A-5C, 9A-9C, 12A-12C, 15A-15C, and 18A-18C), the aspheric equation describing an aspherical surface may be given by:

$$Z = \frac{cr^2}{1 + sqrt[1 - (1+K)c^2r^2]} + A_4r^4 + A_6r^6 + A_8r^8 +$$
$$A_{10}r^{10} + A_{12}r^{12} + A_{14}r^{14} + A_{16}r^{16} + A_{18}r^{18} + A_{20}r^{20}.$$

where Z is the sag of surface parallel to the z-axis (the z-axis and the optical axis (AX) are coincident in these example embodiments), r is the radial distance from the vertex, c is the curvature at the pole or vertex of the surface (the reciprocal of the radius of curvature of the surface), K is the conic constant, and $A_4$-$A_{20}$ are the aspheric coefficients. In the Tables, "E" denotes the exponential notation (powers of 10).

Note that the values given in the following Tables for the various parameters in the various embodiments of the lens system are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the lens system. In particular, note that some values in the Tables may be scaled up or down for larger or smaller implementations of a camera using an embodiment of a lens system as described herein.

Further note that surface numbers (S#) of the elements in the various embodiments of the lens system as shown in the Tables are listed from a first surface 0 at the object plane to a last surface at the image plane/photosensor surface.

TABLE 1

Lens system 110
Fno = 1.8, HFOV = 38 deg

| Element | Surface (S#) | Radius (mm) | Thickness or separation (mm) | Refractive Index $N_d$ | Abbe Number $V_d$ |
|---|---|---|---|---|---|
| Object | 0 | Inf | Inf | | |
| | 1 | Inf | 0.2967 | | |
| Ape. Stop | 2 | Inf | −0.2967 | | |
| Lens 1 | *3 | 2.2001 | 0.5857 | 1.545 | 56.0 |
| | *4 | 7.8533 | 0.3165 | | |
| Lens 2 | *5 | 3.9452 | 0.2540 | 1.640 | 23.5 |
| | *6 | 1.8392 | 0.1433 | | |
| Lens 3 | *7 | 3.7628 | 0.6553 | 1.545 | 56.0 |
| | *8 | −9.1748 | 0.3100 | | |
| Lens 4 | *9 | −4.8096 | 0.5241 | 1.545 | 56.0 |
| | *10 | 9.2340 | 0.1000 | | |
| Lens 5 | *11 | 1.4328 | 0.5271 | 1.545 | 56.0 |
| | *12 | 4.9841 | 0.4706 | | |
| Lens 6 | *13 | 1.7349 | 0.4500 | 1.545 | 56.0 |
| | *14 | 1.0513 | 0.3034 | | |
| Filter | 15 | Inf | 0.2100 | 1.517 | 64.2 |
| | 16 | Inf | 0.6000 | | |
| Sensor | 17 | Inf | 0.0000 | | |

*Annotates aspheric surfaces (aspheric coefficient given in Tables 2A-2C)

TABLE 2A

ASPHERIC COEFFICIENTS (Lens System 110)

| | Surface (S#) | | | |
|---|---|---|---|---|
| | S3 | S4 | S5 | S6 |
| K | 0 | 0 | 0 | 0 |
| A4 | 1.94742E−03 | −3.06430E−02 | −2.34868E−01 | −2.42440E−01 |
| A6 | 3.01649E−03 | 3.08167E−02 | 1.52848E−01 | 1.79201E−01 |
| A8 | 7.79493E−03 | −1.92082E−02 | −5.71983E−02 | −1.26144E−01 |

TABLE 2A-continued

ASPHERIC COEFFICIENTS (Lens System 110)

| | Surface (S#) | | | |
|---|---|---|---|---|
| | S3 | S4 | S5 | S6 |
| A10 | −1.61730E−02 | −2.31225E−03 | −2.28201E−02 | 6.61102E−02 |
| A12 | 1.51498E−02 | 1.13409E−02 | 3.23800E−02 | −2.65255E−02 |
| A14 | −5.33754E−03 | −7.34768E−03 | −1.47561E−02 | 4.54964E−03 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 2B

ASPHERIC COEFFICIENTS (Lens System 110)

| | Surface (S#) | | | |
|---|---|---|---|---|
| | S7 | S8 | S9 | S10 |
| K | 0 | 0 | 0 | 0 |
| A4 | −6.40257E−03 | −1.13243E−02 | −6.24328E−02 | −3.55800E−01 |
| A6 | −7.56965E−03 | 2.65339E−02 | 1.07479E−01 | 2.75575E−01 |
| A8 | −2.69463E−02 | −4.56762E−02 | −1.29872E−01 | −1.54492E−01 |
| A10 | 3.07352E−02 | 2.14388E−02 | 9.49171E−02 | 5.96377E−02 |
| A12 | −2.02858E−02 | −8.08709E−03 | −3.91544E−02 | −1.43857E−02 |
| A14 | 4.61602E−03 | 1.67454E−03 | 8.33900E−03 | 4.49095E−03 |
| A16 | 0.00000E+00 | 0.00000E+00 | −2.96682E−04 | −1.59437E−03 |
| A18 | 0.00000E+00 | 0.00000E+00 | −1.64410E−04 | 2.27097E−04 |
| A20 | 0.00000E+00 | 0.00000E+00 | 0.00000E+00 | 0.00000E+00 |

TABLE 2C

ASPHERIC COEFFICIENTS (Lens System 110)

| | Surface (S#) | | | |
|---|---|---|---|---|
| | S11 | S12 | S13 | S14 |
| K | −1 | 0 | −1 | −1 |
| A4 | −1.33939E−01 | 1.76831E−01 | −3.35772E−01 | −4.10700E−01 |
| A6 | 6.65563E−02 | −1.48911E−01 | 9.43709E−02 | 2.52834E−01 |
| A8 | −4.72003E−02 | 2.53123E−02 | 5.16187E−02 | −1.22801E−01 |
| A10 | −5.72527E−03 | 1.70834E−02 | −7.01966E−02 | 4.26734E−02 |
| A12 | 2.25401E−02 | −1.15030E−02 | 3.50377E−02 | −1.02969E−02 |
| A14 | −1.11988E−02 | 3.00751E−03 | −9.52759E−03 | 1.69864E−03 |
| A16 | 2.26626E−03 | −3.78263E−04 | 1.47430E−03 | −1.83493E−04 |
| A18 | −1.64895E−04 | 1.87296E−05 | −1.21780E−04 | 1.16681E−05 |
| A20 | 0.00000E+00 | 1.19759E−08 | 4.16141E−06 | −3.29217E−07 |

TABLE 3

Optical Definitions (Lens system 110)

| f[mm] | 4 | fl/f | 1.35 |
|---|---|---|---|
| Fno | 1.8 | Zh/Za | 0.82 |
| HFOV[deg] | 38° | TTL/ImageH | 1.77 |
| $V_2$ | 23.5 | CRA | 33° |

TABLE 4

Lens system 210
Fno = 1.8, HFOV = 38.2 deg

| Element | Surface (S#) | Radius (mm) | Thickness or separation (mm) | Refractive Index $N_d$ | Abbe Number $V_d$ |
|---|---|---|---|---|---|
| Object | 0 | Inf | Inf**1 | | |
| | 1 | Inf | 0.2832 | | |

TABLE 4-continued

Lens system 210
Fno = 1.8, HFOV = 38.2 deg

| Element | Surface (S#) | Radius (mm) | Thickness or separation (mm) | Refractive Index $N_d$ | Abbe Number $V_d$ |
|---|---|---|---|---|---|
| Ape. Stop | 2 | Inf | −0.2832 | | |
| Lens 1 | *3 | 2.2650 | 0.5521 | 1.545 | 56.0 |
|  | *4 | 6.3335 | 0.3119 | | |
| Lens 2 | *5 | 3.5188 | 0.2540 | 1.661 | 20.4 |
|  | *6 | 1.9758 | 0.1780 | | |
| Lens 3 | *7 | 4.0656 | 0.6328 | 1.545 | 56.0 |
|  | *8 | −10.4120 | 0.4475 | | |
| Lens 4 | *9 | −4.6790 | 0.3610 | 1.545 | 56.0 |
|  | *10 | 9.5854 | 0.1000 | | |
| Lens 5 | *11 | 1.4159 | 0.4835 | 1.545 | 56.0 |
|  | *12 | 5.1086 | 0.4939 | | |
| Lens 6 | *13 | 1.6865 | 0.4519 | 1.545 | 56.0 |
|  | *14 | 1.0225 | 0.3216 | | |
| Filter | 15 | Inf | 0.2100 | 1.517 | 64.2 |
|  | 16 | Inf | 0.6000 | | |
| Sensor | 17 | Inf | 0.000**2 | | |

*Annotates aspheric surfaces (aspheric coefficients given in Tables 5A-5C)
**Annotates zoom parameters (see Table 7)

TABLE 5A

ASPHERIC COEFFICIENTS (Lens System 210)

| | Surface (S#) | | | |
|---|---|---|---|---|
| | S3 | S4 | S5 | S6 |
| K | 0 | 0 | 0 | 0 |
| A4 | 5.89278E−03 | −2.20411E−02 | −2.06562E−01 | −2.21097E−01 |
| A6 | −1.90502E−02 | 5.82880E−04 | 1.29347E−01 | 1.37686E−01 |
| A8 | 5.97943E−02 | 3.39214E−02 | −5.67545E−02 | −6.73935E−02 |
| A10 | −9.04759E−02 | −5.18589E−02 | −8.94358E−03 | 1.37849E−02 |
| A12 | 7.69886E−02 | 3.10122E−02 | 1.36912E−02 | −1.26769E−03 |
| A14 | −3.35763E−02 | −8.24637E−03 | −2.54226E−03 | −7.14267E−04 |
| A16 | 5.47871E−03 | −6.55546E−04 | −2.50593E−03 | 3.06765E−04 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 5B

ASPHERIC COEFFICIENTS (Lens System 210)

| | Surface (S#) | | | |
|---|---|---|---|---|
| | S7 | S8 | S9 | S10 |
| K | 0 | 0 | 0 | 0.00 |
| A4 | −2.50062E−02 | −1.12103E−02 | −7.29058E−02 | −4.01131E−01 |
| A6 | −2.56981E−02 | 5.35202E−03 | 1.34516E−01 | 3.67509E−01 |
| A8 | 2.22874E−02 | −3.18504E−02 | −1.89935E−01 | −2.64849E−01 |
| A10 | −1.27359E−02 | 2.80604E−02 | 1.63660E−01 | 1.31854E−01 |
| A12 | 6.82196E−03 | −1.61472E−02 | −7.75361E−02 | −3.37487E−02 |
| A14 | −6.16115E−04 | 4.04877E−03 | 1.83379E−02 | 1.98710E−03 |
| A16 | 5.10348E−04 | −2.58102E−04 | −1.35251E−03 | 8.19738E−04 |
| A18 | 0.00000E+00 | 0.00000E+00 | −1.15668E−04 | −1.26619E−04 |
| A20 | 0.00000E+00 | 0.00000E+00 | 0.00000E+00 | 0.00000E+00 |

TABLE 5C

ASPHERIC COEFFICIENTS (Lens System 210)

| | Surface (S#) | | | |
|---|---|---|---|---|
| | S11 | S12 | S13 | S14 |
| K | −1 | 0 | −1 | −1 |
| A4 | −1.34465E−01 | 1.98752E−01 | −3.26543E−01 | −4.16176E−01 |
| A6 | 8.90060E−02 | −1.63844E−01 | 7.09446E−02 | 2.54705E−01 |
| A8 | −7.98033E−02 | 2.88038E−02 | 7.92387E−02 | −1.21929E−01 |
| A10 | 2.01539E−02 | 1.96583E−02 | −8.71203E−02 | 4.22051E−02 |
| A12 | 1.01180E−02 | −1.39234E−02 | 4.10803E−02 | −1.02960E−02 |
| A14 | −7.60520E−03 | 3.98283E−03 | −1.08714E−02 | 1.72416E−03 |
| A16 | 1.70128E−03 | −6.05320E−04 | 1.66031E−03 | −1.87623E−04 |
| A18 | −1.29099E−04 | 4.75729E−05 | −1.36542E−04 | 1.18634E−05 |
| A20 | 1.15562E−07 | −1.50456E−06 | 4.67408E−06 | −3.28857E−07 |

TABLE 6

Optical Definitions (Lens system 210)

| f[mm] | 4 | f1/f | 1.54 |
|---|---|---|---|
| Fno | 1.8 | Zh/Za | 0.85 |
| HFOV[deg] | 38.2° | TTL/ImageH | 1.76 |
| $V_2$ | 20.4 | CRA | 33° |

TABLE 7

Zoom parameters (Lens system 210)

| **Zoom parameters | Position-1 | Position-2 |
|---|---|---|
| **1 | Infinity | 100 mm |
| **2 | 0.000 | 0.164 mm |

TABLE 8

Lens system 310
Fno = 1.6, HFOV = 38 deg

| Element | Surface (S#) | Radius (mm) | Thickness or separation (mm) | Refractive Index $N_d$ | Abbe Number $V_d$ |
|---|---|---|---|---|---|
| Object | 0 | Inf | Inf | | |
|  | 1 | Inf | 0.3951 | | |
| Ape. Stop | 2 | Inf | −0.3951 | | |
| Lens 1 | *3 | 2.1756 | 0.6544 | 1.545 | 56.0 |
|  | *4 | 5.6999 | 0.3229 | | |
| Lens 2 | *5 | 3.3679 | 0.2540 | 1.640 | 23.5 |
|  | *6 | 1.7398 | 0.1000 | | |
| Lens 3 | *7 | 2.8649 | 0.6055 | 1.545 | 56.0 |
|  | *8 | 23.5583 | 0.3100 | | |
| Lens 4 | *9 | −17.2738 | 0.5743 | 1.545 | 56.0 |
|  | *10 | 6.8186 | 0.1000 | | |
| Lens 5 | *11 | 1.4008 | 0.4636 | 1.545 | 56.0 |
|  | *12 | 3.8035 | 0.4723 | | |
| Lens 6 | *13 | 1.7499 | 0.4732 | 1.545 | 56.0 |
|  | *14 | 1.1282 | 0.3099 | | |
| Filter | 15 | Inf | 0.2100 | 1.517 | 64.2 |
|  | 16 | Inf | 0.6000 | | |
| Sensor | 17 | Inf | 0.0000 | | |

*Annotates aspheric surfaces (aspheric coefficient given in Tables 9A-9C)

TABLE 9A

ASPHERIC COEFFICIENTS (Lens System 310)

| | Surface (S#) | | | |
|---|---|---|---|---|
| | S3 | S4 | S5 | S6 |
| K | 0 | 0 | 0 | 0 |
| A4 | 8.25223E−04 | −3.20105E−02 | −2.27371E−01 | −2.47448E−01 |
| A6 | −2.99609E−03 | 1.77708E−02 | 1.50516E−01 | 1.69610E−01 |
| A8 | 1.71973E−02 | 5.96848E−03 | −7.09038E−02 | −9.69671E−02 |
| A10 | −2.19341E−02 | −2.41576E−02 | 5.67661E−03 | 3.22901E−02 |
| A12 | 1.36537E−02 | 1.83625E−02 | 9.22668E−03 | −6.77602E−03 |
| A14 | −3.29595E−03 | −5.66392E−03 | −4.72320E−03 | 2.57212E−04 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 9B

ASPHERIC COEFFICIENTS (Lens System 310)

| | Surface (S#) | | | |
|---|---|---|---|---|
| | S7 | S8 | S9 | S10 |
| K | 0 | 0 | 0 | 0 |
| A4 | −2.23168E−02 | −8.52730E−03 | −5.59557E−02 | −3.61595E−01 |
| A6 | −9.22651E−03 | 2.32490E−02 | 9.97637E−02 | 3.28701E−01 |
| A8 | 1.92830E−03 | −4.26220E−02 | −1.37635E−01 | −2.61700E−01 |
| A10 | 4.78187E−04 | 2.61410E−02 | 1.24323E−01 | 1.77640E−01 |
| A12 | −3.74586E−03 | −1.24657E−02 | −6.95136E−02 | −9.19553E−02 |
| A14 | 1.04105E−03 | 2.65686E−03 | 2.16548E−02 | 3.35442E−02 |
| A16 | 0.00000E+00 | 0.00000E+00 | −2.98219E−03 | −7.25386E−03 |
| A18 | 0.00000E+00 | 0.00000E+00 | 6.54872E−05 | 6.70250E−04 |
| A20 | 0.00000E+00 | 0.00000E+00 | 0.00000E+00 | 0.00000E+00 |

TABLE 9C

ASPHERIC COEFFICIENTS (Lens System 310)

| | Surface (S#) | | | |
|---|---|---|---|---|
| | S11 | S12 | S13 | S14 |
| K | −1 | 0 | −1 | −1 |
| A4 | −1.46903E−01 | 1.45204E−01 | −3.03107E−01 | −3.39529E−01 |
| A6 | 1.11619E−01 | −1.11738E−01 | 8.28582E−02 | 1.78823E−01 |
| A8 | −1.06318E−01 | 5.16617E−03 | 2.92580E−02 | −7.30192E−02 |
| A10 | 4.50646E−02 | 2.29024E−02 | −3.59895E−02 | 2.13374E−02 |
| A12 | −6.39219E−03 | −1.21388E−02 | 1.53590E−02 | −4.44491E−03 |

TABLE 9C-continued

ASPHERIC COEFFICIENTS (Lens System 310)

| | Surface (S#) | | | |
|---|---|---|---|---|
| | S11 | S12 | S13 | S14 |
| A14 | −1.42573E−03 | 2.93462E−03 | −3.62246E−03 | 6.67665E−04 |
| A16 | 5.56361E−04 | −3.52166E−04 | 4.94594E−04 | −7.01913E−05 |
| A18 | −4.72570E−05 | 1.67609E−05 | −3.66706E−05 | 4.59102E−06 |
| A20 | 0.00000E+00 | 1.19759E−08 | 1.14499E−06 | −1.37488E−07 |

TABLE 10

Optical Definitions (Lens system 310)

| f[mm] | 4 | fl/f | 1.36 |
|---|---|---|---|
| Fno | 1.6 | Zh/Za | 0.79 |
| HFOV[deg] | 38° | TTL/ImageH | 1.77 |
| $V_2$ | 23.5 | CRA | 32.5° |

TABLE 11

Lens system 410
Fno = 2.0, HFOV = 42.5 deg

| Element | Surface (S#) | Radius (mm) | Thickness or separation (mm) | Refractive Index $N_d$ | Abbe Number $V_d$ |
|---|---|---|---|---|---|
| Object | 0 | Inf | Inf | | |
| | 1 | Inf | 0.1500 | | |
| Ape. Stop | 2 | Inf | −0.1500 | | |
| Lens 1 | *3 | 2.1748 | 0.4450 | 1.545 | 56.0 |
| | *4 | 5.7800 | 0.3013 | | |
| Lens 2 | *5 | 3.8696 | 0.2540 | 1.640 | 23.5 |
| | *6 | 1.9881 | 0.1001 | | |
| Lens 3 | *7 | 3.6739 | 0.5747 | 1.545 | 56.0 |
| | *8 | −29.8327 | 0.3100 | | |
| Lens 4 | *9 | −5.1126 | 0.4803 | 1.545 | 56.0 |
| | *10 | 14.6872 | 0.1000 | | |
| Lens 5 | *11 | 1.2741 | 0.4500 | 1.545 | 56.0 |
| | *12 | 4.3153 | 0.2492 | | |
| Lens 6 | *13 | 1.3500 | 0.4736 | 1.545 | 56.0 |
| | *14 | 0.9443 | 0.4246 | | |
| Filter | 15 | Inf | 0.2100 | 1.517 | 64.2 |
| | 16 | Inf | 0.6000 | | |
| Sensor | 17 | Inf | 0.0000 | | |

*Annotates aspheric surfaces (aspheric coefficient given in Tables 12A-12C)

TABLE 12A

ASPHERIC COEFFICIENTS (Lens System 410)

| | Surface (S#) | | | |
|---|---|---|---|---|
| | S3 | S4 | S5 | S6 |
| K | 0 | 0 | 0 | 0 |
| A4 | −3.17114E−03 | −4.44990E−02 | −2.27544E−01 | −2.21474E−01 |
| A6 | 1.27088E−02 | 3.42718E−02 | 1.02731E−01 | 1.24950E−01 |
| A8 | −1.29786E−02 | −5.32181E−02 | −1.15209E−02 | −1.56472E−02 |
| A10 | 1.57762E−03 | 4.08889E−02 | −8.80825E−02 | −6.98633E−02 |
| A12 | −1.35311E−03 | −4.42642E−02 | 4.84886E−02 | 5.08563E−02 |
| A14 | 1.60702E−03 | 2.03239E−02 | −3.30751E−03 | −1.12968E−02 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 12B

ASPHERIC COEFFICIENTS (Lens System 410)

Surface (S#)

| | S7 | S8 | S9 | S10 |
|---|---|---|---|---|
| K | 0 | 0 | 0 | 0.00 |
| A4 | −1.43567E−02 | 1.51080E−02 | −1.69569E−02 | −5.39740E−01 |
| A6 | −3.47267E−02 | −2.45473E−02 | 4.62799E−02 | 6.22267E−01 |
| A8 | 5.54434E−02 | 1.53177E−03 | −2.02428E−02 | −5.18306E−01 |
| A10 | −5.22529E−02 | 3.65131E−03 | −7.52965E−02 | 2.74857E−01 |
| A12 | 1.81502E−02 | −1.23565E−02 | 1.50750E−01 | −6.61238E−02 |
| A14 | −2.21030E−03 | 4.35622E−03 | −1.19880E−01 | −3.71488E−03 |
| A16 | 0.00000E+00 | 0.00000E+00 | 4.35945E−02 | 4.94593E−03 |
| A18 | 0.00000E+00 | 0.00000E+00 | −5.95775E−03 | −6.70823E−04 |
| A20 | 0.00000E+00 | 0.00000E+00 | 0.00000E+00 | 0.00000E+00 |

TABLE 12C

ASPHERIC COEFFICIENTS (Lens System 410)

Surface (S#)

| | S11 | S12 | S13 | S14 |
|---|---|---|---|---|
| K | −1 | 0 | −1 | −1 |
| A4 | −2.14945E−01 | 2.97719E−01 | −2.83537E−01 | −3.75554E−01 |
| A6 | 2.56593E−01 | −3.19603E−01 | 5.92051E−02 | 1.96637E−01 |
| A8 | −3.08970E−01 | 1.43355E−01 | 3.30343E−02 | −8.15183E−02 |
| A10 | 2.03488E−01 | −2.97407E−02 | −2.95176E−02 | 2.44442E−02 |
| A12 | −7.83501E−02 | −9.19077E−04 | 1.07906E−02 | −4.85618E−03 |
| A14 | 1.72419E−02 | 1.78255E−03 | −2.25606E−03 | 6.00085E−04 |
| A16 | −1.97129E−03 | −3.27004E−04 | 2.78170E−04 | −4.29140E−05 |
| A18 | 8.98207E−05 | 1.94546E−05 | −1.88103E−05 | 1.54990E−06 |
| A20 | 0.00000E+00 | 1.19759E−08 | 5.36844E−07 | −1.98194E−08 |

TABLE 13

Optical Definitions (Lens system 410)

| f[mm] | 3.4 | fl/f | 1.46 |
|---|---|---|---|
| Fno | 2.0 | Zh/Za | 0.79 |
| HFOV[deg] | 42.5° | TTL/ImageH | 1.62 |
| $V_2$ | 23.5 | CRA | 35° |

TABLE 14

Lens system 510
Fno = 1.8, HFOV = 38.1 deg

| Element | Surface (S#) | Radius (mm) | Thickness or separation (mm) | Refractive Index $N_d$ | Abbe Number $V_d$ |
|---|---|---|---|---|---|
| Object | 0 | Inf | Inf | | |
| | 1 | Inf | 0.3375 | | |
| Ape. Stop | 2 | Inf | −0.3375 | | |
| Lens 1 | *3 | 2.3459 | 0.6195 | 1.545 | 56.0 |
| | *4 | 7.2284 | 0.2541 | | |
| Lens 2 | *5 | 3.7977 | 0.2531 | 1.640 | 23.5 |
| | *6 | 1.8829 | 0.1579 | | |
| Lens 3 | *7 | 3.5550 | 0.6792 | 1.545 | 56.0 |
| | *8 | −26.8468 | 0.5691 | | |
| Lens 4 | *9 | −11.0420 | 0.4104 | 1.545 | 56.0 |
| | *10 | 7.1303 | 0.1084 | | |
| Lens 5 | *11 | 1.4654 | 0.5245 | 1.545 | 56.0 |
| | *12 | 3.9574 | 0.6151 | | |
| Lens 6 | *13 | 2.0521 | 0.4601 | 1.545 | 56.0 |
| | *14 | 1.1763 | 0.3087 | | |
| Filter | 15 | Inf | 0.2100 | 1.517 | 64.2 |
| | 16 | Inf | 0.6000 | | |
| Sensor | 17 | Inf | 0.0000 | | |

*Annotates aspheric surfaces (aspheric coefficient given in Tables 15A-15C)

TABLE 15A

ASPHERIC COEFFICIENTS (Lens System 510)

| | Surface (S#) | | | |
|---|---|---|---|---|
| | S3 | S4 | S5 | S6 |
| K | 0 | 0 | 0 | 0 |
| A4 | −1.06226E−03 | −3.61474E−02 | −2.25413E−01 | −2.45604E−01 |
| A6 | 7.06466E−03 | 2.67307E−02 | 1.83650E−01 | 1.98582E−01 |
| A8 | −4.66079E−03 | −2.19697E−03 | −1.03653E−01 | −1.35435E−01 |
| A10 | 1.44582E−03 | −1.70717E−02 | 2.26831E−02 | 5.49646E−02 |
| A12 | 1.18841E−03 | 1.39853E−02 | 5.39126E−03 | −1.12228E−02 |
| A14 | −6.83263E−04 | −4.46254E−03 | −4.16224E−03 | 5.61640E−04 |
| A16 | 0.00000E+00 | 0.00000E+00 | 0.00000E+00 | 0.00000E+00 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 15B

ASPHERIC COEFFICIENTS (Lens System 510)

| | Surface (S#) | | | |
|---|---|---|---|---|
| | S7 | S8 | S9 | S10 |
| K | 0 | 0 | 0 | 0 |
| A4 | −2.85389E−02 | −1.13736E−02 | −6.26081E−02 | −3.31960E−01 |
| A6 | −2.98749E−02 | 5.86150E−03 | 8.14163E−02 | 2.76593E−01 |
| A8 | 4.89028E−02 | −1.80924E−02 | −8.24328E−02 | −1.74253E−01 |
| A10 | −5.38289E−02 | 8.78509E−03 | 5.30866E−02 | 7.62924E−02 |
| A12 | 2.68919E−02 | −2.77471E−03 | −1.77754E−02 | −1.86491E−02 |
| A14 | −4.78723E−03 | 5.14349E−04 | 2.44278E−03 | 2.40198E−03 |
| A16 | 0.00000E+00 | 0.00000E+00 | 8.97803E−05 | −2.45692E−04 |
| A18 | 0.00000E+00 | 0.00000E+00 | −4.93506E−05 | 2.67785E−05 |
| A20 | 0.00000E+00 | 0.00000E+00 | 0.00000E+00 | 0.00000E+00 |

TABLE 15C

ASPHERIC COEFFICIENTS (Lens System 510)

| | Surface (S#) | | | |
|---|---|---|---|---|
| | S11 | S12 | S13 | S14 |
| K | −1 | 0 | −1 | −1 |
| A4 | −1.38066E−01 | 1.48447E−01 | −2.57283E−01 | −3.23139E−01 |
| A6 | 8.11898E−02 | −1.36567E−01 | 6.62976E−02 | 1.75111E−01 |
| A8 | −6.66585E−02 | 4.22347E−02 | 3.32949E−02 | −7.37215E−02 |
| A10 | 2.35452E−02 | −2.09710E−03 | −3.83968E−02 | 2.21270E−02 |
| A12 | −4.49376E−04 | −2.66664E−03 | 1.58963E−02 | −4.65544E−03 |
| A14 | −1.86238E−03 | 9.02182E−04 | −3.54139E−03 | 6.72277E−04 |
| A16 | 4.37935E−04 | −1.33672E−04 | 4.46148E−04 | −6.29814E−05 |
| A18 | −3.02590E−05 | 9.61698E−06 | −2.99026E−05 | 3.41149E−06 |
| A20 | 0.00000E+00 | −2.63847E−07 | 8.28153E−07 | −8.04407E−08 |

TABLE 16

Optical Definitions (Lens system 510)

| f[mm] | 4.4 | fl/f | 1.39 |
|---|---|---|---|
| Fno | 1.8 | Zh/Za | 0.94 |
| HFOV[deg] | 38.1° | TTL/ImageH | 1.71 |
| $V_2$ | 23.5 | CRA | 34° |

TABLE 17

Lens system 610
Fno = 1.8, HFOV = 38 deg

| Element | Surface (S#) | Radius (mm) | Thickness or separation (mm) | Refractive Index $N_d$ | Abbe Number $V_d$ |
|---|---|---|---|---|---|
| Object | 0 | Inf | Inf | | |
| | 1 | Inf | 0.2831 | | |

TABLE 17-continued

Lens system 610
Fno = 1.8, HFOV = 38 deg

| Element | Surface (S#) | Radius (mm) | Thickness or separation (mm) | Refractive Index $N_d$ | Abbe Number $V_d$ |
|---|---|---|---|---|---|
| Ape. Stop | 2 | Inf | −0.2831 | | |
| Lens 1 | *3 | 2.2591 | 0.5465 | 1.545 | 56.0 |
| | *4 | 6.7599 | 0.2615 | | |
| Lens 2 | *5 | 2.8241 | 0.2540 | 1.661 | 20.4 |
| | *6 | 1.7008 | 0.2174 | | |
| Lens 3 | *7 | 3.4615 | 0.6832 | 1.545 | 56.0 |
| | *8 | −16.3098 | 0.4400 | | |
| Lens 4 | *9 | −4.1500 | 0.4000 | 1.545 | 56.0 |
| | *10 | 19.9596 | 0.1000 | | |
| Lens 5 | *11 | 1.6570 | 0.4859 | 1.545 | 56.0 |
| | *12 | 7.9636 | 0.4200 | | |
| Lens 6 | *13 | 1.5764 | 0.4500 | 1.545 | 56.0 |
| | *14 | 0.9813 | 0.3315 | | |
| Filter | 15 | Inf | 0.2100 | 1.517 | 64.2 |
| | 16 | Inf | 0.6000 | | |
| Sensor | 17 | Inf | 0.0000 | | |

*Annotates aspheric surfaces (aspheric coefficient given in Tables 18A-18C)

TABLE 18A

ASPHERIC COEFFICIENTS (Lens System 610)

| | Surface (S#) | | | |
|---|---|---|---|---|
| | S3 | S4 | S5 | S6 |
| K | 0 | 0 | 0 | 0 |
| A4 | 6.33685E−03 | −3.26081E−02 | −2.24435E−01 | −2.46041E−01 |
| A6 | −1.70898E−02 | 1.44101E−02 | 1.41673E−01 | 1.27268E−01 |
| A8 | 4.29366E−02 | 3.29615E−02 | −3.30434E−02 | 1.25015E−02 |
| A10 | −5.22087E−02 | −6.27815E−02 | −7.48612E−03 | −9.40879E−02 |
| A12 | 3.25072E−02 | 4.20435E−02 | −2.71107E−02 | 7.08112E−02 |
| A14 | −8.15026E−03 | −1.13165E−02 | 3.17555E−02 | −2.43980E−02 |
| A16 | 0.00000E+00 | 0.00000E+00 | −9.94516E−03 | 3.33824E−03 |
| A18 | 0.00000E+00 | 0.00000E+00 | 0.00000E+00 | 0.00000E+00 |
| A20 | 0.00000E+00 | 0.00000E+00 | 0.00000E+00 | 0.00000E+00 |

TABLE 18B

ASPHERIC COEFFICIENTS (Lens System 610)

| | Surface (S#) | | | |
|---|---|---|---|---|
| | S7 | S8 | S9 | S10 |
| K | 0 | 0 | 0 | 0 |
| A4 | −2.48488E−02 | −5.56212E−03 | −9.56909E−02 | −3.38929E−01 |
| A6 | −2.53024E−02 | 1.47432E−02 | 2.09734E−01 | 2.57576E−01 |
| A8 | −9.19257E−03 | −6.87050E−02 | −3.17043E−01 | −1.55825E−01 |
| A10 | 4.55140E−02 | 6.63355E−02 | 2.81432E−01 | 6.79933E−02 |
| A12 | −4.91420E−02 | −3.82396E−02 | −1.49588E−01 | −1.83150E−02 |
| A14 | 2.09901E−02 | 1.14207E−02 | 4.84136E−02 | 5.36156E−03 |
| A16 | −3.09498E−03 | −1.34155E−03 | −8.75272E−03 | −1.73750E−03 |
| A18 | 0.00000E+00 | 0.00000E+00 | 6.47538E−04 | 2.43343E−04 |
| A20 | 0.00000E+00 | 0.00000E+00 | 0.00000E+00 | 0.00000E+00 |

TABLE 18C

ASPHERIC COEFFICIENTS (Lens System 610)

| | Surface (S#) | | | |
|---|---|---|---|---|
| | S11 | S12 | S13 | S14 |
| K | −1 | 0 | −1 | −1 |
| A4 | −3.16836E−02 | 2.42384E−01 | −3.36221E−01 | −4.49994E−01 |
| A6 | −4.54441E−02 | −1.42736E−01 | 1.00269E−01 | 2.99390E−01 |
| A8 | 4.87886E−02 | −5.76241E−02 | 5.05812E−02 | −1.59025E−01 |
| A10 | −8.42348E−02 | 1.02321E−01 | −7.15132E−02 | 6.09757E−02 |
| A12 | 7.24781E−02 | −5.60202E−02 | 3.56805E−02 | −1.62042E−02 |
| A14 | −3.16231E−02 | 1.68682E−02 | −9.64108E−03 | 2.88416E−03 |

TABLE 18C-continued

ASPHERIC COEFFICIENTS (Lens System 610)

Surface (S#)

|     | S11         | S12          | S13          | S14          |
|-----|-------------|--------------|--------------|--------------|
| A16 | 7.23469E−03 | −2.98020E−03 | 1.47848E−03  | −3.25516E−04 |
| A18 | −8.20878E−04 | 2.89838E−04 | −1.20721E−04 | 2.09330E−05  |
| A20 | 3.61682E−05 | −1.19745E−05 | 4.06915E−06  | −5.81931E−07 |

TABLE 19

Optical Definitions (Lens system 610)

| f[mm]     | 4    | f1/f      | 1.49  |
|-----------|------|-----------|-------|
| Fno       | 1.8  | Zh/Za     | 0.74  |
| HFOV[deg] | 38°  | TTL/ImageH| 1.76  |
| $V_2$     | 20.4 | CRA       | 32.5° |

Example Flowcharts

Figure 24:
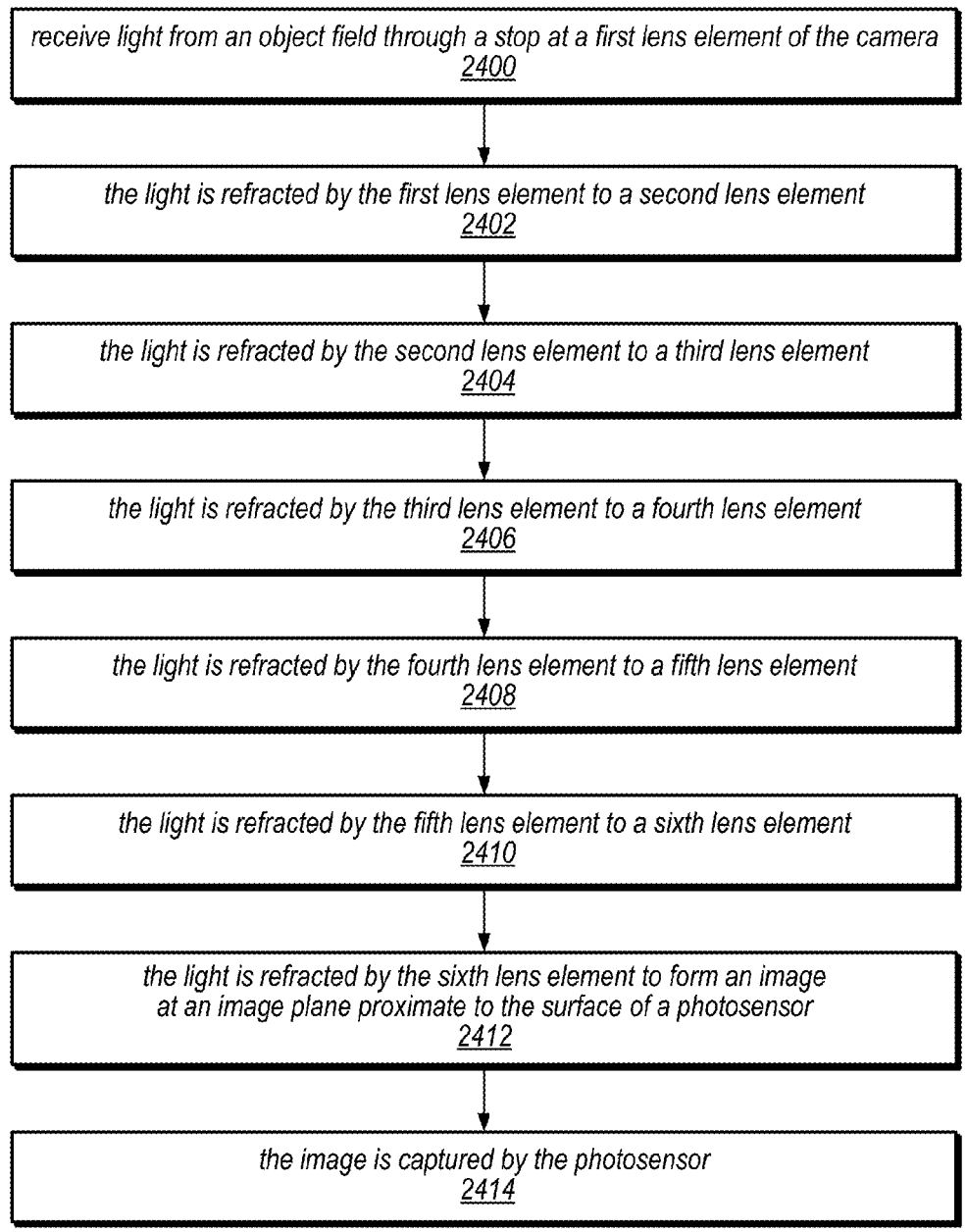
FIG. 24 is a flowchart of a method for capturing images using cameras with lens systems as illustrated in FIGS. 1 through 23, according to some embodiments.

FIG. 24 is a flowchart of a method for capturing images using a camera with a lens system that includes six lens elements and an aperture stop at the first lens element and behind the front vertex of the lens system as illustrated in FIGS. 1 through 23, according to some embodiments. As indicated at 2400, light from an object field in front of the camera is received at a first lens element of the camera through an aperture stop. In some embodiments, the aperture stop may be located at the first lens element and behind the front vertex of the lens system. As indicated at 2402, the first lens element refracts the light to a second lens element. In some embodiments, the first lens element may have positive refracting power. As indicated at 2404, the light is then refracted by the second lens element to a third lens element. In some embodiments, the second lens element may have negative refracting power. As indicated at 2406, the light is then refracted by the third lens element to a fourth lens element. In some embodiments, the third lens element may have positive refracting power. As indicated at 2408, the light is then refracted by the fourth lens element to a fifth lens element. In some embodiments, the fourth lens element may have negative refracting power. As indicated at 2410, the light is then refracted by the fifth lens element to a sixth lens element. In some embodiments, the fifth lens element may have positive refracting power. As indicated at 2412, the light is refracted by the sixth lens element to form an image at an image plane at or near the surface of a photosensor. In some embodiments, the sixth lens element may have negative refracting power. As indicated at 2414, the image is captured by the photosensor. While not shown, in some embodiments, the light may pass through an infrared filter that may for example be located between the sixth lens element and the photosensor.

In some embodiments, the six lens elements referred to in FIG. 24 may be configured as illustrated in any of FIGS. 1 through 23 and the accompanying Tables. However, note that variations on the examples given in FIGS. 1 through 23 are possible while achieving similar optical results.

FIG. 25 is a cross-sectional illustration of a compact lens system as illustrated in FIGS. 1 through 23 that includes a secondary stop, according to some embodiments. Lens system 1010 includes six lens elements 1001-1006 arranged in order along an optical axis from a first refractive lens element (lens 1001) on the object side of the lens system 1010 to a last lens element (lens 1006) on the image side of the lens system 1006. Lens elements 1001-1006 may be configured as illustrated in any of FIGS. 1 through 23 and the accompanying Tables. However, note that variations on the examples given in FIGS. 1 through 23 are possible while achieving similar optical results.

An aperture stop 1030 is located in front of the first lens element 1001 and behind the front vertex of the lens system 1010. However, in some embodiments, the aperture stop 1030 may be located at different positions than shown, for example at or in front of the front vertex of the lens system 1010, or between the first 1001 and second 1002 lens elements in the lens system 1010.

As shown in FIG. 25, in some embodiments, a secondary stop 1032 may be included in the lens system 1010, for example between lens elements 1001 and 1002 in the lens system. While a camera with a lens system and a single stop as illustrated in FIGS. 1 through 23 may capture high resolution high quality images with high brightness and a wide field of view without a secondary stop, including a secondary stop 1032 may, for example, cut off a portion of the light field at the periphery to provide additional aberration control.

Figure 26:
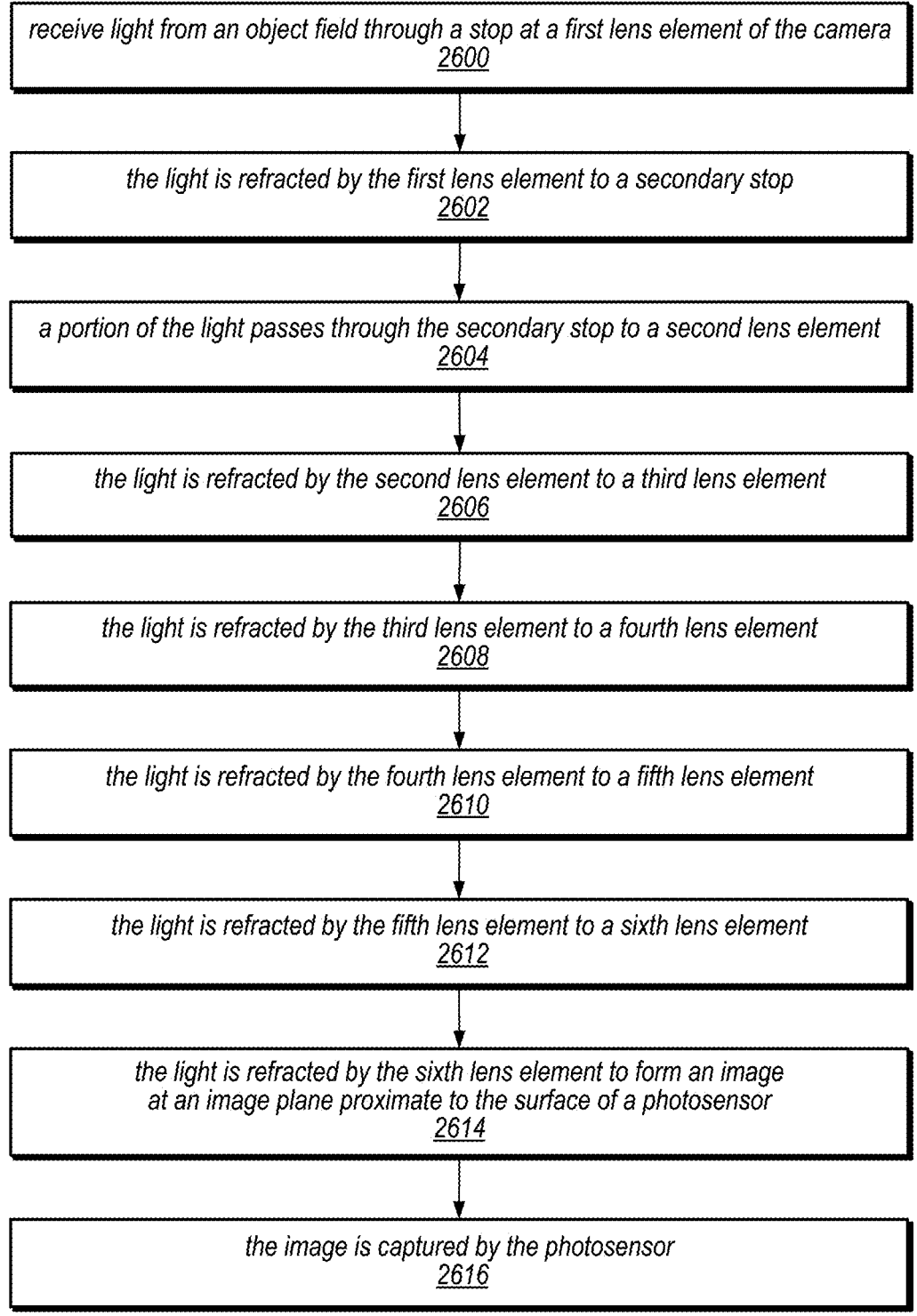
FIG. 26 is a flowchart of a method for capturing images using cameras with lens systems as illustrated in FIG. 25, according to some embodiments.

FIG. 26 is a flowchart of a method for capturing images using a camera with a lens system that includes six lens elements, an aperture stop between the object field and the first lens element, and a secondary stop as illustrated in FIG. 25, according to some embodiments. As indicated at 2600, light from an object field in front of the camera is received at a first lens element of the camera through an aperture stop. In some embodiments, the aperture stop may be located at the first lens element and behind the front vertex of the lens system. As indicated at 2602, the first lens element refracts the light to a secondary stop. In some embodiments, the first lens element may have positive refracting power. As indicated at 2604, a portion of the light passes through the secondary stop to the second lens element. As indicated at 2606 the light is then refracted by the second lens element to a third lens element. In some embodiments, the second lens element may have negative refracting power. As indicated at 2608, the light is then refracted by the third lens element to a fourth lens element. In some embodiments, the third lens element may have positive refracting power. As indicated at 2610, the light is then refracted by the fourth lens element to a fifth lens element. In some embodiments, the fourth lens element may have negative refracting power. As indicated at 2612, the light is then refracted by the fifth lens element to a sixth lens element. In some embodiments, the fifth lens element may have positive refracting power. As indicated at 2614, the light is refracted by the sixth lens element to form an image at an image plane at or near the surface of a photosensor. In some embodiments, the sixth lens element may have negative refracting power. As indicated at 2616, the image is captured by the photosensor. While not shown, in some embodiments, the light may pass through an infrared filter that may for example be located between the sixth lens element and the photosensor.

In some embodiments, the six lens elements referred to in FIG. 26 may be configured as illustrated in any of FIGS. 1 through 23 and the accompanying Tables. However, note that variations on the examples given in FIGS. 1 through 23 are possible while achieving similar optical results.

While FIGS. 25 and 26 illustrate and describe the secondary stop as being positioned between the first lens element and the second lens element, in some embodiments the secondary stop may be located at other positions in the lens system, for example between the second and third lens elements, between the third and fourth lens elements, or between the fourth and fifth lens elements.

Example Computing Device

Figure 27:
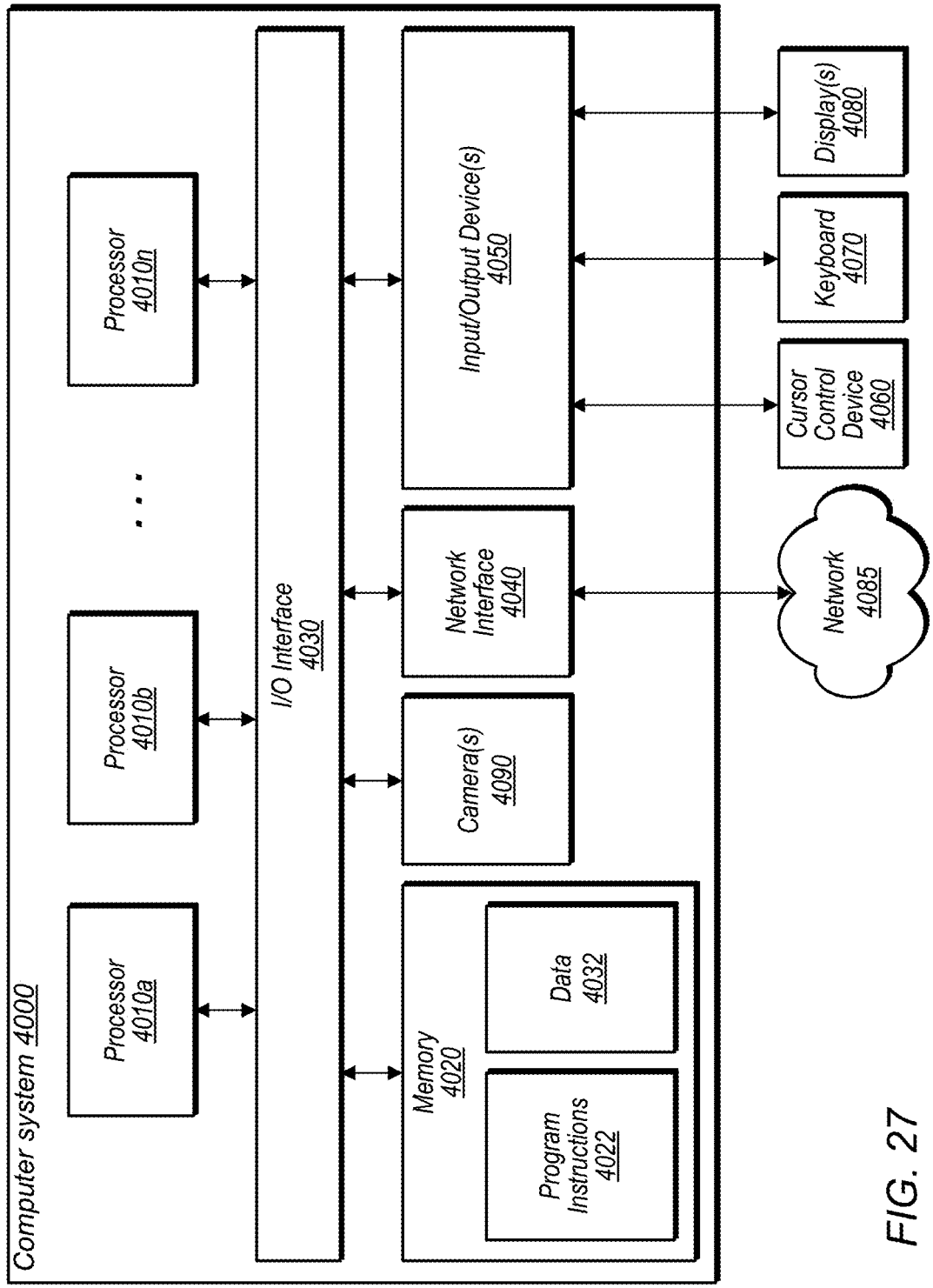
FIG. 27 illustrates an example computer system that may be used in embodiments.

FIG. 27 illustrates an example computing device, referred to as computer system 4000, that may include or host embodiments of the camera as illustrated in FIGS. 1 through 26. In addition, computer system 4000 may implement methods for controlling operations of the camera and/or for performing image processing of images captured with the camera. In different embodiments, computer system 4000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 4000 includes one or more processors 4010 coupled to a system memory 4020 via an input/output (I/O) interface 4030. Computer system 4000 further includes a network interface 4040 coupled to I/O interface 4030, and one or more input/output devices 4050, such as cursor control device 4060, keyboard 4070, and display(s) 4080. Computer system 4000 may also include one or more cameras 4090, for example one or more cameras as described above with respect to FIGS. 1 through 26, which may also be coupled to I/O interface 4030, or one or more cameras as described above with respect to FIGS. 1 through 26 along with one or more other cameras such as conventional wide-field cameras.

In various embodiments, computer system 4000 may be a uniprocessor system including one processor 4010, or a multiprocessor system including several processors 4010 (e.g., two, four, eight, or another suitable number). Processors 4010 may be any suitable processor capable of executing instructions. For example, in various embodiments processors 4010 may be general-purpose or embedded processors implementing any of a variety of instruction set architectures (ISAs), such as the x86, PowerPC, SPARC, or MIPS ISAs, or any other suitable ISA. In multiprocessor systems, each of processors 4010 may commonly, but not necessarily, implement the same ISA.

System memory 4020 may be configured to store program instructions 4022 and/or data 4032 accessible by processor 4010. In various embodiments, system memory 4020 may be implemented using any suitable memory technology, such as static random access memory (SRAM), synchronous dynamic RAM (SDRAM), nonvolatile/Flash-type memory, or any other type of memory. In the illustrated embodiment, program instructions 4022 may be configured to implement various interfaces, methods and/or data for controlling operations of camera 4090 and for capturing and processing images with integrated camera 4090 or other methods or data, for example interfaces and methods for capturing, displaying, processing, and storing images captured with camera 4090. In some embodiments, program instructions and/or data may be received, sent or stored upon different types of computer-accessible media or on similar media separate from system memory 4020 or computer system 4000.

In one embodiment, I/O interface 4030 may be configured to coordinate I/O traffic between processor 4010, system memory 4020, and any peripheral devices in the device, including network interface 4040 or other peripheral interfaces, such as input/output devices 4050. In some embodiments, I/O interface 4030 may perform any necessary protocol, timing or other data transformations to convert data signals from one component (e.g., system memory 4020) into a format suitable for use by another component (e.g., processor 4010). In some embodiments, I/O interface 4030 may include support for devices attached through various types of peripheral buses, such as a variant of the Peripheral Component Interconnect (PCI) bus standard or the Universal Serial Bus (USB) standard, for example. In some embodiments, the function of I/O interface 4030 may be split into two or more separate components, such as a north bridge and a south bridge, for example. Also, in some embodiments some or all of the functionality of I/O interface 4030, such as an interface to system memory 4020, may be incorporated directly into processor 4010.

Network interface 4040 may be configured to allow data to be exchanged between computer system 4000 and other devices attached to a network 4085 (e.g., carrier or agent devices) or between nodes of computer system 4000. Network 4085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 4040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 4050 may, in some embodiments, include one or more display terminals, keyboards, keypads, touchpads, scanning devices, voice or optical recognition devices, or any other devices suitable for entering or accessing data by computer system 4000. Multiple input/output devices 4050 may be present in computer system 4000 or may be distributed on various nodes of computer system 4000. In some embodiments, similar input/output devices may be separate from computer system 4000 and may interact with one or more nodes of computer system 4000 through a wired or wireless connection, such as over network interface 4040.

As shown in FIG. 27, memory 4020 may include program instructions 4022, which may be processor-executable to implement any element or action to support integrated camera 4090, including but not limited to image processing software and interface software for controlling camera 4090. In some embodiments, images captured by camera 4090 may be stored to memory 4020. In addition, metadata for images captured by camera 4090 may be stored to memory 4020.

Those skilled in the art will appreciate that computer system 4000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 4000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 4000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 4000 may be transmitted to computer system 4000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A lens system, comprising:
a plurality of refractive lens elements arranged along an optical axis of the lens system, wherein the plurality of lens elements includes, in order along the optical axis from an object side to an image side:
a first lens element with positive refractive power;
a second lens element with negative refractive power;
a third lens element with positive refractive power;
a fourth lens element with negative refractive power;
a fifth lens element with positive refractive power; and
a sixth lens element with negative refractive power;
wherein total track length (TTL) of the lens system is 6.2 millimeters (mm) or less, and the lens system has an F-number of 2.2 or less;
wherein on-axis spacing between the third lens element and the fourth lens element is defined as Za;
wherein off-axis spacing between the third lens element and the fourth lens element at a vertical distance Hep from the optical axis is defined as Zh, where Hep=EPD/2, where EPD is entrance pupil diameter of the lens system; and
wherein Za and Zh satisfy the relationship:
Zh/Za>0.7.

2. The lens system as recited in claim 1, wherein F-number of the lens system is 2.2 or less, and effective focal length f for the lens system is 4.8 mm or less.

3. The lens system as recited in claim 1, wherein the lens system further includes an aperture stop located at the first lens element.

4. The lens system as recited in claim 1, wherein the lens system further includes a secondary aperture stop located between the first lens element and the sixth lens element.

5. The lens system as recited in claim 1, wherein the first lens element has a convex object-side surface in a paraxial region and a concave image-side surface in the paraxial region, and wherein the lens system satisfies the relationship:

$1.2 < f_1/f < 1.6$, where $f_1$ is focal length of the first lens element, and f is effective focal length of the lens system.

6. The lens system as recited in claim 1, wherein the second lens element has a convex object-side surface in a paraxial region and a concave image-side surface in the paraxial region.

7. The lens system as recited in claim 1, wherein the third lens element has a convex object-side surface in a paraxial region and the fourth lens element has a concave object-side surface in a paraxial region.

8. The lens system as recited in claim 1, wherein half field of view (HFOV) of the lens system is 35° or higher.

9. The lens system as recited in claim 1, wherein an object side surface and an image side surface of the sixth lens element are aspheric, wherein the sixth lens element is convex in a paraxial region of the object side surface and concave in a periphery region of the object side surface, and wherein the sixth lens element is concave in the paraxial region of the image side surface and in the periphery region of the image side surface.

10. The lens system as recited in claim 1, wherein the lens system satisfies the relationships:

TTL/ImageH<1.9, and

TTL/f<1.4, where TTL is total track length of the lens system, ImageH is semi-diagonal image height at an image plane of the lens system, and f is effective focal length of the lens system.

11. The lens system as recited in claim 1, wherein an object side surface and an image side surface of the fifth lens element are aspheric, wherein the object side surface of the fifth lens element is convex in a paraxial region of the object side surface and concave in a periphery region of the object side surface, and wherein the image side surface of the fifth lens element is concave in a paraxial region of the image side surface and convex in a periphery region of the image side surface.

12. The lens system as recited in claim 11, wherein the lens system satisfies the relationship:

0.2<Yo/f<0.6, where Yo is vertical distance between an outermost horizontal vertex of the image side surface of the fifth lens element and the optical axis, and f is effective focal length of the lens system.

13. The lens system as recited in claim 1, wherein the first lens element and the third lens element are composed of an optical material with Abbe number Vd>50, and wherein the second lens element is composed of an optical material with Abbe number Vd<30.

14. The lens system as recited in claim 13, wherein the fourth lens element, the fifth lens element, and the sixth lens element are formed of an optical material with Abbe number Vd>50.

15. A camera, comprising:
a photosensor configured to capture light projected onto a surface of the photosensor; and
a lens system configured to refract light from an object field located in front of the camera to form an image of a scene at an image plane at or near the surface of the photosensor, wherein the lens system comprises six refractive lens elements arranged along an optical axis of the camera; and
wherein total track length (TTL) of the lens system is 6.2 millimeters (mm) or less, and effective focal length f for the lens system is 4.8 mm or less;
wherein on-axis spacing between a third lens element from an object side of the camera and a fourth lens element from the object side of the camera is defined as Za;
wherein off-axis spacing between the third lens element and the fourth lens element at a vertical distance Hep from the optical axis is defined as Zh, where Hep=EPD/2, where EPD is entrance pupil diameter of the lens system; and
wherein Za and Zh satisfy the relationship:
Zh/Za>0.7.

16. The camera as recited in claim 15, wherein half field of view (HFOV) of the lens system is 35° or higher.

17. The camera as recited in claim 15, wherein the lens elements include, in order along the optical axis from the object side to an image side of the camera:
a first lens element with positive refractive power;
a second lens element with negative refractive power;
the third lens element with positive refractive power;
the fourth lens element with negative refractive power;
a fifth lens element with positive refractive power; and
a sixth lens element with negative refractive power;
wherein at least one of the lens elements has at least one aspheric surface.

18. The camera as recited in claim 17, wherein the first lens element and the third lens element are composed of an optical material with Abbe number Vd>50, and the second lens element is composed of an optical material with Abbe number Vd<30.

19. The camera as recited in claim 15, wherein F-number of the lens system is 2.2 or less.

20. A device, comprising:
one or more processors;
one or more cameras; and
a memory comprising program instructions executable by at least one of the one or more processors to control operations of the one or more cameras;
wherein at least one of the one or more cameras is a wide field of view (FOV) camera comprising:
a photosensor configured to capture light projected onto a surface of the photosensor; and
a lens system configured to refract light from an object field located in front of the camera to form an image of a scene at an image plane at or near the surface of the photosensor, wherein the lens system comprises six refractive lens elements arranged along an optical axis of the camera; and
wherein total track length (TTL) of the lens system is 6.2 millimeters (mm) or less, and effective focal length f for the lens system is 4.8 mm or less;
wherein on-axis spacing between a third lens element from an object side of the camera and a fourth lens element from the object side of the camera is defined as Za;
wherein off-axis spacing between the third lens element and the fourth lens element at a vertical distance Hep from the optical axis is defined as Zh, where Hep=EPD/2, where EPD is entrance pupil diameter of the lens system; and
wherein Za and Zh satisfy the relationship:
Zh/Za>0.7.

* * * * *